(12) United States Patent
Ophardt et al.

(10) Patent No.: US 8,113,388 B2
(45) Date of Patent: *Feb. 14, 2012

(54) ENGAGEMENT FLANGE FOR REMOVABLE DISPENSER CARTRIDGE

(76) Inventors: Heiner Ophardt, Vineland (CA);
Andrew Jones, Smithville (CA);
Zhenchun (Tony) Shi, Hamilton (CA);
Charles S. Charron, Oakville (CA); Ali Mirbach, Issum (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/591,998

(22) Filed: Dec. 7, 2009

(65) Prior Publication Data

US 2010/0163580 A1   Jul. 1, 2010

Related U.S. Application Data

(63) Continuation-in-part of application No. 12/318,027, filed on Dec. 19, 2008.

(60) Provisional application No. 61/159,702, filed on Mar. 12, 2009.

(30) Foreign Application Priority Data

Dec. 8, 2008 (CA) ..................................... 2645953
Mar. 13, 2009 (CA) ..................................... 2658501
Dec. 3, 2009 (CA) ..................................... 2686981

(51) Int. Cl.
*B67D 7/06* (2010.01)
(52) U.S. Cl. .................... 222/181.3; 222/321.8; 222/325
(58) Field of Classification Search ............... 222/383.1, 222/518, 181.2, 181.3, 321.7, 321.8, 325, 222/321.6, 321.9, 509, 524–525; 403/329; 239/600, 602, DIG. 12
See application file for complete search history.

(56) References Cited

U.S. PATENT DOCUMENTS

| | | | | |
|---|---|---|---|---|
| 2,466,899 A * | 4/1949 | Kincaid | ..................... | 248/551 |
| 2,858,052 A * | 10/1958 | Costakos | ................... | 222/185.1 |
| 4,174,057 A * | 11/1979 | Emery | ..................... | 222/332 |
| 4,240,570 A * | 12/1980 | Brown et al. | ................ | 222/442 |
| 4,667,854 A * | 5/1987 | McDermott et al. | ........ | 222/101 |
| 5,165,577 A | 11/1992 | Ophardt | | |
| 5,431,309 A | 7/1995 | Ophardt | | |
| 5,836,482 A | 11/1998 | Ophardt et al. | | |
| 5,975,360 A | 11/1999 | Ophardt | | |
| 6,053,370 A * | 4/2000 | Ludbrook et al. | ........... | 222/207 |
| 6,409,050 B1 | 6/2002 | Ophardt | | |
| 6,601,736 B2 | 8/2003 | Ophardt et al. | | |
| 7,225,948 B2 | 6/2007 | Ophardt et al. | | |
| 7,267,251 B2 | 9/2007 | Ophardt | | |
| 7,270,250 B2 | 9/2007 | Jones et al. | | |
| 7,780,039 B2 * | 8/2010 | Criswell et al. | ............. | 222/108 |
| 2005/0205608 A1 * | 9/2005 | Ophardt et al. | ............ | 222/181.3 |
| 2006/0032871 A1 | 2/2006 | Ophardt et al. | | |
| 2006/0249538 A1 | 11/2006 | Ophardt et al. | | |
| 2008/0304978 A1 | 12/2008 | Ophardt et al. | | |
| 2008/0308574 A1 | 12/2008 | Ophardt et al. | | |
| 2009/0032552 A1 | 2/2009 | Ophardt et al. | | |

* cited by examiner

*Primary Examiner* — Kevin P Shaver
*Assistant Examiner* — Robert Nichols, II
(74) *Attorney, Agent, or Firm* — Thorpe North & Western LLP

(57) ABSTRACT

An improved arrangement for removably coupling a replaceable cartridge to a housing of a dispenser with the cartridge including a resilient member which prevents radial movement relative a catch member of the housing from a coupled orientation unless the resilient member is deflected from an unbiased inherent configuration.

20 Claims, 43 Drawing Sheets

US 8,113,388 B2

ENGAGEMENT FLANGE FOR REMOVABLE DISPENSER CARTRIDGE

RELATED APPLICATIONS

This application is a continuation-in-part of co-pending U.S. patent application Ser. No. 12/318,027 filed Dec. 19, 2008. This application claims the benefit under 35 U.S.C. 119(e) to U.S. provisional patent application Ser. No. 61/159,702 filed Mar. 12, 2009.

SCOPE OF THE INVENTION

This invention relates generally to dispensers and, more particularly, to dispensers with a replaceable element, more particularly to fluid dispensers and to a piston pump for a liquid soap dispenser which is adapted for simplified replacement of a liquid soap reservoir and to paper roll dispensers and paper rolls adapted for simplified replacement.

BACKGROUND OF THE INVENTION

Many dispensers of material such as fluid dispensers and paper roll dispensers have removable cartridges which are inserted and removed for replacement after the material to be dispensed carried by the cartridge has been exhausted. Many such dispensers suffer the disadvantage that coupling mechanisms for coupling of the removable cartridges to the dispensers are complex and do no provide any keying or lock out arrangement for limiting use of replacement cartridges to limited configurations.

Many of today's products sold in liquid form, such as liquid hand soap, are contained in disposable containers or reservoirs which incorporate a pump assembly. Typically, the pump assembly includes a reciprocally movable element which when moved dispenses a quantity of liquid soap from the reservoir. The reservoirs are generally fitted within a permanent housing which includes a movable actuator assembly which engages and reciprocally moves the movable element to dispense the fluid. This has been found to be both a convenient and economical means of fluid supply and dispensation. Since the fluid reservoirs are replaced once the fluid supply is exhausted, it is desirable to manufacture the dispenser and reservoir so as to make replacement of the fluid reservoir as easy and quick as possible.

Known fluid dispensers suffer the disadvantage in ensuring the movable element is placed and maintained in a correct dispensing position relative the actuator assembly to properly dispense fluids. To achieve the proper dispensing configuration, the pump assembly must therefore be precisely aligned in the housing to ensure it is properly secured in or coupled to the actuator assembly. In some fluid dispensers, a disadvantage arises that after initial coupling of the movable element with the actuator assembly, the moveable element can with use come to be displaced out of proper alignment, for example, radially relative an axis about which the movable element is reciprocally movable.

Known fluid dispensers suffer the disadvantage that the coupling mechanism for coupling of the movable element and the actuator assembly permits movable elements having a wide variety of physical shapes and sizes to be coupled to the actuator assembly, and thus do not provide a keying or lock out arrangement for limiting replacement reservoirs which can be coupled to the housing to those with movable elements of limited particular shapes and sizes.

Paper dispensers are known in which end plugs for a roll of material are adapted for removable retention in a dispenser such as a paper dispenser disclosed in U.S. Patent 2009/0039099 to Friesen, published Feb. 12, 2009. End plugs for rolls of material which permit slidable insertion of a roll of paper for coupling a roll of paper to a dispenser are disclosed, for example, in U.S. Patent 2008/0230418. The applicant has appreciated that end plugs of the type disclosed by Lind et al suffer the disadvantage that relatively substantial structure including resilient mechanisms is provided as a permanent portion of the housing which are liable to lose their resiliency over time and hence render the dispenser unusable.

SUMMARY OF THE INVENTION

To at least partially overcome these disadvantages of known dispensers, the present invention provides an improved arrangement for removably coupling a removable cartridge carrying product to be dispensed to a dispenser with the removable cartridge carrying a resilient member which prevents movement, preferably radial movement of the removable cartridge relative a catch member unless the resilient member is deflected from an unbiased inherent configuration.

To at least partially overcome the disadvantages of known dispensers, the present invention further provides an improved arrangement for coupling a removable cartridge containing material to be dispensed to a dispenser in which the cartridge requires an annular shape and size within specific ranges defined by an annular cavity within a catch member of the dispenser and/or entrance way or exit way openings of the cavity.

To at least partially overcome these disadvantages of known fluid dispensers, the present invention further provides an improved arrangement for removably coupling a movable element of a piston pump to an actuator mechanism with the movable element including a resilient member which prevents radial movement of the movable element relative a catch member of the actuator mechanism from a coupled orientation unless the resilient member is deflected from an unbiased inherent configuration.

To at least partially overcome these disadvantages of known fluid dispensers, the present invention further provides an improved arrangement for removably coupling a movable element of a piston pump to an actuator mechanism in which the movable element requires an annular shape and size within specific maximums defined by an annular cavity within a catch member of the actuator mechanism, and by entrance way openings and/or exitway openings therefrom.

An object of the present invention is to provide a replaceable element with a resilient member requiring deformation for coupling and/or uncoupling.

Another object of the present invention is to provide a replaceable movable element in a pump mechanism with a resilient member requiring deformation for coupling and/or on coupling of the movable element with the housing.

Another object is to provide a keying arrangement in which a catch member of the actuator mechanism limits the shape and size of the movable elements of a reservoir which can be coupled to the actuator mechanism.

In another aspect the present invention provides a dispenser for dispensing material comprising a housing, a replaceable cartridge containing material to be dispensed, the housing supporting the cartridge in a dispensing position, the cartridge being insertable into said housing to assume said dispensing position and removable therefrom for replacement, the housing including a catch member, the cartridge including an engagement mechanism disposed about an axis to engage the catch member and releasably couple the cartridge to the housing in a coupled orientation, the engagement mechanism comprising a resilient member extending radially outwardly from the cartridge in an unbiased inherent configuration, the resilient member being resiliently deflectable radially from the inherent configuration to deflected configurations of different radial extents than the inherent configuration and biased to return to the inherent configuration when deflected from the inherent configuration, wherein from the coupled orientation on moving the cartridge radially relative the catch member engagement between the catch member and the resilient member deflects the resilient member radially from the inherent configuration to one of the deflected configurations permitting the resilient member and catch member to move radially from the coupled orientation to a radial uncoupled orientation in which the cartridge may be removed from the housing, in the coupled orientation the resilient member while in the inherent configuration engaging with the catch member to prevent moving the cartridge radially relative the catch member from the coupled orientation to the radial uncoupled orientation. Preferably the cartridge is either a fluid containing reservoir or a roll of sheet material.

The present invention provides in another aspect an improved fluid dispenser having a housing and a replaceable reservoir which incorporates as part of a fluid dispensing valve, a movable element. The housing includes a movable actuator assembly for coupling to the movable element. When the actuator assembly and movable element are in a coupled orientation, the movement of the actuator assembly moves the movable element axially on an axis to dispense fluid from the reservoir. When coupled, a resilient member on the movable element while in an unbiased inherent configuration engages with a catch member on the actuator assembly to prevent moving the movable element radially relative the catch member. For uncoupling of the actuator assembly and movable element, the movable element is moved radially relative the actuator assembly. From the coupled orientation on moving the movable element radially engagement between the catch member of the actuator assembly and the resilient member on the movable element deflects the resilient member from the unbiased inherent configuration to a deflected configuration permitting the resilient member and catch member to move radially to become uncoupled. The resilient member preferably extends radially outwardly from the movable element in the unbiased inherent configuration and the resilient member is resiliently deflectable radially from the inherent configuration to deflected configurations of different radial extents than the inherent configuration with the resilient member biased to return to the inherent configuration when deflected from the inherent configuration.

The actuator assembly may be configured such that the reservoir is not only removable from coupling with the actuator assembly by relative movement in a radial direction but may also be coupled to the actuator assembly by being moved in a radial direction relative the actuator assembly.

The actuator assembly may be configured such that the reservoir is removable from coupling with the actuator assembly by relative movement in a radial direction and may also be coupled to the actuator assembly by being moved in an axial direction relative the actuator assembly. In this regard, the actuator assembly may be configured such that if the reservoir is inserted into the housing in a axial uncoupled orientation relative the actuator assembly, the first activation of the dispenser moves the actuator assembly axially relative to the movable element to a position where the movable element and actuator assembly are secured together in the coupled orientation. The dispenser may thus permit insertion of a replaceable reservoir into the housing with the movable element in various axial positions relative the reservoir.

The dispenser of the present invention advantageously permits easy replacement and removal of the reservoir. The reciprocally movable element includes a catch assembly. The catch assembly is configured to permit movement of the actuator assembly radially relative to the reciprocally movable element from a coupled orientation to an uncoupled orientation. Once in the coupled orientation, the catch assembly prevents movement of the actuator assembly relative to the movable element to return to the uncoupled orientation unless a resilient member on the movable member is suitably deflected.

Preferably, the reciprocally movable member is a piston element which, on insertion of the reservoir into the housing, is positioned coaxially aligned with the actuator assembly. The piston element includes a resilient member. A catch member of the actuator assembly is to be engaged with the resilient member of the piston element to couple the piston element to the actuator assembly in a coupled orientation. The resilient member on the piston element is deflectable on radial movement of the piston element relative catch member of the actuator assembly to permit uncoupling of the catch member of the actuator assembly with the piston element.

The resilient member on the piston element preferably extends radially of the piston element circumferentially about the piston element. Deflection of the resilient member permits the catch member of the actuator assembly to move past the resilient member for uncoupling. When the resilient member assumes its unbiased condition in the coupled orientation, it prevents removal of the piston element from catch member of the actuator assembly by movement in a direction radially of axis and the piston element is reciprocally movable with the actuator assembly to dispense fluid. The resilient member may comprise a set of resilient finger members disposed circumferentially about the piston element extending from fixed ends of the finger member coupled to the piston element to distal ends, and sized to be deflected radially inwardly to pass through a radially extending exitway opening in the catch member of the actuator member. The finger member in their unbiased positions prevent passage of the finger members radially through the exitway opening.

Preferably, the exitway has camming surfaces about the exitway opening which are to be engaged by the finger members on the piston element such that on radial movement of the piston element from the uncoupled orientation, engagement between the camming surfaces and the finger members urges the finger members to adopt a deflected configuration permitting the finger members to pass radially through the exitway to a radial uncoupled orientation.

In an aspect, the present invention provides a dispenser for dispensing fluid comprising:
a housing,
a fluid containing reservoir having an outlet,
the housing supporting the reservoir in a dispensing position,
the reservoir being insertable into said housing to assume said dispensing position and removable therefrom for replacement,
a valving mechanism disposed across the outlet for dispensing fluid from the reservoir, the valving mechanism comprising a reciprocally movable element for reciprocal movement along an axis relative to the housing when the reservoir is in the dispensing position to dispense fluid,
the housing including an actuator mechanism for actuating the reciprocally movable element, the actuator mechanism movable relative the housing between a first position and a second position, the actuator mechanism including a catch member, the movable element including an engagement mechanism to engage the catch member and releasably couple the movable element to the actuator mechanism in a coupled orientation in which movement of the actuator mechanism between the first position and the second position results in axial reciprocal movement of the movable element, the engagement mechanism comprising a resilient member extending radially axially outwardly from the movable element in an unbiased inherent configuration, the resilient member being resiliently deflectable radially from the inherent configuration to deflected configurations of different radial extents than the inherent configuration and biased to return to the inherent configuration when deflected from the inherent configuration, wherein from the coupled orientation on moving the movable element radially relative the catch member engagement between the catch member and the resilient member on the movable element deflects the resilient member radially from the inherent configuration to one of the deflected configuration permitting the resilient member and catch member to move radially from the coupled orientation to a radial uncoupled orientation in which the reservoir may be removed from the housing, in the coupled orientation the resilient member while in the inherent configuration engaging with the catch member to prevent moving the movable element radially relative the catch member from the coupled orientation to the radial uncoupled orientation.

In another aspect, the present invention provides a dispenser for dispensing fluid comprising:

a housing, a fluid containing reservoir having an outlet, the housing supporting the reservoir in a dispensing position, the reservoir being insertable into said housing to assume said dispensing position and removable therefrom for replacement, a valving mechanism disposed across the outlet for dispensing fluid from the reservoir, the valving mechanism comprising a reciprocally movable element for reciprocal movement along an axis relative to the housing when the reservoir is in the dispensing position to dispense fluid, the housing including an actuator mechanism for actuating the reciprocally movable element, the actuator mechanism movable relative the housing between a first position and a second position, the actuator mechanism including a catch member, the movable element including an engagement mechanism to engage the catch member and releasably couple the movable element to the actuator mechanism in a coupled orientation in which movement of the actuator mechanism between the first position and the second position results in axial reciprocal movement of the movable element, the catch member having a side wall which extends axially relative the axis and circumferentially relative the axis to define a central cavity therein coaxially about the axis, a radial exitway extending radially from the cavity through the side wall, in the coupled orientation the movable element located coaxially within the cavity, the engagement mechanism comprising a resilient member carried on the movable element, the resilient member inherently assuming an unbiased inherent configuration, the resilient member being resiliently deflectable from the inherent configuration to deflected configurations and inherently biased to return to the inherent configuration when deflected from the inherent configuration, in the coupled orientation the resilient member while in the inherent configuration engaging with the side wall of the catch member to resist moving the movable element radially relative the catch member from the coupled orientation through the exitway to the radial uncoupled orientation, wherein from the coupled orientation on moving the movable element radially relative the catch member toward the exitway engagement between the catch member and the resilient member on the movable element deflects the resilient member from the inherent configuration to deflected configurations conforming to a shape of the exitway so as to permit the deflected resilient member to move radially from the coupled orientation through the exitway to a radial uncoupled orientation.

In another aspect the present invention provides a dispenser for dispensing material comprising a housing, a replaceable cartridge containing material to be dispensed, the housing supporting the cartridge in a dispensing position, the cartridge being insertable into said housing to assume said dispensing position and removable therefrom for replacement, the housing including a catch member, the cartridge including an engagement mechanism disposed about an axis to engage the catch member and releasably couple the cartridge to the housing in a coupled orientation, the engagement mechanism comprising a resilient member extending radially outwardly from the cartridge in an unbiased inherent configuration, the resilient member being resiliently deflectable radially from the inherent configuration to deflected configurations of different radial extents than the inherent configuration and biased to return to the inherent configuration when deflected from the inherent configuration, wherein from the coupled orientation on moving the cartridge radially relative the catch member engagement between the catch member and the resilient member deflects the resilient member radially from the inherent configuration to one of the deflected configuration permitting the resilient member and catch member to move radially from the coupled orientation to a radial uncoupled orientation in which the cartridge may be removed from the housing, in the coupled orientation the resilient member while in the inherent configuration engaging with the catch member to prevent moving the cartridge radially relative the catch member from the coupled orientation to the radial uncoupled orientation. The dispenser may be a dispenser for the sheet material disposed on a roll the cartridge is a roll of sheet material wound about an elongate core, a first end plug at one end of the core, the engagement member carried on the first end plug such that the core is coaxial with the axis, the housing carrying first journaling surfaces to engage journalled surfaces on the first end plug when the cartridge is in the coupled orientation to journal the core to the housing for rotation about the axis.

BRIEF DESCRIPTION OF THE DRAWINGS

Further objects and advantages of the invention will appear from the following description taken together with the accompanying drawings in which.

DETAILED DESCRIPTION OF THE DRAWINGS

Figure 1:
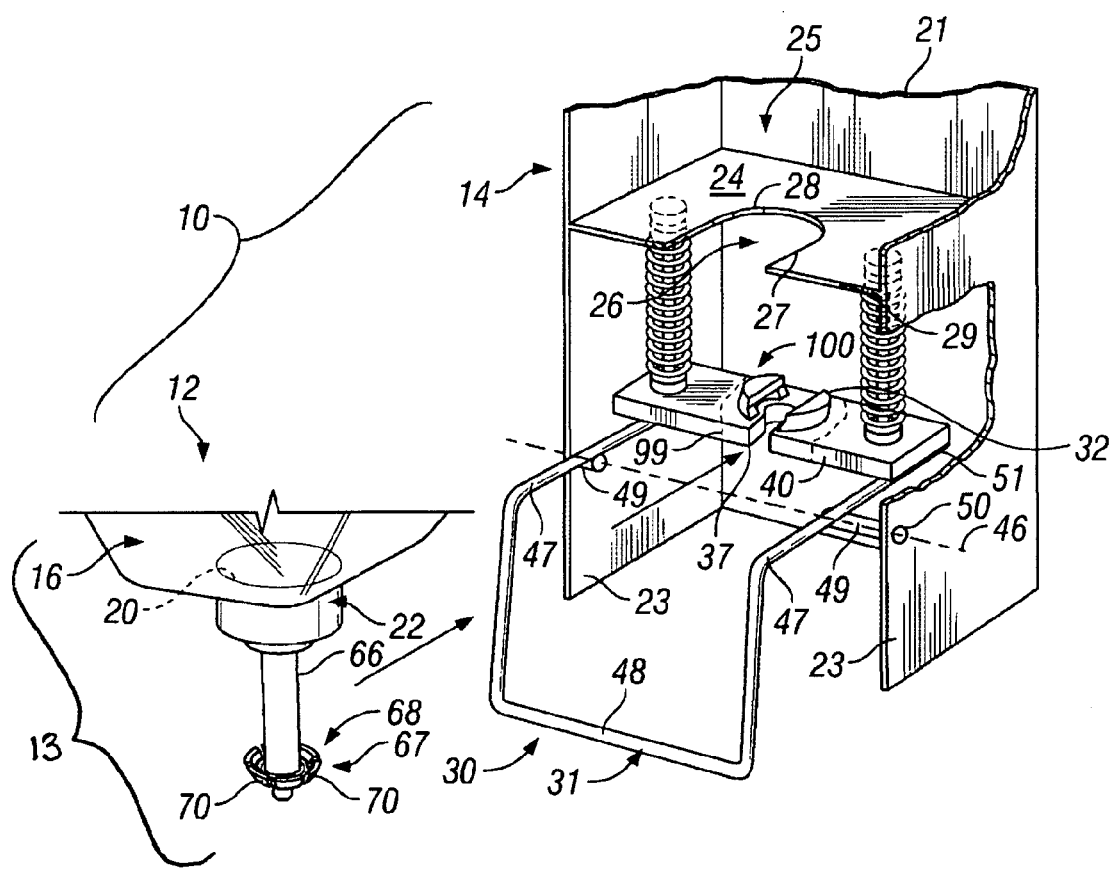
FIG. 1 is an exploded partial perspective view of a first preferred embodiment of a housing and reservoir of a dispenser in accordance with the invention illustrating a reservoir ready for insertion by relative horizontal movement.

Reference is made first to FIG. 1 which shows a dispenser 10 in accordance with a preferred embodiment of the invention. The dispenser 10 comprises a replaceable cartridge 13 and a housing 14.

The reservoir 12, only partially shown, comprises a chamber 16 for holding fluid 18 as, for example liquid soap, which is to be dispensed. An outlet 20 is provided through a lowermost wall 17 of the chamber 16, across which is located a valve assembly 22 to regulate the flow of fluid 18 outwardly therethrough. Preferably the reservoir 12 is made entirely of plastic and is disposable once the supply of fluid 18 is exhausted.

FIG. 1 shows the housing 14 in an open configuration ready for insertion of the reservoir 12. The housing 14 includes a backplate 21 typically adapted for permanent attachment to a wall. A pair of side walls 23 extend vertically forwardly from each side of the backplate 21. A support flange 24 is provided extending horizontally between the side walls 23 so as to define a cavity 25 above the flange 24 between the side walls 23 and backplate 21 to receive the reservoir 12.

The flange 24 has an opening 26 vertically therethrough in the form of a U-shaped slot 27 closed at a rear blind end 28 and open forwardly to the front edge 29 of the flange 24.

An actuator assembly 30 is provided on the housing 14, movable relative to the housing. The actuator assembly 30 includes notably a pivoting lever 31 and an actuator plate 32 mounted to the housing to be vertically slidable. Pivoting of the lever 31 moves the vertically slidable actuator plate 32 linearly on a pair of vertically extending guide rods 33 against the bias of springs 34 disposed about the guide rods 33. The actuator plate 32 has a downwardly directed lower surface 35 and an upwardly directed upper surface 36, each extending normal to the linear path of movement of the actuator plate 32.

The actuator plate 32 has a catch opening 37 vertically therethrough and open forwardly to the front edge 40 of the actuator plate 32.

The two parallel spaced locating rods 33 are fixedly secured at their upper ends 41 to flange 24 and extend downwardly to their lower ends 42 to which respective retaining ferrules 43 are secured. The actuator plate 32 has a pair of cylindrical bores 44 through which the rods 33 pass. The actuator plate 32 is disposed on the rods 33 above the ferrules 43.

Springs 34 are provided about each of the locating rods 33. The springs 34 have an upper end which engage the flange 24 and a lower end which engage the upper surface 36 of actuator plate 32 to resiliently bias the actuator plate 32 away from the flange 24 downwardly toward a fully extended position shown in FIGS. 1 to 3.

The actuator assembly 30 includes the lever 31 which is pivotally connected to the housing 14 for pivoting about a horizontal axis 46. The lever 30 is U-shaped having a pair of side arms 47 connected at their front by a horizontal connecting bight 48. A pair of horizontal stub axles 49 extend laterally outwardly from the side arms 47 and are received in holes 50 through the side walls 23 to journal the lever 31 to the housing for pivoting about an axis 46.

A rear end 51 of the lever 31 engages the lower surface 35 of the actuator plate 32. Manual urging of the bight 48 of the lever 31 rearwardly by a user moves the actuator plate 32 upwardly against the bias of the springs 33 from the extended position shown in FIG. 2 to a retracted position shown in FIG. 4. On release of the lever 31, the force of the springs 33 returns the actuator plate 32 to the extended position.

The opening 26 of the flange 24 is positioned to permit the reservoir 12 to be slid rearwardly inward into the housing 14, in the manner illustrated in FIG. 1. The flange 24 is located such that when the reservoir 12 is slid into the housing 14, the flange 24 abuts and supports the lowermost wall 17 of the fluid chamber 16 to assist in maintaining the reservoir 12 in fluid dispensing position. The flange 24 is received in a slotway 52 between the lowermost wall 17 of the fluid chamber 16 and an upwardly directed shoulder 53 on the valve assembly 22 such that the flange 24 is sandwiched between the wall 17 and the valve assembly 22, thereby preventing axial sliding movement of the reservoir 12 as the dispenser 10 is used. The U-shape of the opening 26 of the flange 24 assists in guiding the reservoir 12 as it is inserted into and removed horizontally from the housing 14.

Figure 2:
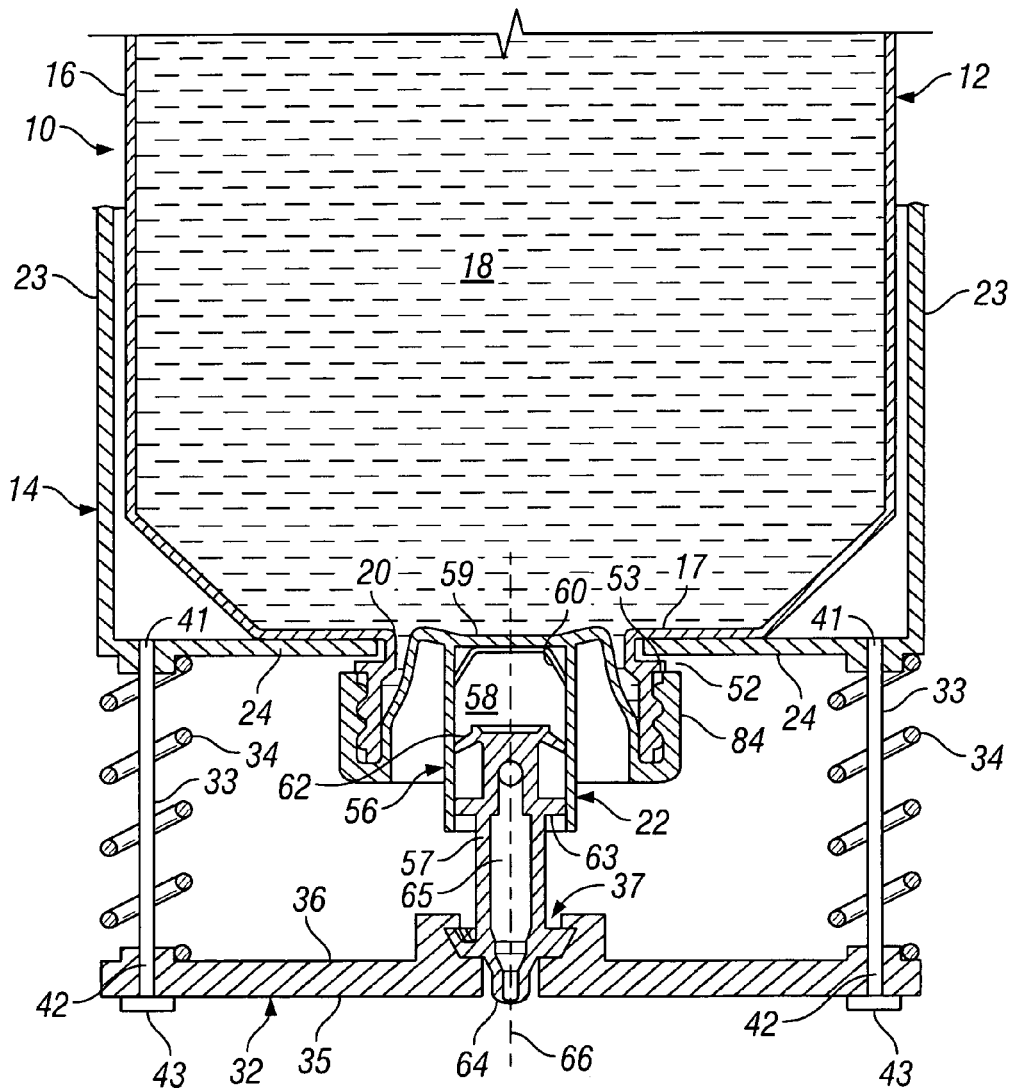
FIG. 2 is a partial cross-sectional front view of the housing and reservoir of FIG. 1 in a coupled orientation with an actuator assembly of the housing and a reciprocally movable piston element of the reservoir in a fully extended rest position.
Figure 3:
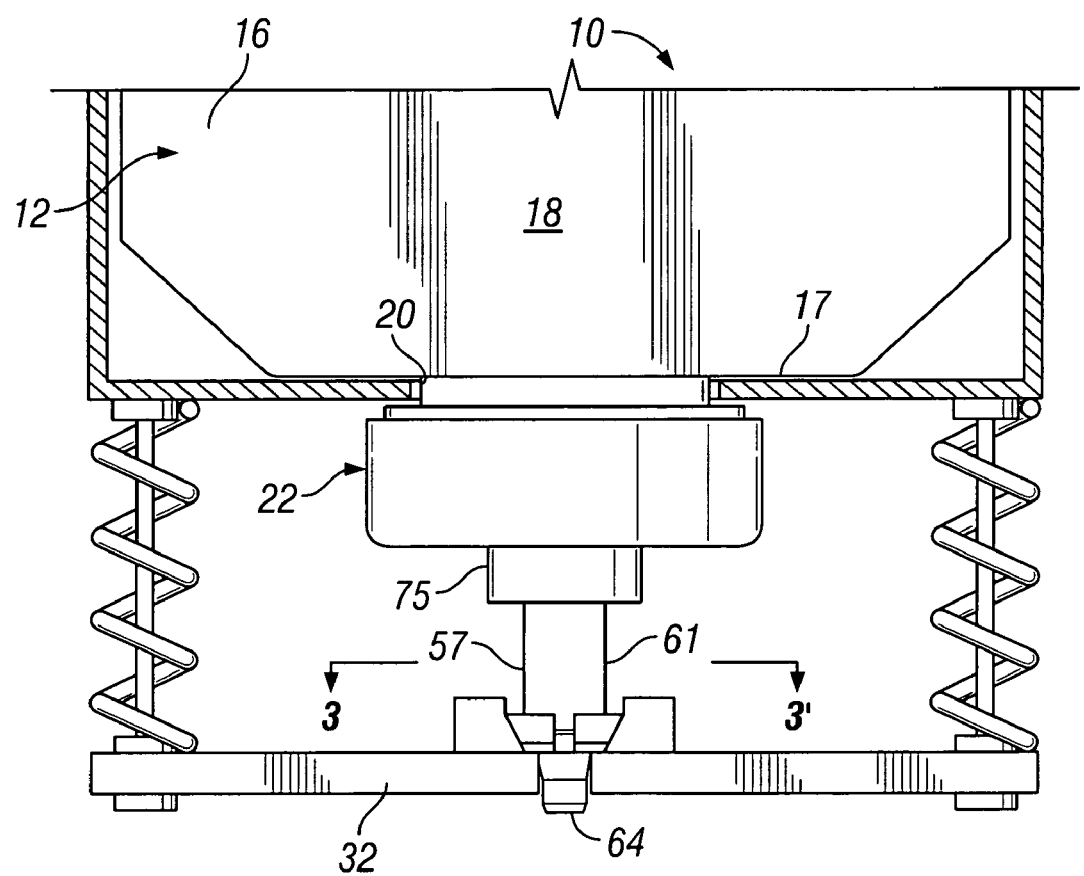
FIG. 3 is a front view of the housing and reservoir as in FIG. 2.

FIG. 2 best shows the reservoir valve assembly 22 as comprising a piston pump of the type described in U.S. Pat. No. 5,165,577 to Ophardt issued Nov. 24, 1992. The valve assembly 22 includes piston chamber forming member 56 and a piston element 57. The piston chamber forming member 56 forms a dispensing chamber 58 having at an innermost end an inlet opening 59 opening into the chamber 16. A one-way inlet valve 60 is provided across the inlet opening 59 which permits fluid 18 to flow outwardly from the chamber 16 into the dispensing chamber 58 but prevents flow from the dispensing chamber 58 to the chamber 16. The reciprocally movable piston element 57 is coaxially slidably received within the dispensing chamber 58 for reciprocal relative sliding about an axis 66. The piston element 57 has an axially extending hollow stem 61 which carries a flexible inner flange 62 and an outer sealing flange 63 to engage the inner wall of the dispensing chamber 58 in a manner that reciprocal movement of the piston element 57 axially along the axis 23 in the dispensing chamber 58 causes fluid 18 to flow from the chamber 16 outwardly past the one-way valve 60 and out an outermost end 64 of the piston element 57 via an internal passageway 65 through the stem 61.

Figure 6:
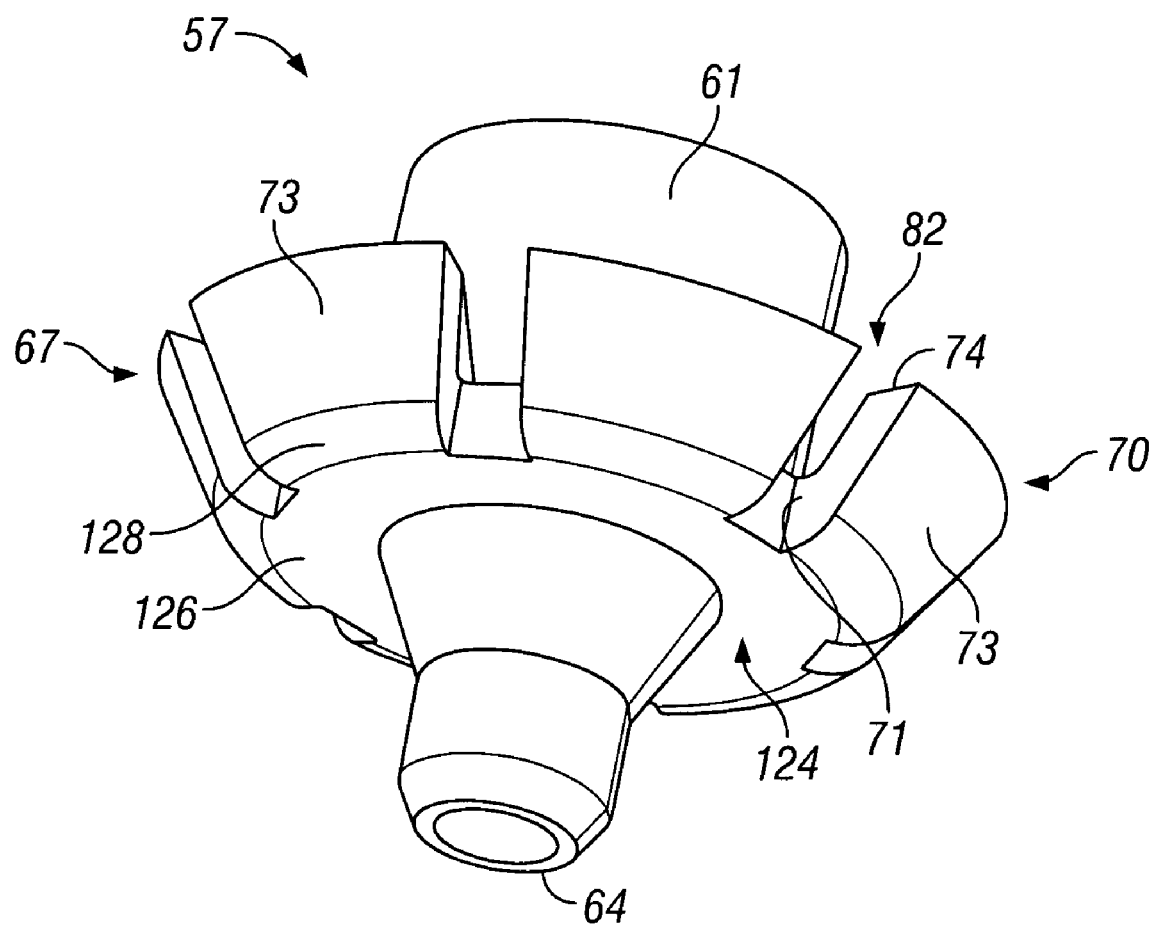
FIG. 6 is a bottom pictorial view of the truncated piston element shown in FIG. 5.
Figure 7:
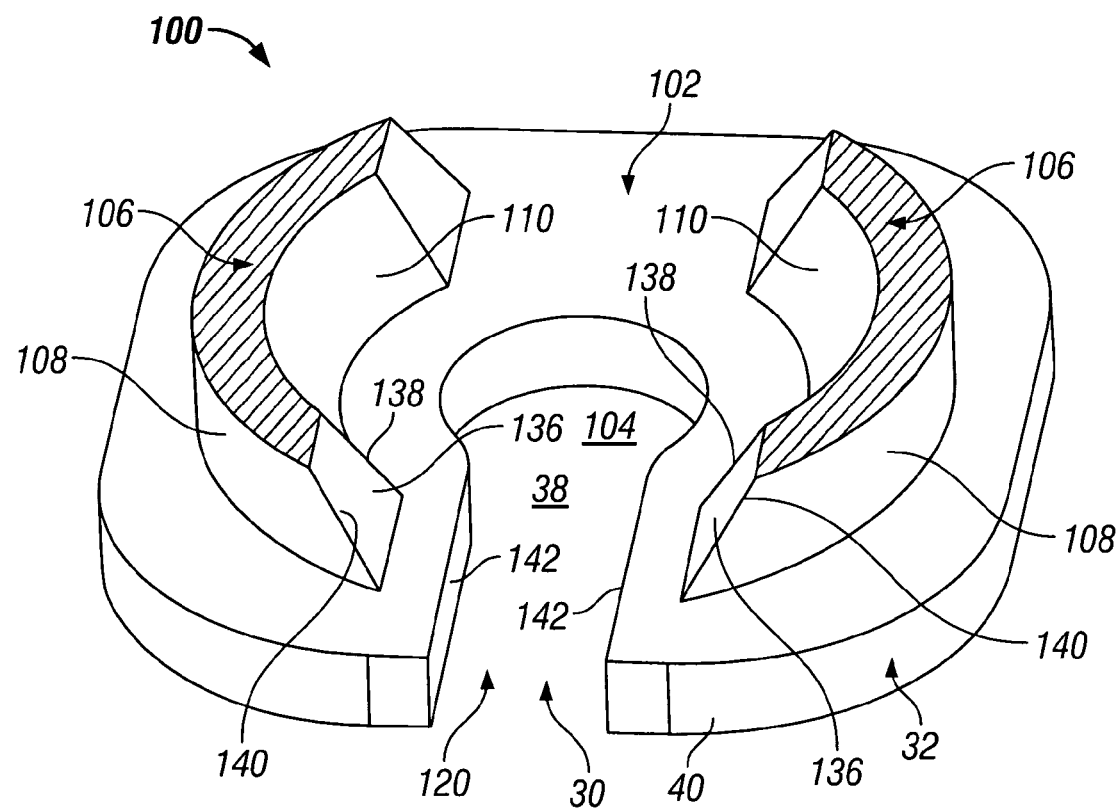
FIG. 7 is a top pictorial view of the central portion of the catch member shown in FIG. 5 but merely below section line 7-7' shown in FIG. 10.

The piston element 57 has on the stem 61 proximate its outermost end 64 a catch assembly comprising a resilient engagement member 67. The resilient engagement member 67 comprises a plurality of circumferentially spaced resilient finger members 70. As best seen in FIGS. 6 and 7, each of the finger members 70 is coupled to the stem 61 at a radially inner end 71 and extend radially outwardly and axially inwardly to a distal end 72. Each finger member 70 on the outer engagement flange 67 presents an axially outwardly and radially outwardly directed caroming surface 73. Each finger member 70 has at its distal end 72 an inwardly directed shoulder 74. Each finger member 70 has an inherent bias to assume an extended position as seen in FIGS. 1 to 8 but to be deflectable to have its distal ends deflected radially inwardly as shown in FIG. 9.

As seen in FIGS. 2, 3, 5, 6, 9 and 12, the piston element 57 is to be engaged with the actuator plate 32 in a coupled orientation.

With the piston element 57 engaged with the actuator plate 32 in the coupled orientation as seen in FIG. 2, reciprocal movement of the actuator plate 32 between the extended position and the retracted position results in corresponding movement of the piston element 57 to dispense fluid from the reservoir.

Figure 5:
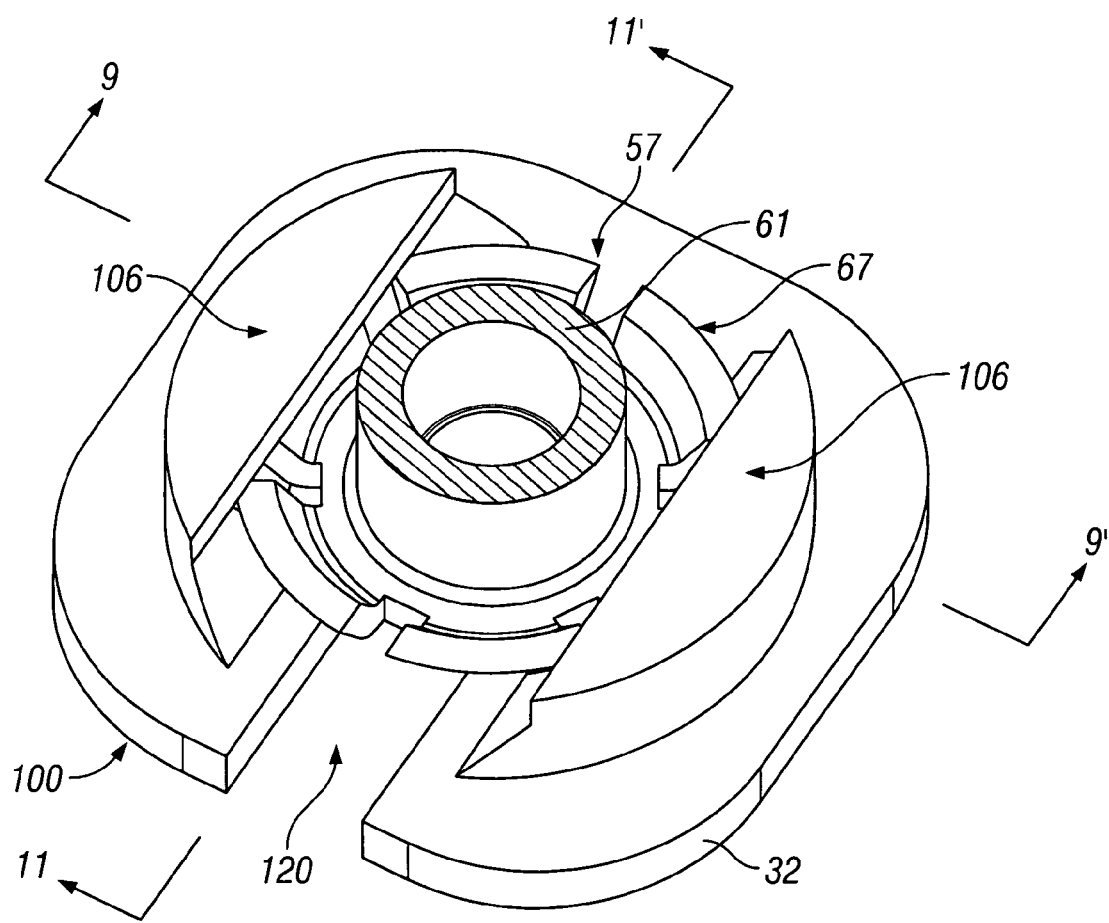
FIG. 5 is a schematic, cut-away partially cross-sectioned pictorial view of the piston element and actuator member shown in a coupled orientation in FIG. 3 with the piston element merely below section line 3-3' in FIG. 3 and merely schematically illustrating a central portion of the actuator plate within the dashed lines shown on FIG. 1.

Reference is made to FIG. 5 showing in an enlarged schematic view selected portions of the piston element 57 and the actuator plate 32. In FIG. 5, for convenience of illustration, merely portions of the piston element 57 and the actuator plate 32 are shown. In FIG. 5, merely a central portion of the actuator plate 32 indicated in FIG. 1 as within dashed lines 99 is shown schematically as a catch member generally indicated as 100. Similarly in FIG. 5, the piston element is shown merely below a horizontal cross-section indicated by section line 3-3' in FIG. 3 so the hollow stem 61 is shown cross-sectioned and truncated. Each of FIGS. 6 to 13 also only show the truncated catch member 57 and the central portion of the actuator plate 32 as in FIG. 5.

The catch member 100 serves to define a cavity 102 therein which is adapted to receive the forward portions of the piston element 57 and, most particularly, the engagement member 67. This cavity 102 includes coaxially therewith a central opening 104 through the actuator plate 32 disposed coaxially about the axis 66. A pair of upstanding catches 106 is provided on opposite sides of the opening 104 with each catch 106 having a side wall 108 with an interior surface 110 facing inwardly and defining the cavity radially therein. Each catch 106 has an inner end wall 112 which has an axially outwardly directed interior surface 114. The inner end wall 112 is axially spaced from the actuator plate 32 which forms, in effect, an outer end wall spaced axially from the inner end wall 112 and with such actuator plate/outer end wall 32 providing as the upper surface 36 of the actuator plate 32 an axially inwardly directed interior surface.

Figure 10:
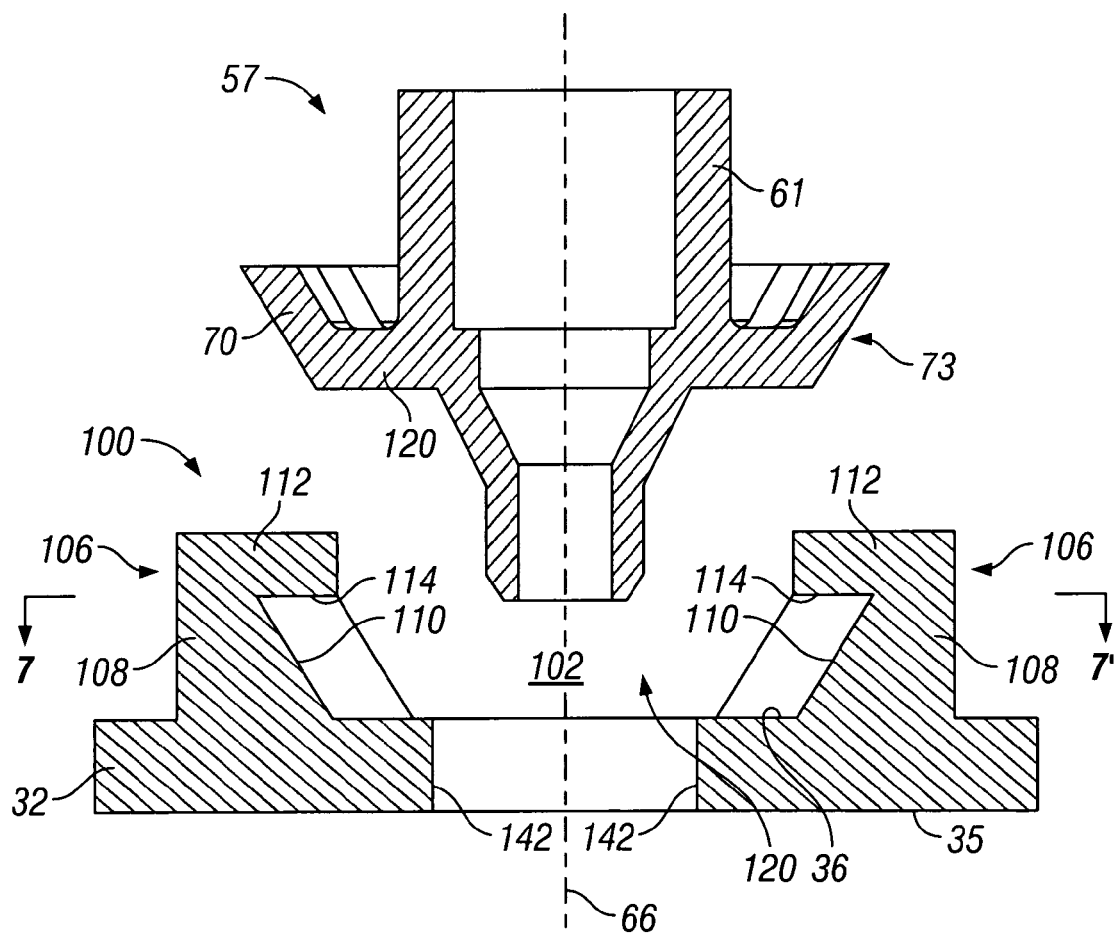
FIG. 10 is a cross-sectional side view the same as that in FIG. 9 along section line 9-9' in FIG. 6 but with the truncated piston element in an axial uncoupled orientation relative the central portion of the actuator plate.

As may be seen, for example, in the cross-sectional view of FIG. 10, the cavity 102 is defined radially between the interior surfaces 110 of the side walls 108 and axially between the interior surfaces 114 of the inner end wall 112 and the upper surface 36 of the outer end wall/actuator plate 32. As seen, for example, in FIG. 8, an exitway 120 is provided from the cavity 102 opening radially forwardly throughout its axially extent relative the axis 66 between the catches 106 through the inner end walls 112, between the side walls 108 and through the actuator plate/outer wall 32.

Figure 11:
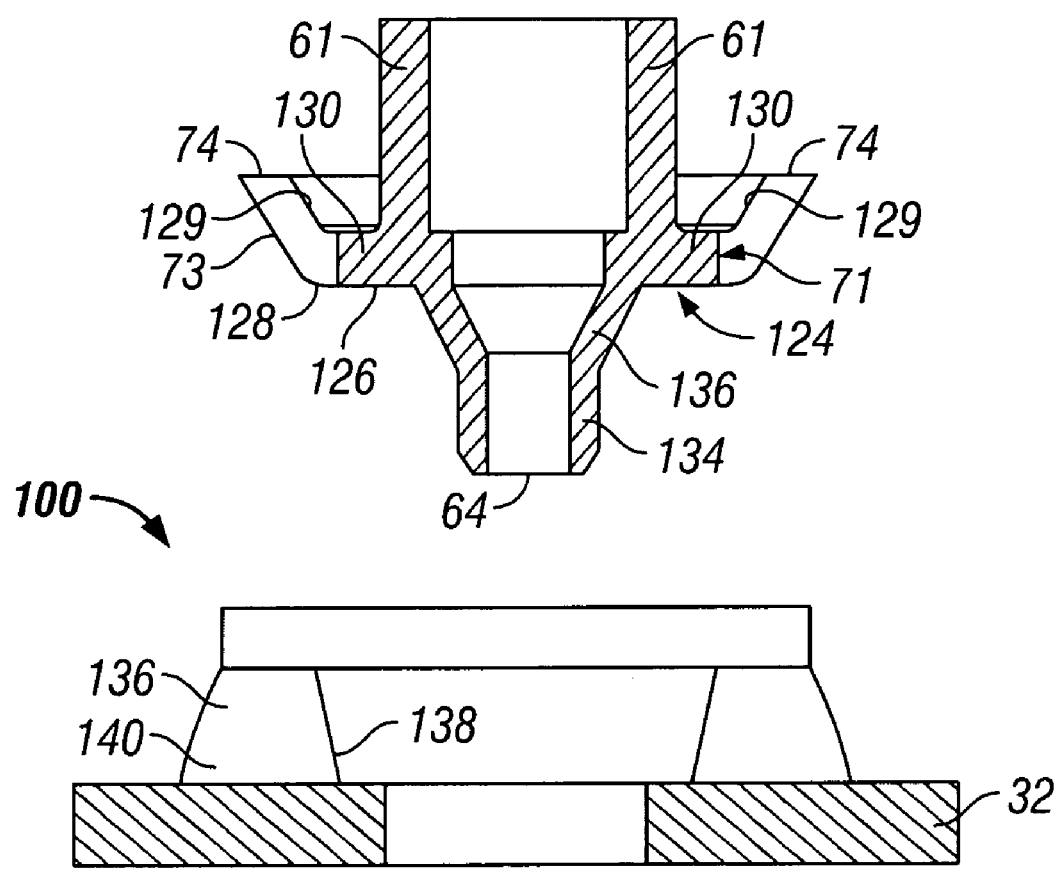
FIG. 11 is a cross-sectional side view similar to FIG. 10 but along a section line 11-11' in FIG. 5.

As may be seen, for example, from FIGS. 6, 10 and 11, the stem 61 has a radially outwardly extending annular flange 124 which carries finger members 70 at a radially outwardly directed end of the flange 124. The flange 124 is provided with a radially extending axially outwardly directed shoulder surface 126 which merges into an outer surface of the finger members firstly as a curved surface portion 128 which merges into a generally frustoconically disposed camming surface 73. The camming surface 73 ends at its inner end at the axially inwardly directed radially extending shoulders 74. The inner surface of the finger member 70 is shown to have a generally frustoconical portion 129 which merges at its lower end into an inner shoulder surface 130 on the flange 124.

Outwardly from the flange 124, the stem 61 extends axially forwardly as a frustoconical locating section 136 tapering outwardly and merging with a generally cylindrical outlet section 134 carrying the discharge outlet 64 at an axially outer end thereof.

The cavity 102 of the catch member 100 is provided to have a shape corresponding closely to the shape of the forward portions of the piston element 57 to be received therein. The interior upper surface 36 of the outer end wall 32 inside the cavity 102 closely corresponds to the size of the shoulder surface 126 of the flange 124 on the piston element 57. The interior surface 114 of the inner end wall 112 closely conforms to the shape and size of the shoulder 74 of the finger members 70 of the piston element.

As best seen in FIG. 7, the exitway 120 extends through the side walls 108 with the side walls 108 ending at a laterally directed cam surface 136 having an interior edge 138 and an exterior edge 140. Each of the frustoconical interior surfaces 110 of the side walls 108 ends forwardly at the interior edge 138.

Figure 8:
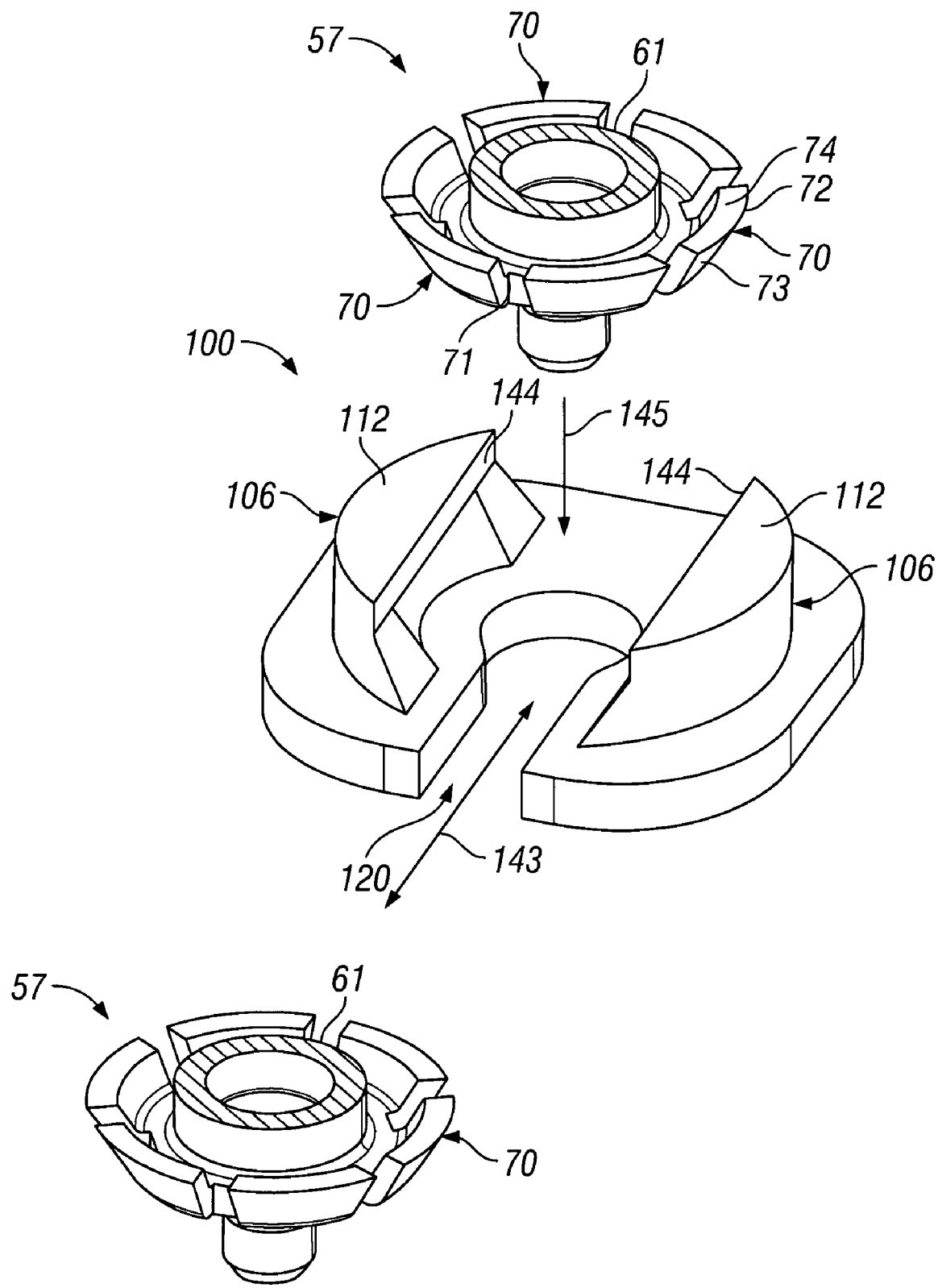
FIG. 8 illustrates the assembly shown in FIG. 5 with the truncated piston element shown twice, firstly in an axial uncoupled orientation relative to the central portion of the actuator plate and, secondly, in a radial uncoupled orientation.
Figure 9:
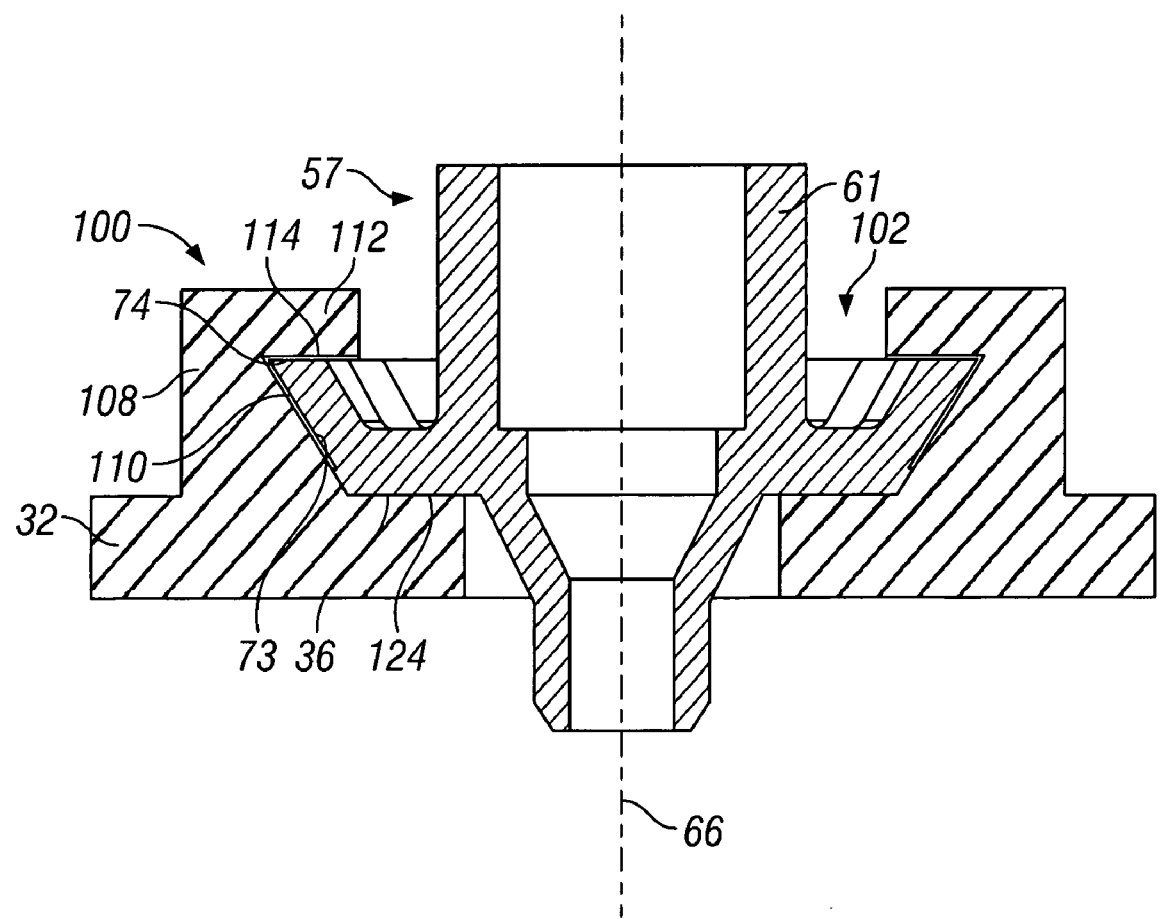
FIG. 9 is a vertical cross-sectional view along section line 9-9' in FIG. 5.

Reference is made to FIG. 8 which schematically shows the catch member 100 with the piston element 57 disposed in two different uncoupled orientations. Firstly, the piston element 57 is shown disposed forwardly of the catch member 100 in a radial uncoupled orientation from which radial uncoupled orientation the piston member 57 may be moved radially horizontally in the directions indicated by the arrow 142 from the radial uncoupled orientation into a coupled orientation and from the coupled orientation radially to the radial uncoupled orientation. FIG. 8 also shows the piston element 57 disposed in an axial uncoupled orientation from which by movement axially in the direction of the arrow 144 may be moved from the axial uncoupled orientation to the coupled orientation. The coupled orientation is shown, for example, in each of FIGS. 5, 9 and 12.

Figure 12:
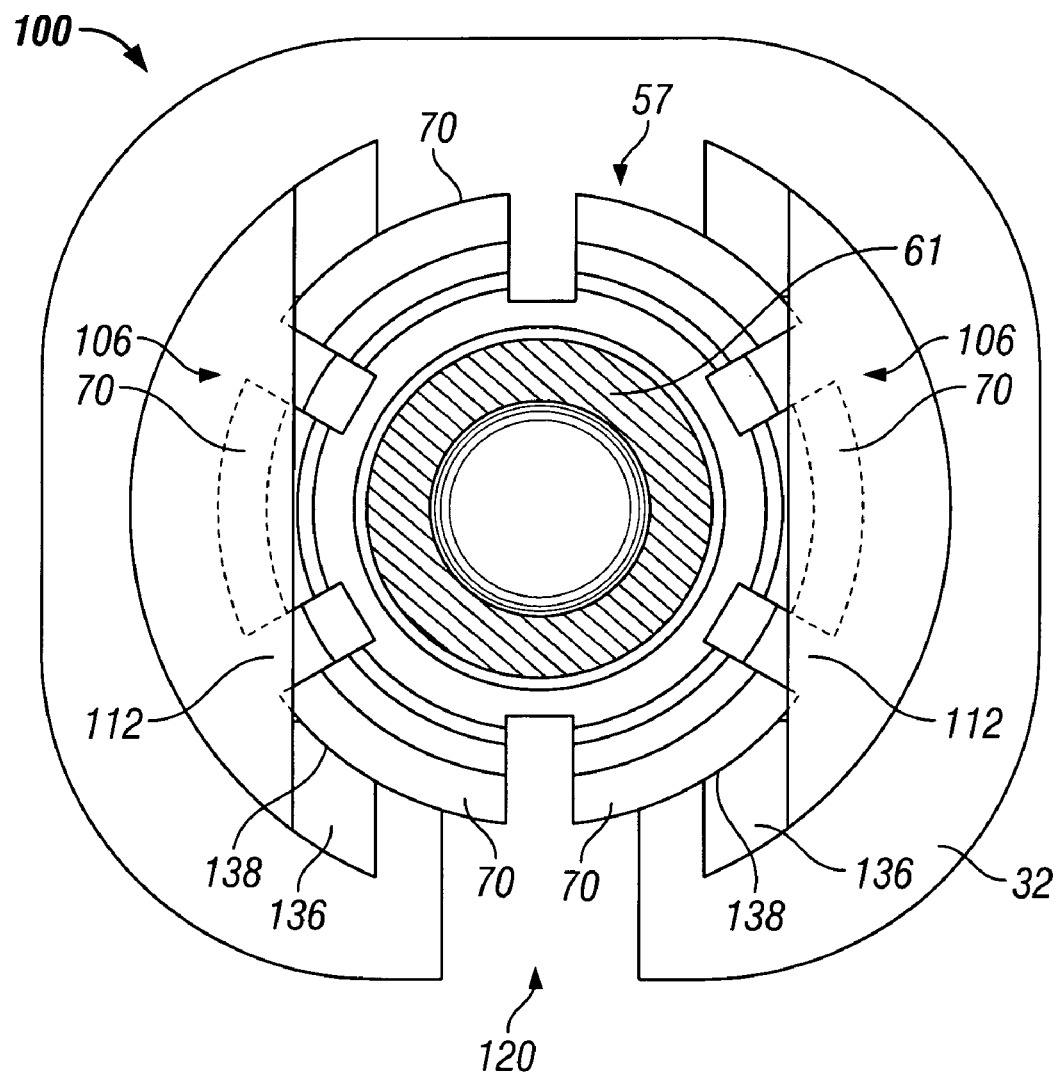
FIG. 12 is a cross-sectional top view of the assembly shown in FIG. 5 in the coupled orientation.
Figure 13:
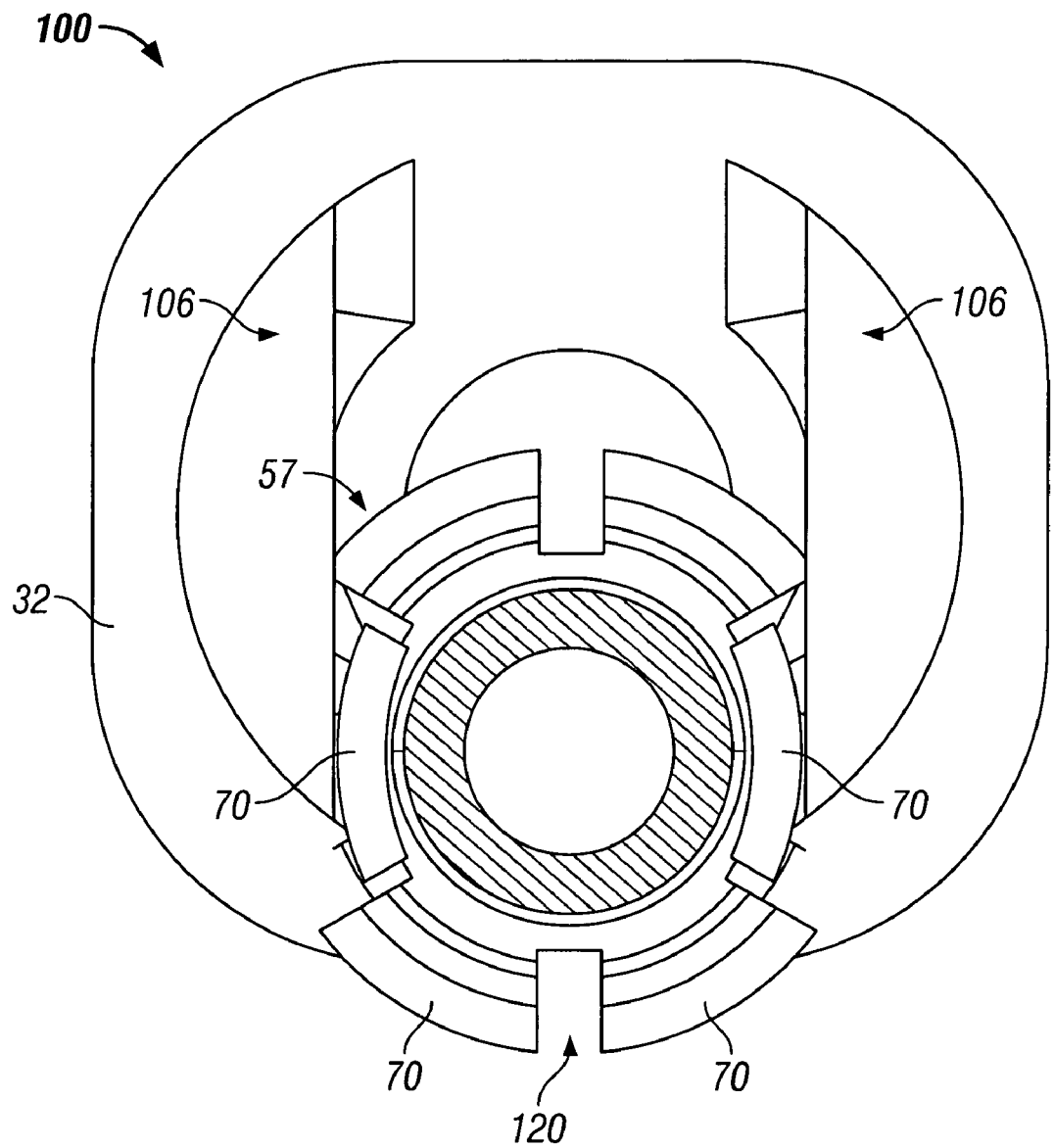
FIG. 13 is a top view the same as FIG. 12 but with the truncated piston element having been moved radially forwardly from the uncoupled orientation.

FIG. 12 shows a top view of FIG. 5 with the piston element 57 in the coupled orientation with the catch member 100. As can be seen in the dashed lines in FIG. 12, two of the finger members 70 are seen to underlie the inner end wall 112, with the shoulder 74 of the finger members 70 closely engaging the interior surface 114 of the upper end wall 112, as seen in FIG. 9 in cross-section with the camming surface 73 closely engaging the frustoconical interior surface 110 of the side walls 108 and with the flange 124 closely engaging the upper surface 36 of the outer end wall 32. From the coupled orientation, the piston element 57 may be removed from engagement with the catch member 100 by relative movement of the piston element 57 radially relative to the axis 66. In such radial movement, the camming surfaces 73 on the resilient fingers 70 engage the cam surfaces 136 and notably their interior edge 138 and as the piston element 57 is moved radially forwardly such engagement causes the resilient finger members 70 on opposite sides of the exitway 120 to be deflected radially inwardly so as to permit the deflected resilient fingers 70 to be moved radially through the exitway 120. FIG. 13 illustrates a condition in which the piston element 57 has been moved from a coupled orientation radially forwardly and two opposed finger members 70 adjacent each of the catches 106 has been deflected radially inwardly sufficiently that these finger members 70 may pass radially forwardly through the exitway 120.

In radial movement forwardly from the coupled orientation shown in FIG. 12 with the finger members 70 in an unbiased inherent configuration, the finger members 70 come to be deflected to deflected configurations of different radial extents than the inherent configuration. From such deflected configurations, each of the finger members 70, due to its inherent resiliency are biased to return to the inherent configuration. From the coupled configuration shown in FIG. 12, on initial moving radially forwardly, the engagement of the forwardmost portions of the frustoconical interior surfaces 110 of the side walls 108 will assist in urging the finger members 70 radially inwardly at least during initial radial movement of the piston element 57. After initial movement, engagement between the camming surface 73 on the finger members 70 and the interior edges 138 of the camming surfaces 136 will cause additional deflection of the finger members 70 and as the piston member 57 moves further outwardly, the camming surface 73 of the finger members 70 will come to ride on the camming surface 136 and on later exiting the entranceway 120 will come to ride and engage on the exterior edges 140 of the camming surface 136.

The exitway 120 is defined by a slotway 38 through the outer end wall 32 from the front edge 40 of the actuator plate 32 into the central opening 104. The slotway 38 has side walls 142 which are spaced sufficiently such that they do permit passage of the frustoconical locating section 136 and the cylindrical outlet section 134 of the piston element 57 radially therethrough. Similarly, as shown, side wall surfaces 144 of the exitway 120 carried on the inner end walls 112 are spaced a sufficient distance radially that they permit the movement of the stem 61 radially forwardly therethrough. From the radially uncoupled orientation shown in FIG. 8, the piston element 57 may be moved radially rearwardly to the coupled orientation. In such radial inward movement, the cam surface 136 of the side walls 108 on either side of the exitway 120 engage the camming surface 73 on the finger members 70 to deflect the finger member 70 radially inwardly such that as seen in FIG. 13, opposed finger members 70 are disposed radially inwardly sufficiently that they may move inwardly past the camming surfaces 136 and into the cavity 102. As the piston element 57 moves from the position of FIG. 13 towards a coaxial position within the cavity, the finger members 70 due to their inherent resiliency assume their unbiased inherent configuration. In one sense, therefore, on radial movement of the piston element 57 from the uncoupled orientation to the coupled orientation, the finger members 70 are deflected to the deflected configurations and subsequently snap back to assume their inherent configuration.

The piston element 57 in a coupled orientation resists movement from the coupled orientation firstly, in an axial direction by reason of the shoulders 74 of the finger members 70 engaging the interior surfaces 114 of inner end walls 112, the shoulder surface 126 of the flange 124 engaging the upper surface 36 of outer end wall 32, as well as the camming surfaces 73 of the fingers 70 engaging the interior surfaces 110 of the side walls 108. In a coupled orientation, movement of the piston element 57 radially relative to the catch member 100 is resisted by the finger members 70 in the inherent configuration engaging the interior surfaces 110 of the side walls 108.

Having regard to FIG. 8, the piston element 57 may also be moved from the axially uncoupled orientation shown in FIG. 8 to the coupled orientation by relative axial movement. On such axial movement, the camming surfaces 73 on the finger members 70 come to engage the side wall surfaces 144 of the inner end wall 112 so as to deflect the finger members 70 from their unbiased inherent configuration to deflected configurations of different radial extents than the inherent configuration permitting the finger members 70 to pass axially past the inner end wall 112 with the cylindrical outlet section 134 and the frustoconical locating portion 136 of the piston element to extend coaxially downwardly into the central opening 104 of the outer wall 32. In such axial insertion, the piston element 57 may be considered to move downwardly through an axially extending entranceway bordered by the side wall surfaces 144 of the inner end wall 112. Finger members which are deflected to deflected configurations on movement between the side wall surfaces 144 of the inner end wall 112 will snap back to assume their inherent configuration once the camming surface 73 on the finger members 70 passes axially outwardly below the axially outwardly directed interior surface 114 of the inner end wall 112. As seen in FIG. 9 in the coupled orientation, the cavity 102 is formed to have interior surfaces including the entire interior surface 114 of the inner end wall 112, the entire interior surface 110 of the side wall 108 and portions of the interior surface 36 of the outer end wall 32 to be coaxially about the axis and forming, in effect, keyway portions which lie in a first rotational surface defined by rotation of a corresponding first shape about the axis 66. Similarly, key portions of the exterior surface of the piston element 67 may be considered to lie in a second rotational surface defined by rotation about the axis 66, when the piston member is coaxial about the axis 66, of a second shape substantially having the same shape as the first shape. Providing the cavity 102 to have keyway portions corresponding in shape to the key portions of the exterior surfaces of the piston element 57 is considered advantageous to limit insertion into the cavity 102 of piston elements which do not have a rotational shape falling within the confines of a shape defined by the keyway portions.

In this regard, the rotational shape of the key portions of the exterior surface of the piston element 57 can be considered to represent a solid of revolution when rotated about the axis. The catch member 100 has interior walls which sufficiently define the cavity 102 to only permit piston element 57 to be received in the cavity 102 when the solid of revolution of the piston element is of a size, shape and configuration to be received within the cavity, that is, within what may be considered a solid of revolution of the cavity 102 when rotated about its axis. Insofar as the solid of revolution of a piston element does not fall within the confines of the solid of revolution of the cavity then the piston element is excluded from use. The relative keyway shape of the cavity 102 determines what particular rotational shape or solid of revolution of key portions of the piston element 57 may be received therein. The preferred embodiments show the rotational shape of the key portions of the piston element 57 being substantially the same as the rotational shape of the cavity 102, however, this is not necessary and the key portions of the piston element 57 merely need to have a shape, preferably a rotational shape or solid of revolution which permits the key portions of the piston element 57 to fit into the cavity 102 preferably in any rotational portion about the axis.

The preferred embodiment illustrated shows the resilient engagement flange 67 as comprising a plurality of discrete circumferentially spaced finger members. This is not necessary. For example, rather than have separate finger members 70 with slots 82 separating the finger members, the finger members could be replaced by a continuous annular member, however, with such member having a resiliency which permits radial deflection to suitable deflected configurations.

The cavity 102 and the portions of the piston element 57 to be received within the cavity 102 effectively forms a three-dimensional keyway and a complementary key with entrance or exit to the keyway requiring deflection of resilient portions. It is to be appreciated that such entrance or exit to the keywall could also be accommodated by deflection of the key, by deflection of the keyway or by deflection of both the keyway and the key. With the keyway portions of the catch member 100 and key portions of the piston element 57 each being defined by rotational surfaces rotated about the axis 66, the piston element 57 may in any relative position rotated about the axis 66 be engaged within the cavity 102. This is preferred, however, not necessary and various arrangements may be provided so as to require for proper insertion of the piston element 57 into the cavity 102 that the piston element 57 be rotated about the axis 66 to one or more desired rotational positions.

FIG. 1 is intended to illustrate the reservoir assembly including the reservoir 16 and the valve assembly 22 in a radial uncoupled orientation ready for coupling to the housing 14 by merely radial rearward movement. From the position shown in FIG. 1, initial horizontal rearward sliding of the entirety of the reservoir 12 will result in the flange 24 of the housing 14 to be received in the slotway 52 between the lowermost wall 17 of the fluid chamber 16 and the upwardly directed shoulder. With the piston element 57 located in a suitably extended position relative the piston chamber forming member 56, the piston element 57 and the catch member 100 will be in a radial uncoupled orientation, from which by continued further horizontal rearward sliding of the reservoir 12 and valve assembly 22, the piston element 56 may have its fingers 70 deflected and enter the cavity 102 to assume the coupled orientation.

Figure 4:
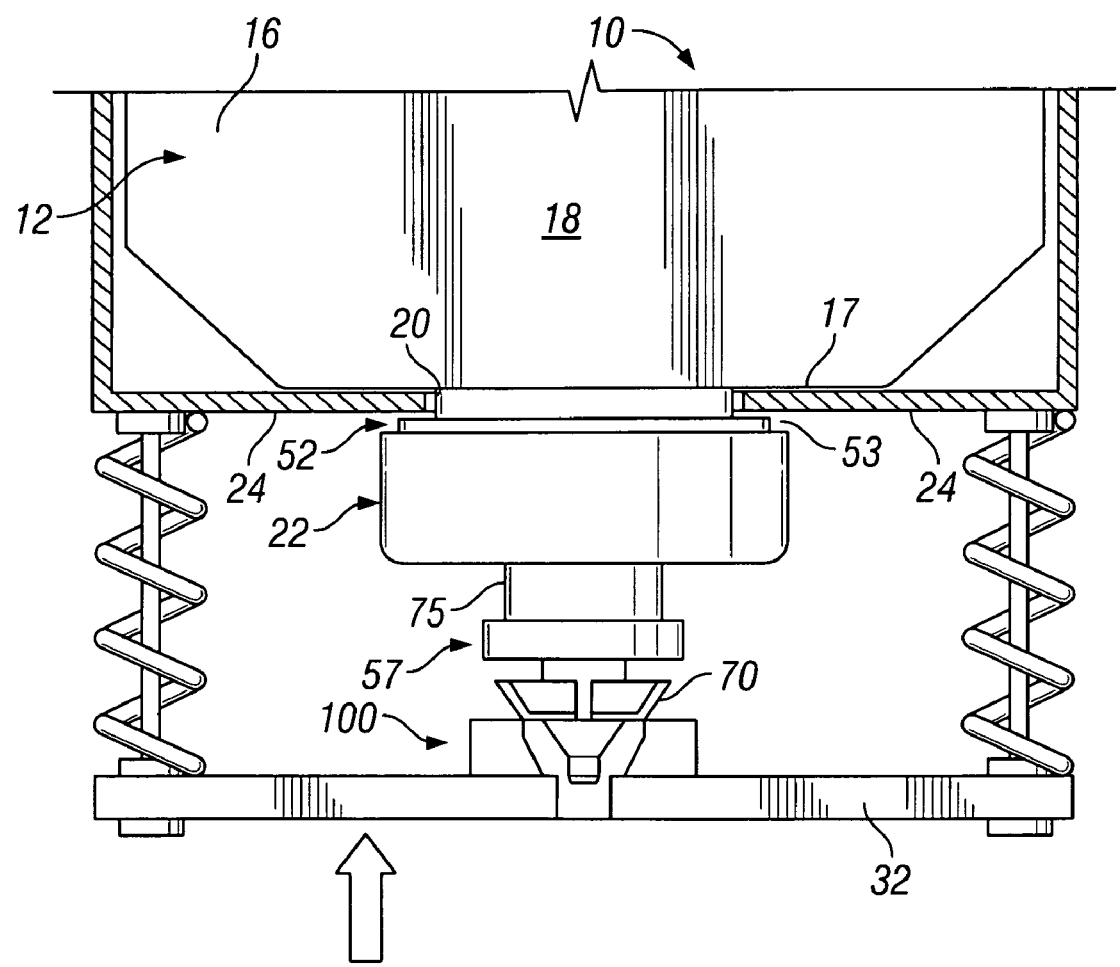
FIG. 4 is a front view housing and reservoir similar to FIG. 3 but with the piston element in an axial uncoupled orientation above the actuator assembly and with the actuator assembly moved from the fully extended rest position partially towards the fully retracted position to engage the piston element.

Reference is made to FIG. 4 which illustrates a situation which arises when the reservoir 12 is in inserted into the housing 14 by horizontal rearward sliding with the piston element 57 in a fully retracted position. The flange 24 of the housing is received in the slotway 52 between the lowermost wall 17 and the upwardly directed shoulder 53 of the valve assembly 22. However, with the piston element 57 in the retracted position, the finger members 70 of the engagement member 67 of the piston element 57 are disposed in the axial uncoupled orientation vertically above the catch member 100 carried by the actuator plate 32. From the position of FIG. 4, in first operation of the dispenser, that is, as by manual movement of the lever 31, the actuator plate 32 is moved from its position below the outer engagement member 67 vertically upwardly as indicated by the arrow in FIG. 4. The catch member 100 engages the resilient finger members 70 of the engagement member 67, and with such engagement, the resilient finger members 70 are deflected radially inwardly permitting the piston element 57 to enter and be engaged in the catch member 100 adopting the coupled configuration.

In the actuator plate 32 moving upwardly as illustrated by the arrow in FIG. 4, the catch member 100 on first engagement with the finger members 70 will urge the piston element 57 upwardly, as possible, to place the piston element 57 in a fully retracted position in which upward movement of the piston element 57 relative to the piston chamber forming member 56 is prevented as by an inner end of the piston element 57 engaging the inner end of the chamber 58 in the piston chamber forming member 56.

With the piston element 57 in the coupled orientation coupled to the actuator plate 32, in a cycle of operation after manual release of the lever 31, the springs 33 will return the actuator plate 32 and the piston element 57 together to the extended position.

Reference is made to FIG. 6 which best shows the resilient finger members 70. In the preferred first embodiment, six finger members 70 are provided each representing an equal segment about the central axis 66 through the piston element 57 and each disposed uniformly spaced from each other by a slot 82.

The slot 82 is of a circumferential extent that the distal end 72 of each finger member 70 may be deflected radially a sufficient extent for the finger members 70 to pass through the exitway 120 without circumferential side portions of the distal ends 72 of adjacent finger members 70 engaging. Providing the finger members 70 to extend circumferentially about the outer end of the piston element 57 permits the piston element 57 to have fingers 70 which will engage with the catch member 100 irrespective of the relative rotational position of the piston element 57 within the piston chamber forming member 56.

In the preferred embodiments illustrated, for example, in FIG. 1, the piston element 57 is preferably injection moulded from a plastic material as a unitary element. The entirety of the reservoir 12 and its pump assembly 22 is preferably disposable as a unit after the contents of the reservoir have been dispensed. The resilient fingers 70 of the piston element 57 therefore merely need to have resiliency which permits coupling with the actuator plate 32 once or at least not more than a few times since an individual reservoir 22 with its disposable pump assembly 22 is typically only expected to be coupled to the housing a single time. Thus, the plastic materials from which the resilient fingers 70 are constructed need not be capable of being deflected any significant number of times and still retain their resiliency. Thus, the resilient fingers 70 may be formed from a relatively inexpensive plastic material which, while having some inherent resiliency, need not maintain that resiliency over repeated cycles of deflection. The piston element 57 or at least substantial portions thereof including the engagement member 67 which carries the resilient fingers 70 may preferably be formed as a substantially unitary element from plastic material as by injection moulding.

In the embodiment of FIG. 1, the piston element 57 permits the sliding insertion of the reciprocally movable piston element 57 into the catch member 100 on the actuator plate 32 either into a coupled orientation as shown in FIG. 2 or an axial uncoupled orientation where the piston element may move independently from the actuator plate 32 as shown in FIG. 4.

In the coupled orientation, the pivotal movement of the lever 31 axially moves the catch plate 32 and piston element 57 between the first rest, extended position and the second fully retracted position to dispense a quantity of fluid 18. If the reservoir 12 is inserted with the piston element 57 in the axial uncoupled orientation of FIG. 4, the first movement of the lever 31 moves the actuator plate 32 relative to the piston element 57 until the piston element 57 engages the catch member 100 and assumes the coupled orientation of FIG. 2. In this manner, the dispenser 10 is operative to dispense fluid 18 regardless of whether the piston element 57 is initially inserted into the housing 14 either coupled or uncoupled to the actuator plate 32.

To dispense fluid 18, the actuator assembly 30 is cycled by the pivotal movement of the lever 31 moving the piston element 57 from the first rest, extended position shown in FIG. 2 to a retracted position and released with the springs 34 returning the actuator plate 32 back to the first rest, extended position to complete the cycle.

The dispenser 10 of the present invention advantageously permits insertion of the reservoir 12 into the housing without the requirement of ensuring the piston element 57 is in a particular position relative to its piston chamber forming member 57 or the catch plate 32.

Reference is made to FIGS. 14 to 17 which show a second embodiment of a catch member 100 and a forward truncated portion of a piston element 57 for engagement therein. In FIGS. 14 to 17, similar reference numerals are used to refer to equivalent elements shown in FIGS. 1 to 13. In the first embodiment of FIGS. 1 to 13, the piston element 57 carried the discharge outlet 64 from which fluid may be discharged for use onto a user's hand. In the embodiment of FIGS. 14 to 17, a fluid outlet 64 from the piston element 57 is in sealed communication with a discharge passageway 202 through the catch member 100 with a discharge outlet 214 being carried by the catch member 100. In the embodiment of FIGS. 14 to 17, the piston element 57 similarly has an elongate hollow tubular stem 61 with a passageway 65 therethrough which has at its distal end the outer shoulder surface 128 on the flange 126. Axially outwardly of the flange 126, in the upper surface 36 of the outer end wall 32 of the catch member an annular slotway 204 is provided to receive an annular sealing ring 206 which is adapted to be engaged and compressed by the flange 124 of the piston member 57 forming a seal annularly thereabout when the piston element 57 is in the coupled orientation. The catch member 100 is provided with a hollow discharge tube 208 open at an upper end 210 which is coaxial with and in communication with the discharge outlet 64 from the piston member 57. The discharge tube 208 is open at an outer end 212 forming a discharge outlet 214.

Figure 14:
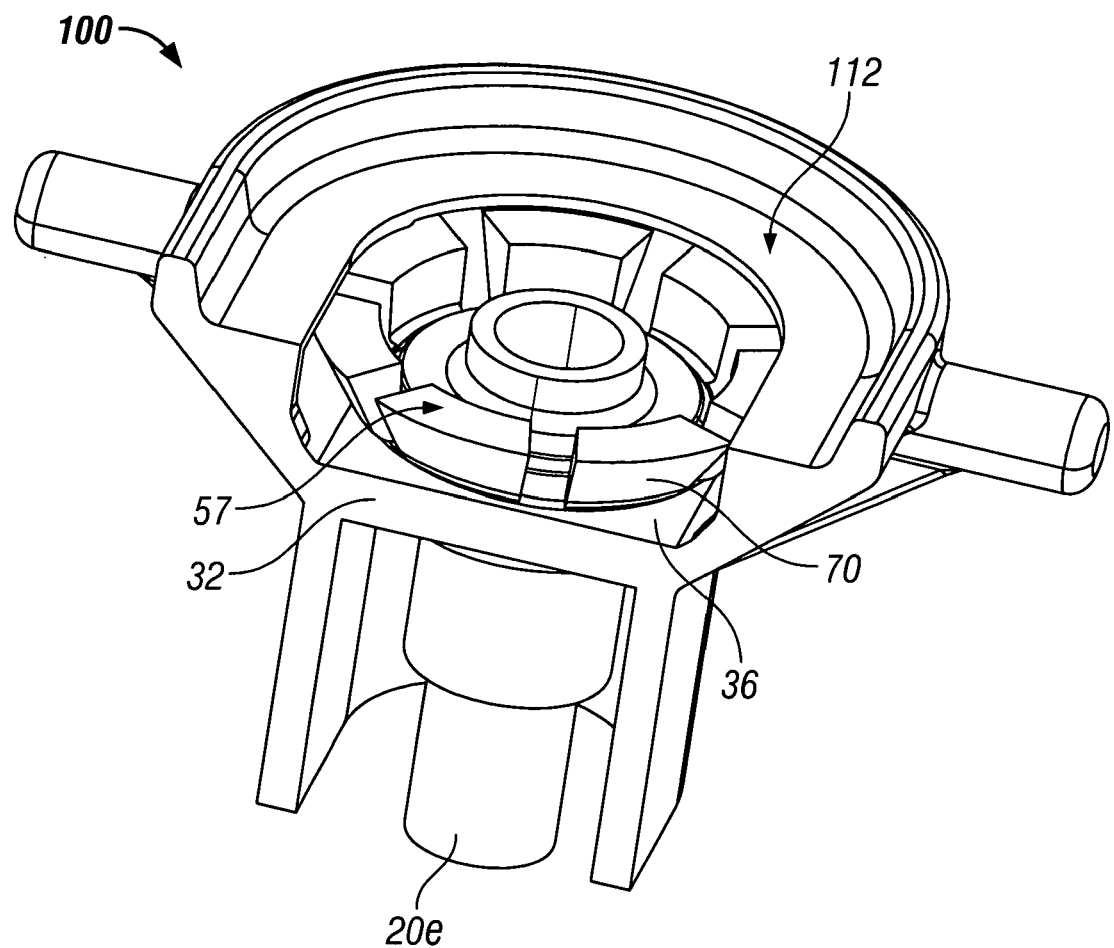
FIG. 14 is a schematic pictorial view of a catch member and lower portion of a truncated piston element in accordance with a second embodiment of the present invention in a coupled orientation.

As seen in FIG. 14, the inner end wall 112 of the catch member 100 extends circumferentially about the axis 66 greater than 180 degrees and is U-shaped opening radially forwardly.

Figure 15:
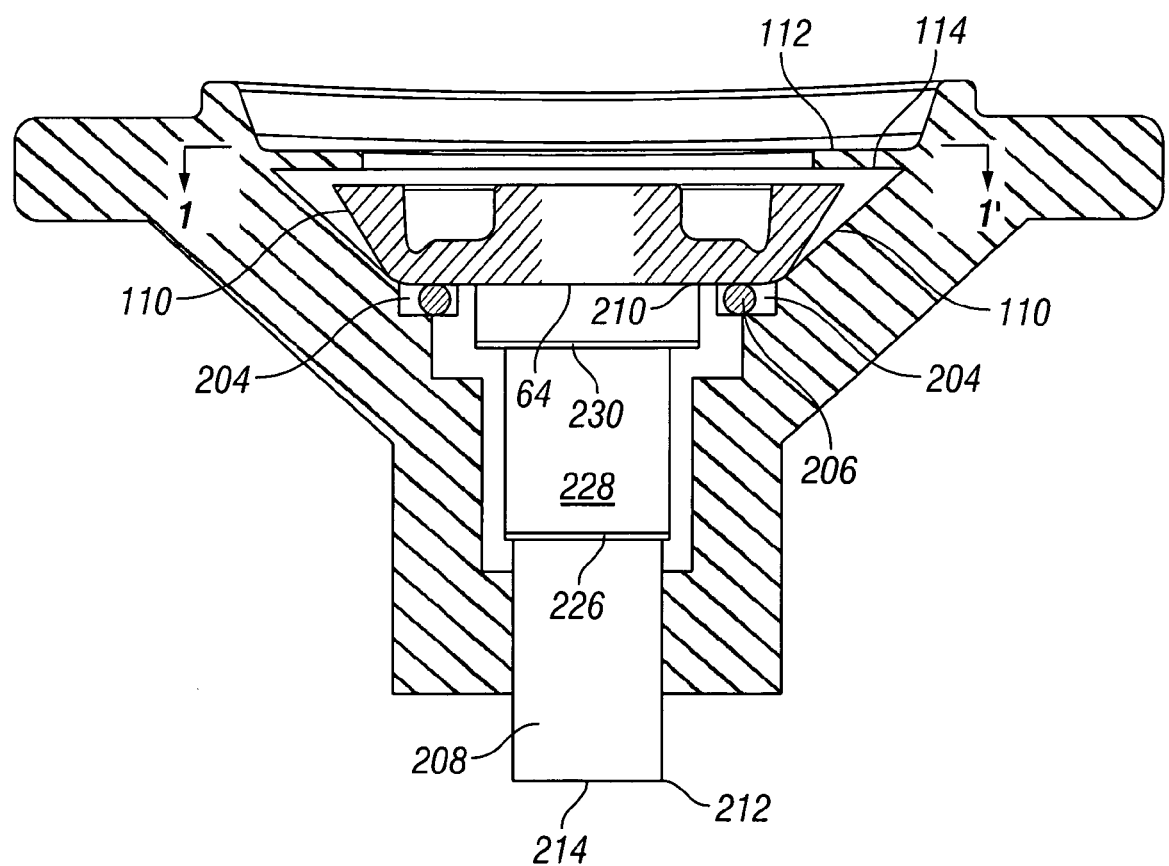
FIG. 15 is a diametric side-to-side cross-sectional view of the assembly shown in FIG. 14.
Figure 16:
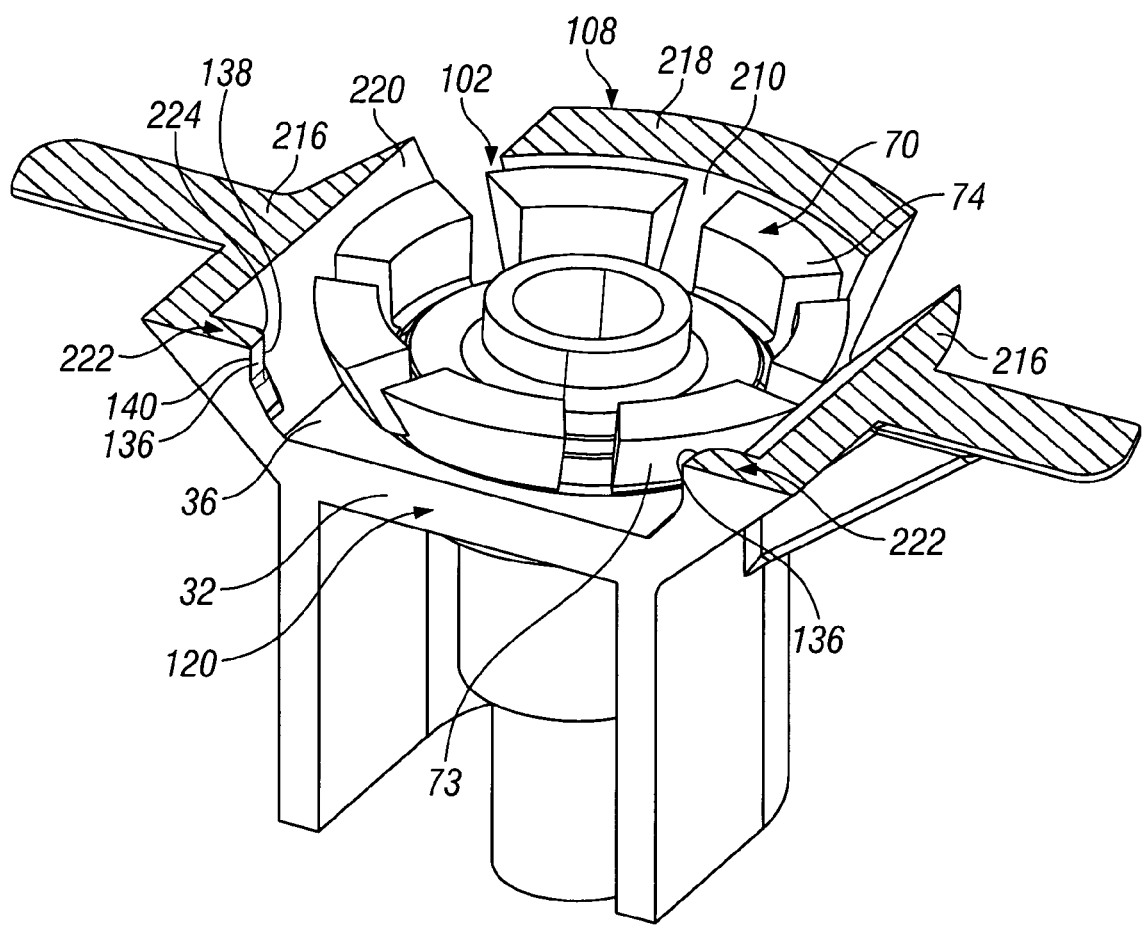
FIG. 16 is a perspective view of the assembly shown in FIG. 15 below a horizontal cross-section indicated as 1-1' in FIG. 15.

FIG. 16 shows a pictorial view similar to FIG. 14, however, with the catch member 100 and piston element 57 shown merely below a horizontal cross-sectional line 1-1' in FIG. 15 slightly above the shoulder 74 of the finger members 70. As can be seen in FIG. 16, the side wall 108 is provided as three portions including, in addition to two opposing side portions 216, a rear portion 218. The interior surface 110 of the rear portion 218 of the side wall 108 is frustoconical and generally conforming to the shape of the exterior frustoconical camming surfaces 73 of the finger members 70. The side portions 216 of the side wall 108 include a major sloped surface 220 shown to be generally planar lying in a flat plane disposed at an angle to the axis 66 and tapering downwardly and radially inwardly towards the axis 66. At a forward end of each such sloped surface 220, there is provided on each side wall portion 216 a stop member 222 which projects into the cavity 102 relative the sloped surface 220. Each stop member 222 carries the cam surface 136 directed in opposition to a cam surface 136 on the opposite stop member. Each cam surface 136 has an exterior edge 140 and an interior edge 138. The interior edge 138 merges with a bevelled cam surface 224 directed inwardly into the cavity. As with the first embodiment, on sliding the piston element 57 radially forwardly from a coupled orientation, engagement in succession of the bevelled cam surfaces 224, the exterior edges 140 and the cam surfaces 136 with the camming surfaces 73 on the finger members 70, deflect the finger members 70 radially inwardly to reduce the radial width of the piston element 57 between finger members 70 permitting the finger members 70 to pass radially forwardly through the exitway 120. As with the first embodiment, the piston element 57 may be moved from a coupled orientation to a radial uncoupled orientation or from the radial uncoupled orientation to a coupled orientation by movement radially. As well, the piston element 57 may move from an axial uncoupled orientation to a coupled orientation by movement axially.

Figure 17:
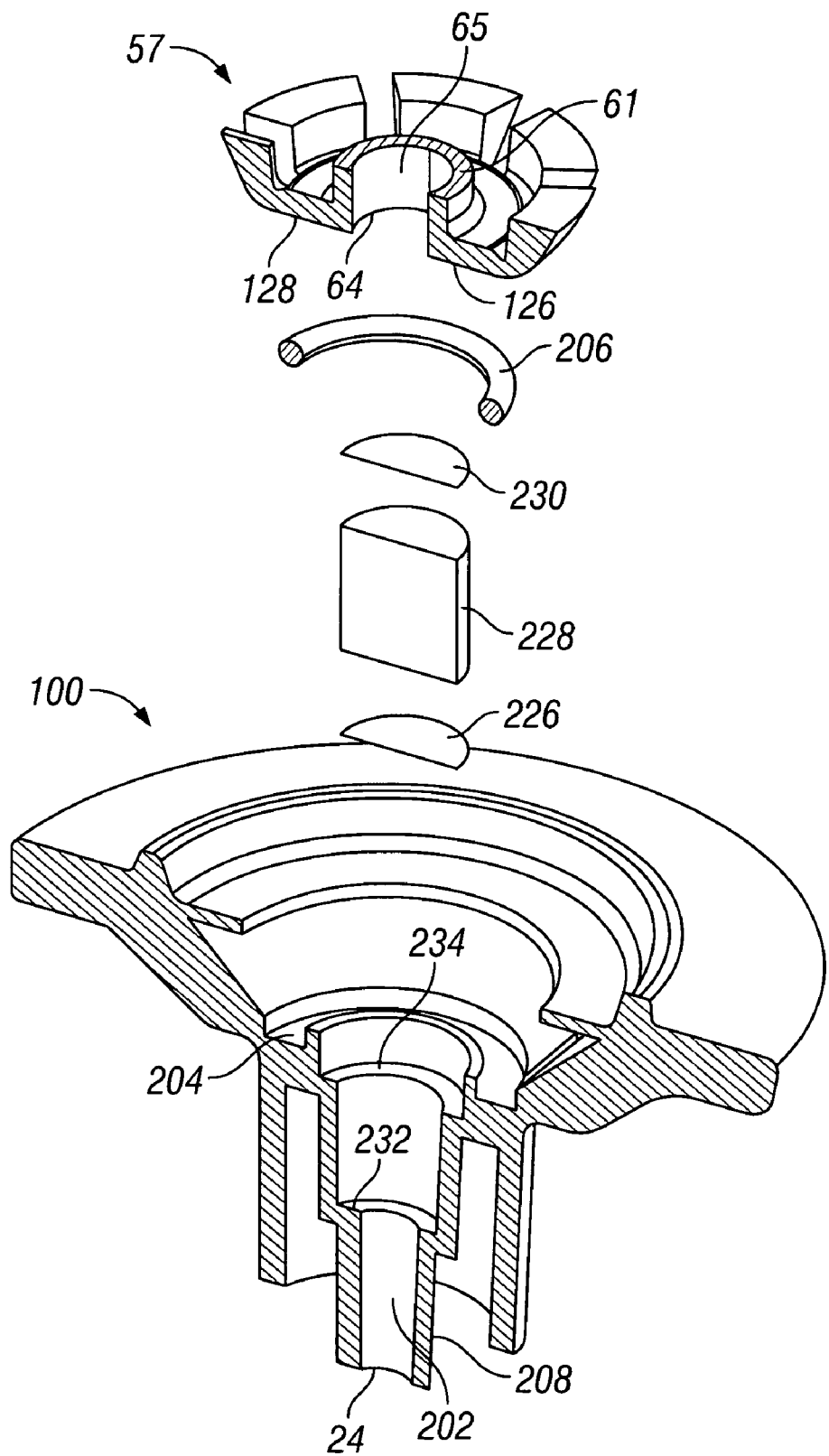
FIG. 17 is a pictorial exploded view of the assembly of FIG. 14 cross-sectioned along the same side-to-side diametric cross-section as in FIG. 15.

FIGS. 15 and 17 illustrate components carried in the discharge tube 208 of the catch member 100 which provide a foam generator assembly for foaming of a mixture of liquid and air which may be discharged from the piston element 57 assuming the piston element may, for example, be of the type disclosed in U.S. Pat. No. 6,409,050 to Ophardt. In this regard, the discharge tube 208 has a stepped configuration adapted to assist in receiving and holding at axially spaced locations a first screen member 226, a porous plug 228 and a second screen member 230. As seen, the first screen member 226 is to sit on a first stepped shoulder 232 with the cylindrical foam plug to sit on top of the first screen member 226 and with the second screen member 230 is to sit on a second stepped shoulder 234.

Figure 18:
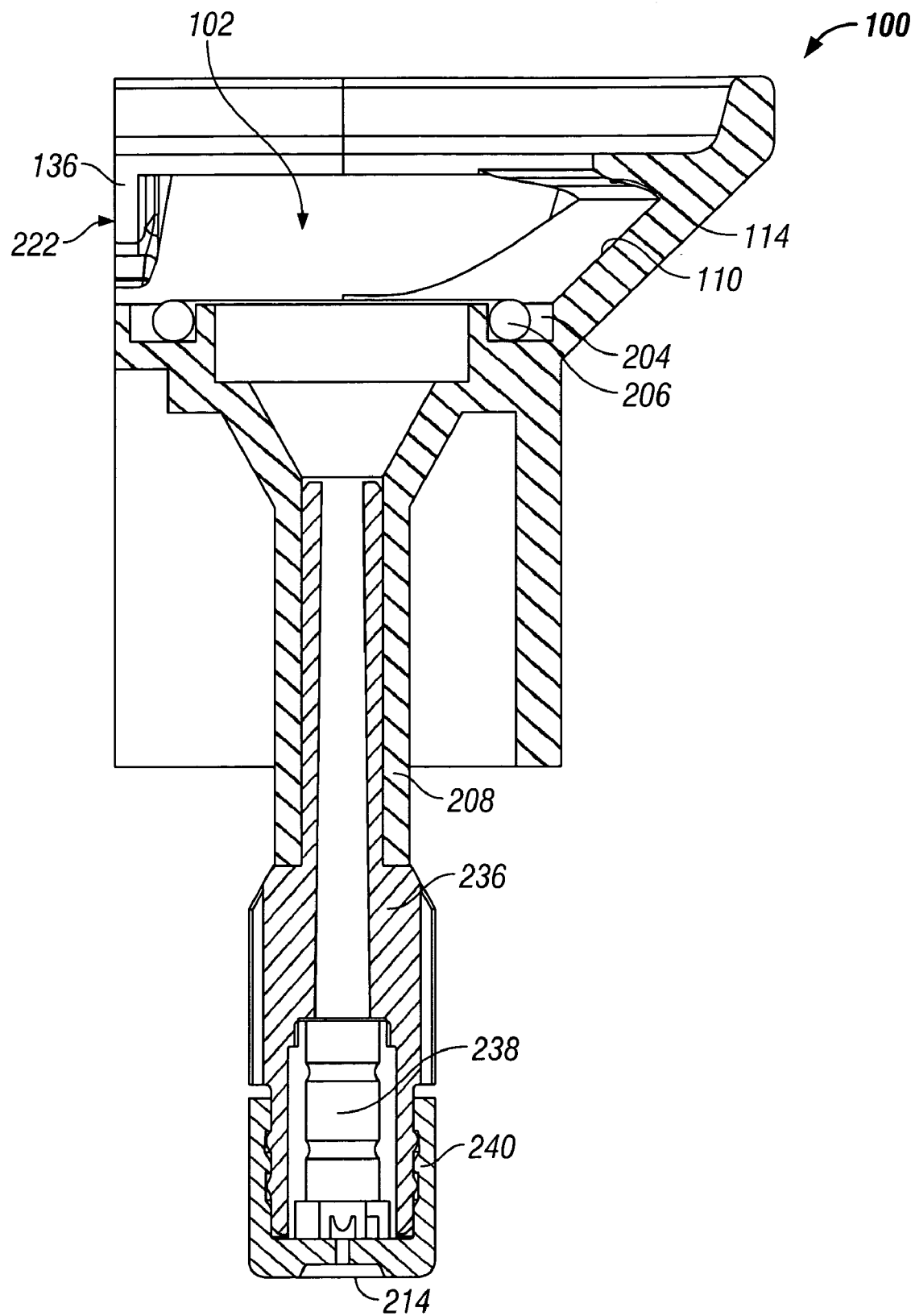
FIG. 18 is a diametric cross-sectional front-to-back side view of the assembly shown in FIG. 14, however, including a spray nozzle attachment.

Reference is made to FIG. 18 which illustrates the catch member 100 of FIG. 14 in cross-section along section line 3-3' in FIG. 15 without showing the piston member 57. The catch member 100 in FIG. 18 is identical to the catch member 100 illustrated in FIGS. 14 to 17 with the exception that below the sealing ring 206, the discharge tube 208 has been changed with the screen members 226 and 230 and the plug 228 removed, and a spray nozzle assembly has been provided coupled to the discharge tube 208 including a tubular nozzle extension 236, a restrictive nozzle insert 238 and a nozzle end cap 240. In a known manner, the nozzle end cap 240 is secured in a snap or threaded fit onto the end of the nozzle insert 238 and provides a small discharge opening therethrough. The nozzle insert 238 provides relatively small passages for passage of fluid therethrough such that fluid dispensed from the discharge outlet 214 of the nozzle cap 240 will be in the form of a fine mist or atomized spray.

In the second embodiment of FIGS. 14 to 18, providing the discharge tube 208 as part of the catch member 100 assists in reducing the overall length of the piston element 57 which needs to be carried by the assembly of the reservoir 12 and the valve assembly 22. Providing the discharge tube 208 on the catch member 100 assists in extending the discharge outlet 214 so as to be located closer to a user's hand typically disposed below the dispensing apparatus. In accordance with the second embodiment, when the finger members 70 of the piston element 57 are received in the catch member 100 in the coupled orientation, the finger members 70 are securely held between the interior axially outwardly directed surface 114 of the inner end wall 112 and the annular sealing ring 206 so as to provide sealed engagement of the discharge outlet 64 of the piston element 57 with the upper end 210 of the discharge tube 208 on the catch member 100.

Figure 27:
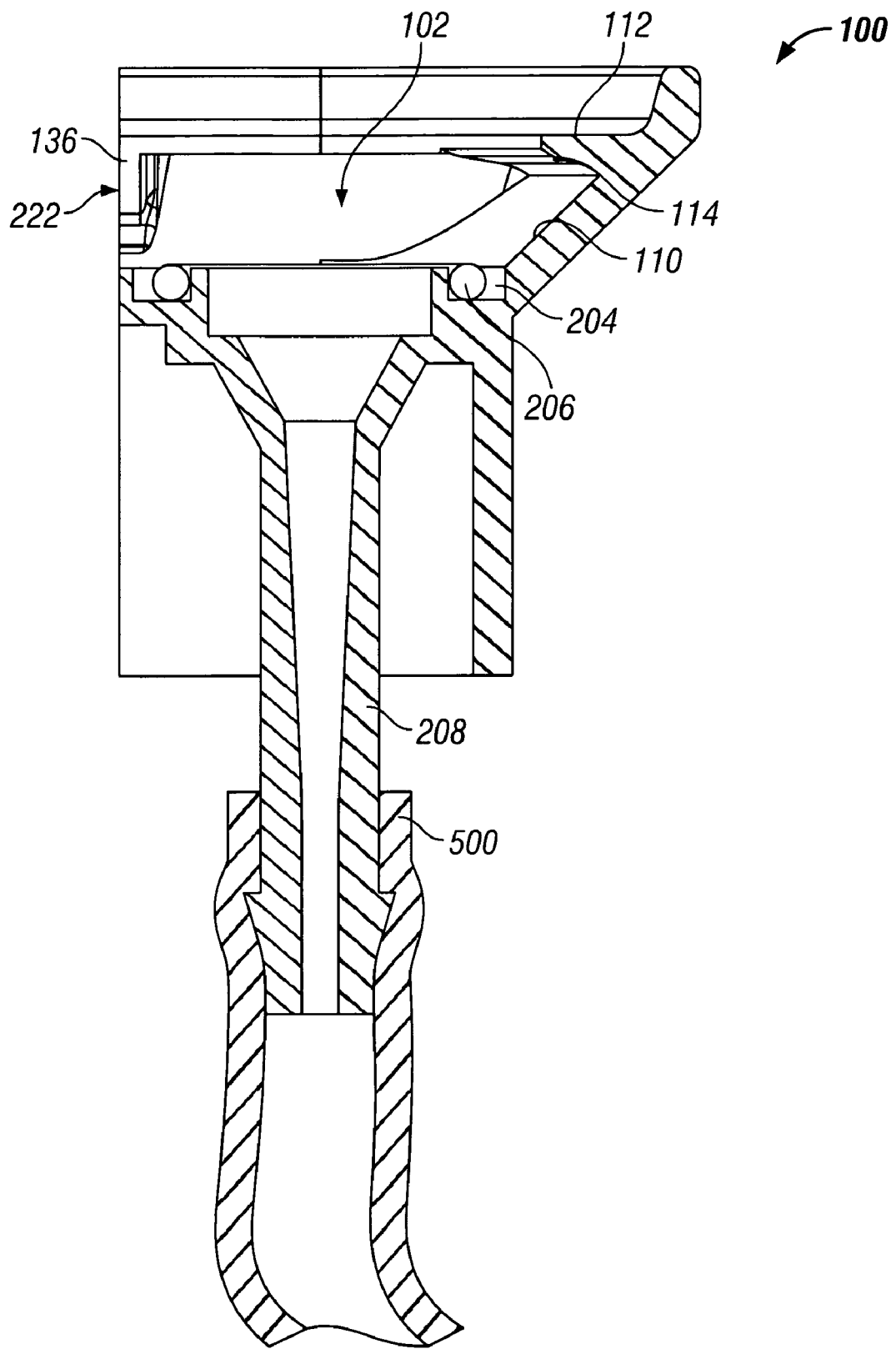
FIG. 27 is a schematic side view similar to FIG. 18, however, showing connection of the outlet to a supply tube.
Figure 28:
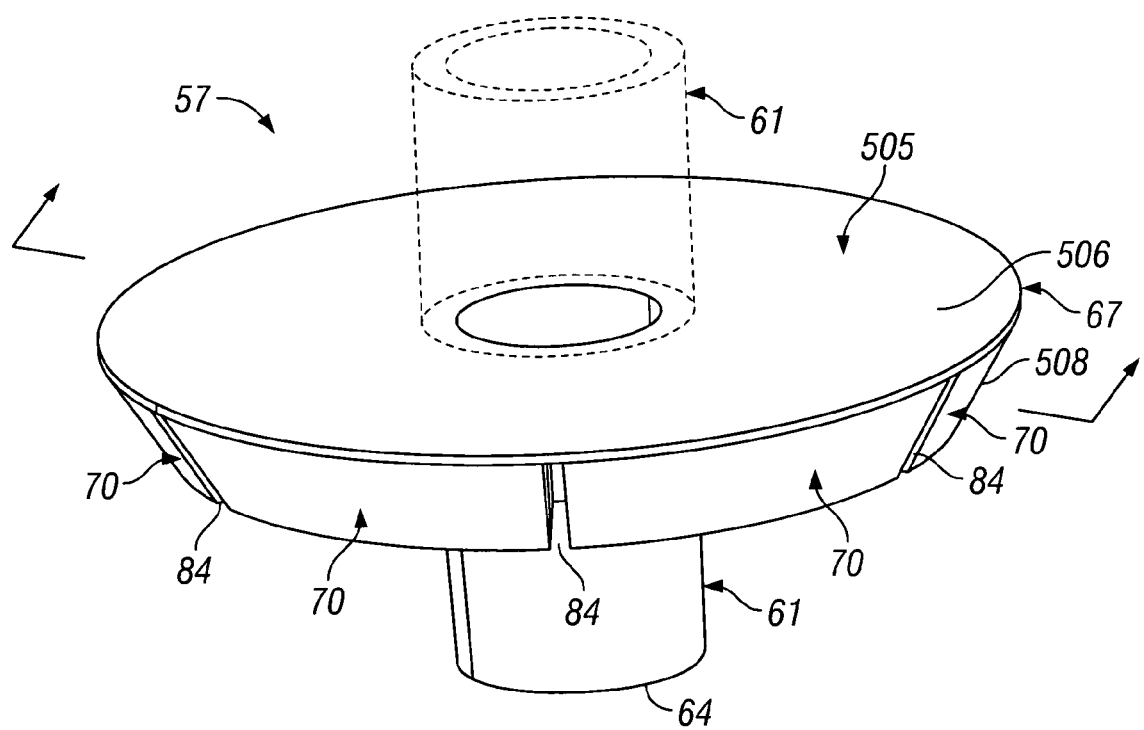
FIGS. 28, 29, 30 and 31 are a top pictorial view, a bottom pictorial view, a side view and a bottom view showing yet a further embodiment of an outer portion of a piston element carrying the resilient member, and with the resilient member in an inherent unbiased position.

Reference is made to FIG. 27 showing a side view identical to FIG. 18 but in which below the sealing ring 206, the discharge tube 208 has been changed such that the discharge tube 208 is adapted to be engaged by a tube 500 which can direct discharged fluid to a remote location as may be advantageous in many applications including automatic dispensing of fluids into washing machines, for water treatment and many other uses without limitation. The tube 500 is preferably a flexible tube secured onto the discharge tube 208 in a friction fit, however, many other coupling arrangements may be used.

Figure 19:
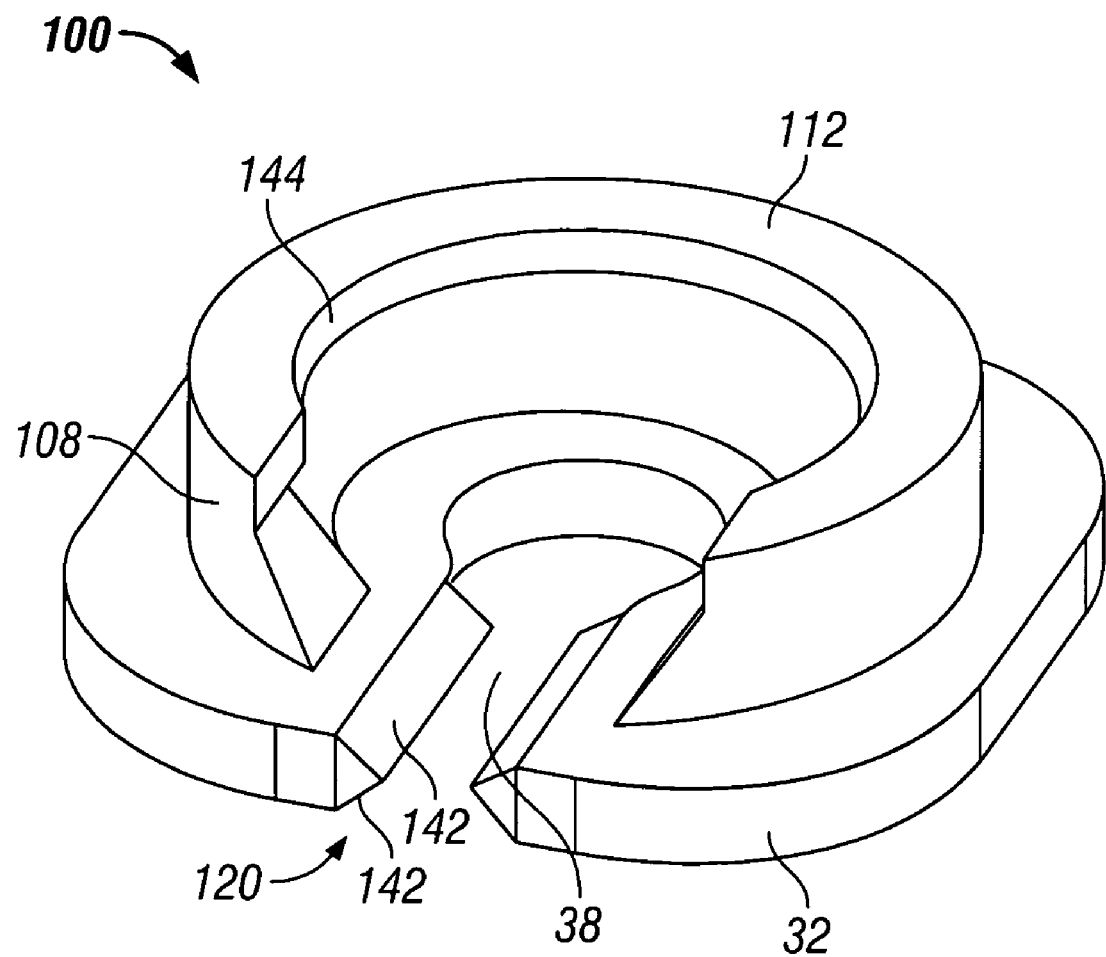
FIG. 19 is a pictorial view of a modified embodiment of a catch member from that shown in FIG. 9.
Figure 20:
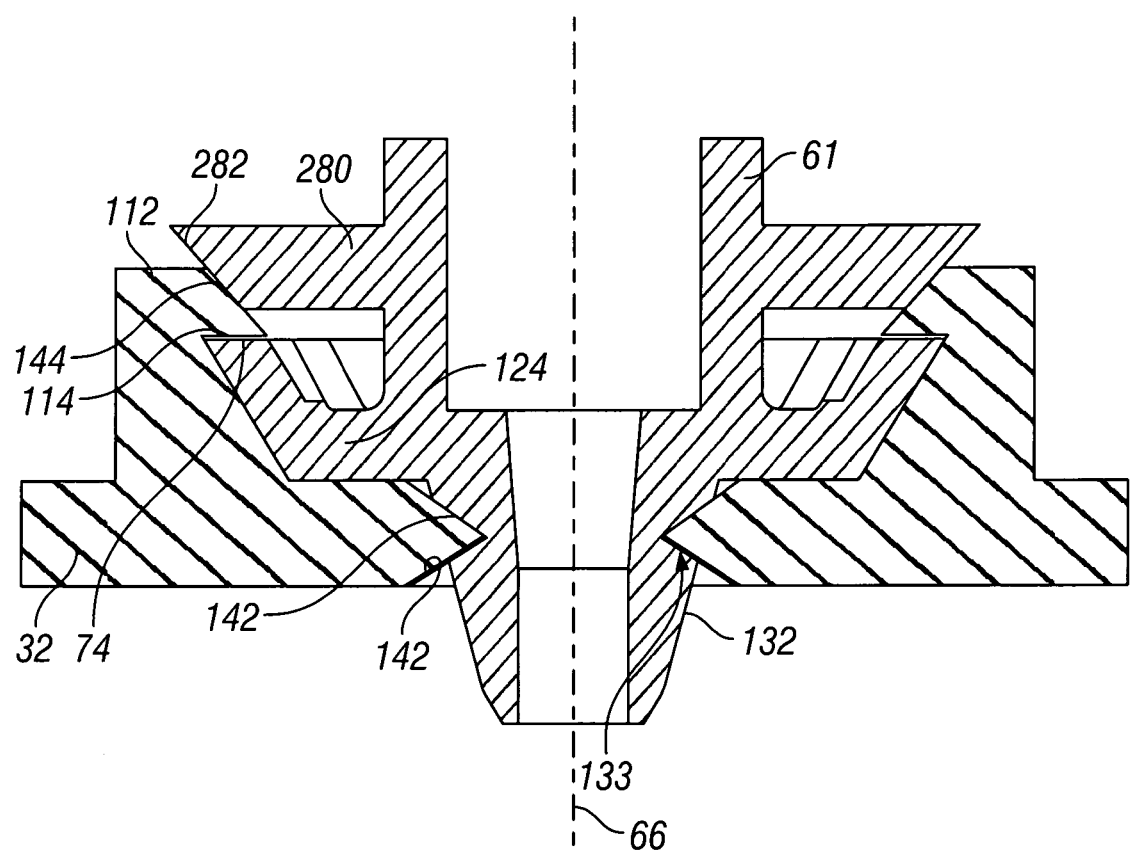
FIG. 20 is a cross-sectional side view similar to FIG. 9 but of the catch member shown in FIG. 19 and with a modified form of the movable element from that shown in FIG. 9.

Reference is made to FIGS. 19 and 20 which show a modified form of a catch member 100. The catch member 100 in FIG. 19 is similar to the catch member shown in FIG. 8, however, has the side wall 108 and the inner end wall 112 extend completely circumferentially about the axis 66 from one side of the exitway 120 to the other side of the exitway 120. In addition, the surfaces 142 about the exitway 120 on the outer end wall 32 are shown to have two facets, namely an upwardly directed facet and a downwardly directed facet which form, as seen in FIG. 20 in side view, a triangular shape. Also in FIG. 19, the inwardly directed surfaces 144 of the inner end wall 122 are circular about the axis 66. FIG. 20 shows a cross-sectional side view similar to FIG. 9 showing the catch member 100 of FIG. 19 together with a new configuration for a movable element 57 only shown in FIG. 20 in cross-section. FIG. 20 shows that the inwardly directed surfaces 144 of the inner end wall 112 are frustoconical about the axis 66 converging axially outwardly and inwardly. The inner end wall 112 does not extend radially inwardly as far as is the case in the embodiment of FIG. 9 to assist in having the fingers 70 snap into the cavity 102.

The stem 61 carries above the flange 124 a second radially outwardly extending locating flange 280 with a beveled outer surface 282 to engage on the frustoconical surface 144 of the inner end wall 112. As seen in FIG. 20, with the finger members 70 having their shoulders 74 engaged underneath the inner end wall 112 and the flange 280 engaging the axially inwardly directed frustoconical surface 144 of the inner end wall 112, the movable element 57 and the catch member 100 are secured together against relative axial movement when in the coupled orientation.

FIG. 19 shows the inwardly directed surfaces 142 of the outer end wall 32 on either side of the slotway 38 extending inwardly towards each other. The movable element 57 is shown as having its stem 61 modified outwardly of the flange 124 so as to merely comprise a frustoconical portion 132, however, which frustoconical portion 132 has an annular groove 133 extending radially thereinto which annular groove has a profile to match the surfaces 144. From the coupled orientation shown in FIG. 20 on radial movement of the movable element 57 to a radial uncoupled orientation, the annular groove 133 in the stem 61 of the movable element about the frustoconical portion 132 permits the movable element to be slid radially past the inward projections on the outer end wall 32 provided by the surfaces 142 on either side of the slotway 38.

Figure 21:
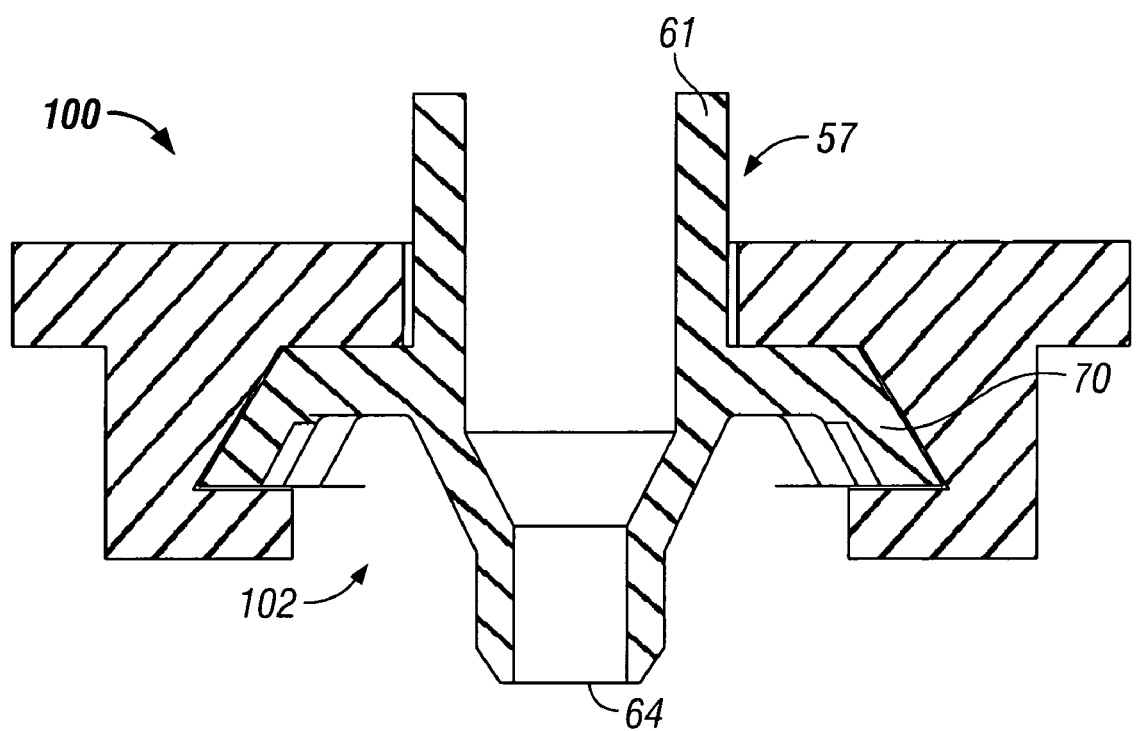
FIG. 21 is a cross-sectional side view similar to FIG. 9, however, showing another embodiment effectively inverted compared to the embodiment shown in FIG. 9.

Reference is made to FIG. 21 which shows a cross-sectional view of a catch member 100 and a movable element 57 substantially the same as that shown in FIG. 9, however, with each of the cavity 102 in the catch member 100 and the resilient fingers 57 inverted such that the movable element 57 may be moved from an axially uncoupled orientation below the catch member 100 upwardly axially into the catch member 100. The embodiment in FIG. 21 remains capable of moving radially between coupled and uncoupled orientations in an analogous manner to the embodiment in FIG. 9.

Figure 22:
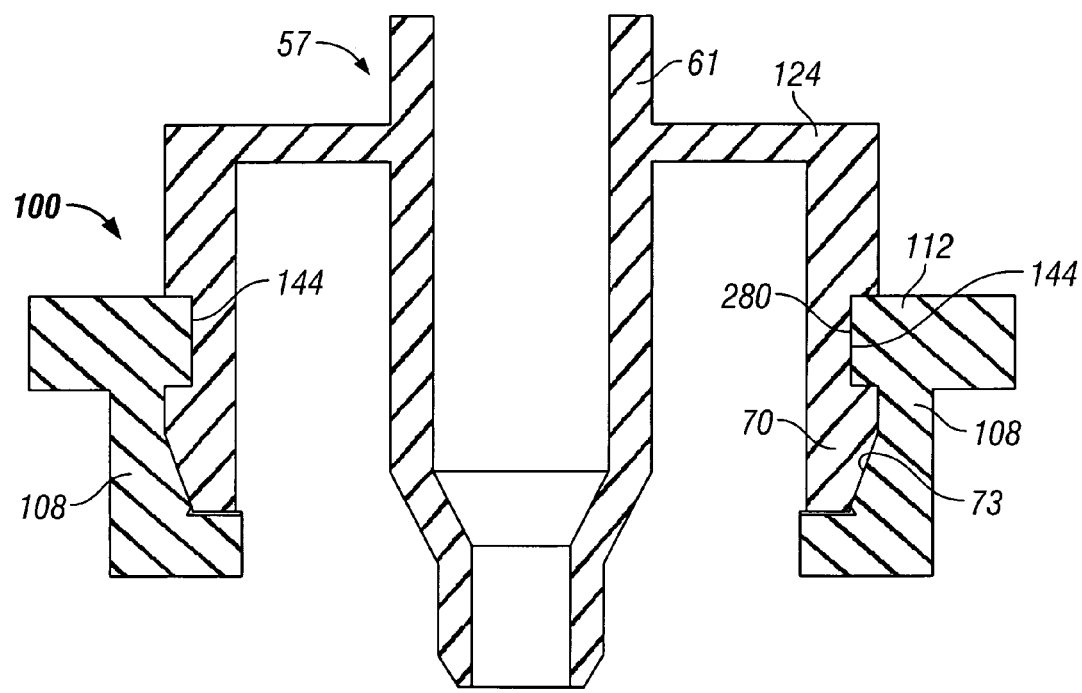
FIG. 22 is a cross-sectional side view similar to FIG. 9 but showing a catch member 100 and a movable element in accordance with a further embodiment of the present invention.

Reference is made FIG. 22 which shows another embodiment of catch member 100 and movable element 57 in accordance with the present invention in cross-section similar to that in FIG. 9. In FIG. 22, each of the finger members 70 extend forwardly, that is, actually outwardly, and substantially only axially from a support flange 124 provided on the stem 61. Each finger member 70 has a radially outwardly directed camming surface 73 which can assist in permitting the movable element 57 to move from above the catch member 100 in axially uncoupled orientation axially downwardly to a coupled orientation. In radial movement from the coupled orientation to the uncoupled orientation, the axial outer ends of the finger members 70 will be deflected by portions of the cavity about its exitway radially inwardly to permit the finger members 70 to pass radially through the exitway. Each of the finger members 70 includes an annular groove 280 thereabout adapted to receive an annularly radially inward extension of the inner end wall 112 therein. In the embodiment of FIG. 22, the radially open exitway forwardly through the inner end wall 112 should be equal to the widest diameter between the surfaces 144 of the inner end wall 112 throughout the exitway, however, the exitway will be of a reduced diameter radially of the side walls 108 such that radial inward movement of the distal outer ends of the fingers 70 permits radial movement out through the exitway.

Figure 23:
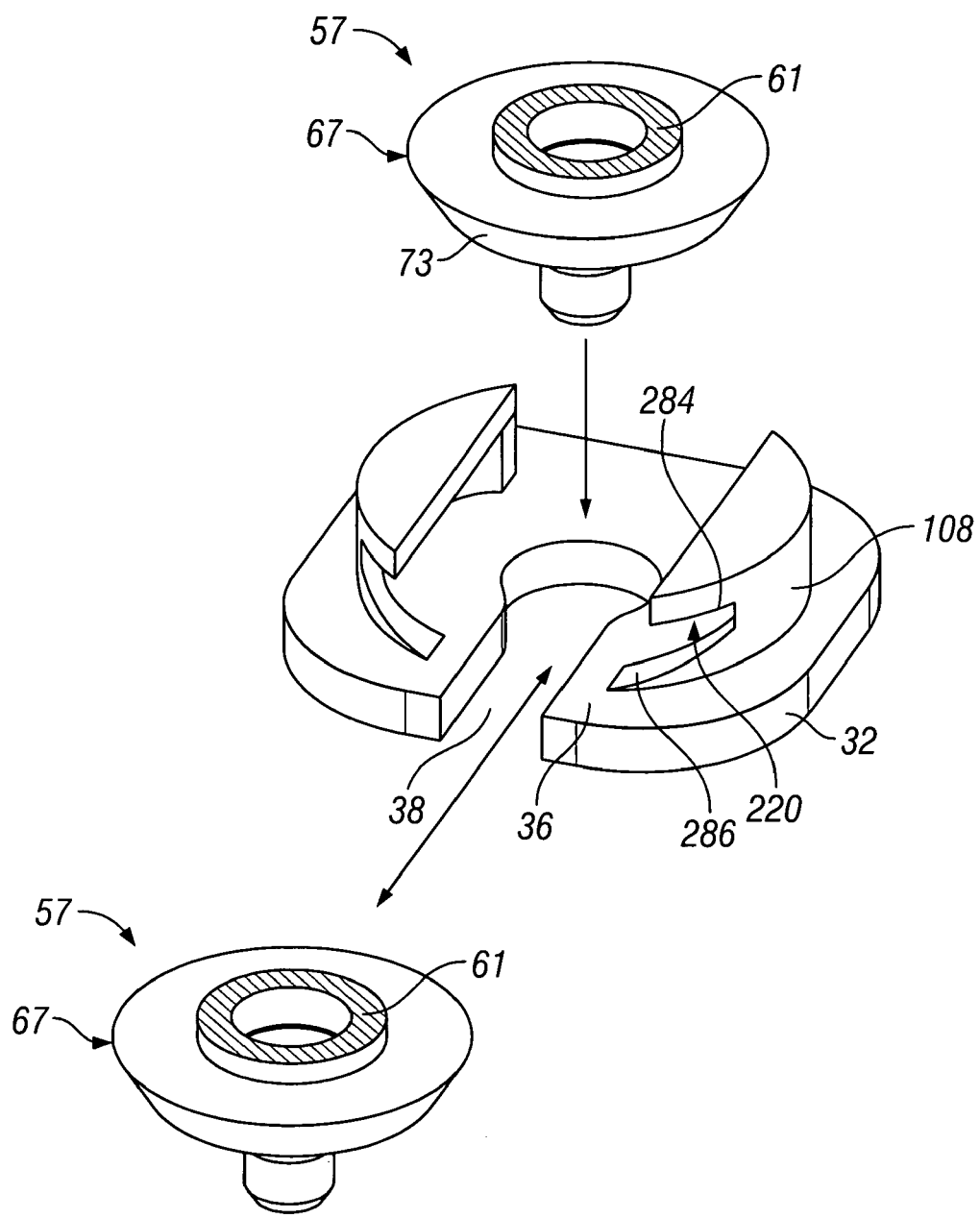
FIG. 23 is a schematic pictorial view similar to FIG. 8 but showing a further embodiment in accordance with the present invention.
Figure 24:
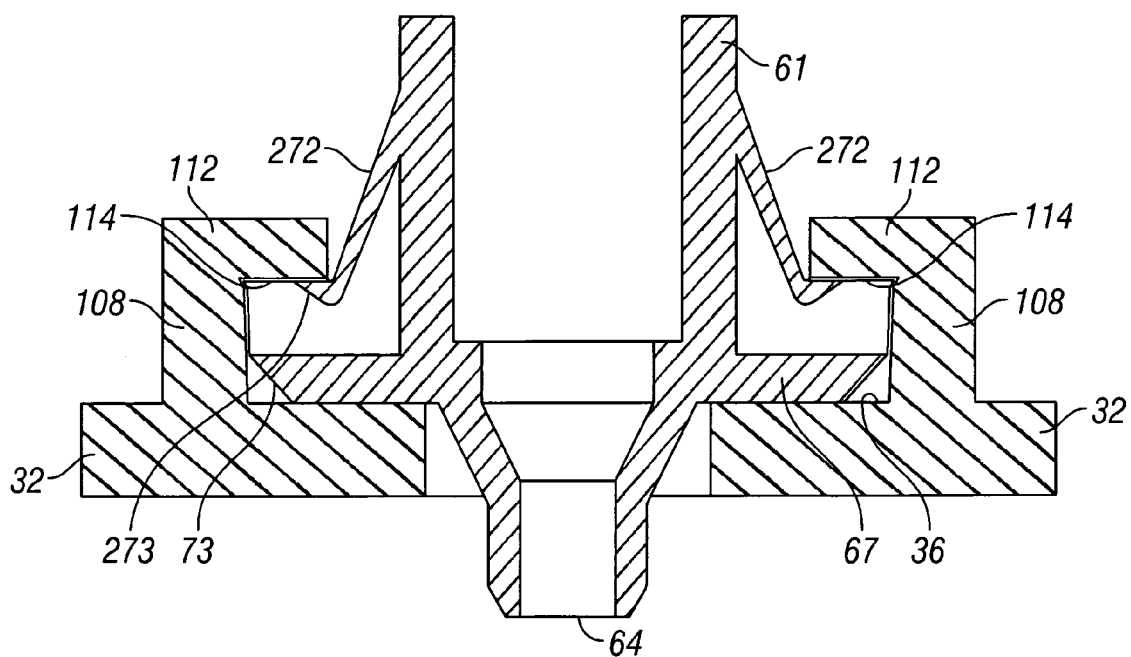
FIG. 24 is a cross-sectional side view through the embodiment of FIG. 23 in a coupled position similar to the cross-section of FIG. 9.
Figure 25:
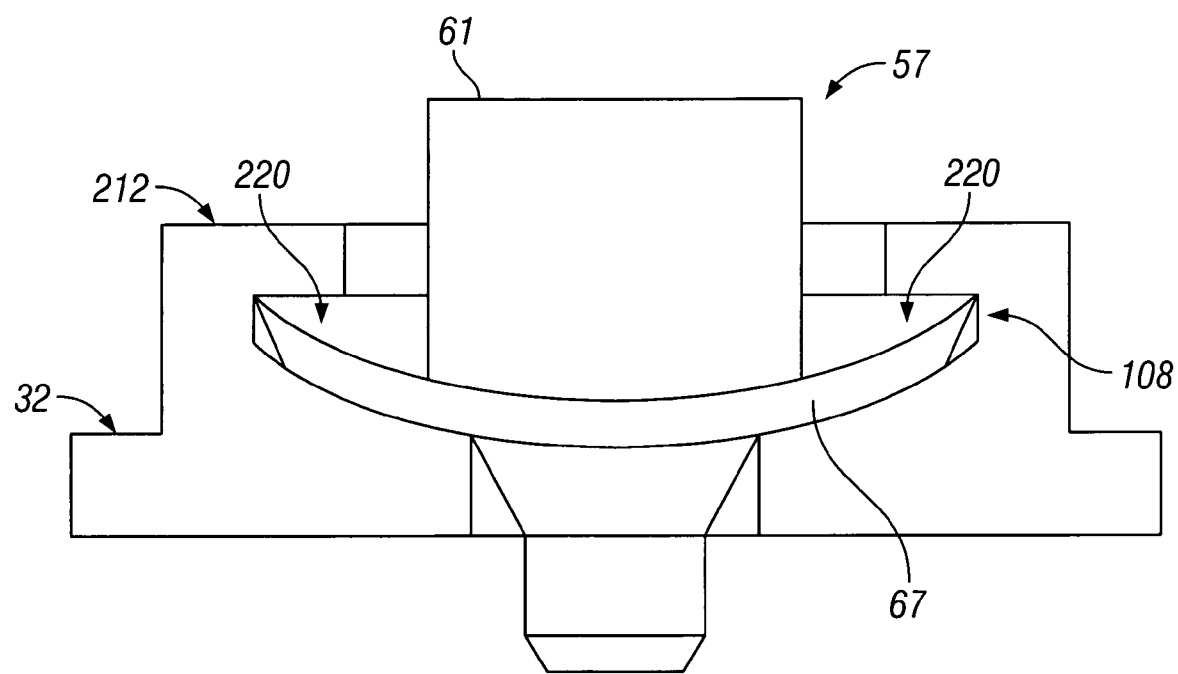
FIG. 25 is a front view of the embodiment of FIGS. 23 and 24 with the movable element moved forwardly from the uncoupled orientation.

FIG. 23 illustrates an embodiment in accordance with the present invention in which the engagement member 67 comprises a disc which extends radially from the stem 61 and is adapted to have its distal end deflected in an axial direction. The disc 67 is shown to have an axially outwardly and inwardly directed frustoconical camming surface 73. As best seen in FIGS. 23 and 25, the exitway 120 through the side walls 108 includes a radially extending exit slot 220 having a lower surface 286 and an upper surface 284. Proximate a central portion of the exitway 120, the lower surface 286 of the slot 220 is at the same height as the upper surface 36 of the outer end plate 32. However, the lower surface 286 of the slot 220 gradually rises upwardly as it extends radially outwardly from the slotway 38. With the piston element 57 in a coupled position as shown in FIG. 24, on initial radial movement of the movable element 57 radially in the direction of the exitway 120, the camming surfaces 73 on the resilient disc 67 will engage the lowest more forward portions of the lower surface 286 of the exit slot 220 camming the resilient disc 67 at its forward end to be deflected axially upwardly. With further radial forward movement of the piston element 57, the resilient disc 67 will come to be curved so as to have its outer distal ends curve upwardly matching the curvature of the exit slot 220 and thus permitting the resilient disc 67 to slide radially outwardly through the slot. However, insofar as the movable element 57 is disposed in the coupled position, the inherent resiliency of the resilient disc 67 will have the disc 67 assume the inherent unbiased configuration shown in FIG. 24 coaxially securing the movable element 57 in the coupled orientation within the catch member 100. While only shown in FIG. 24, some mechanism is preferably provided to prevent the movable element 57 from moving axially upwardly once it is engaged with the catch member 100 and to accomplish this preferred although not necessary objective, a plurality of resilient finger members 272 are provided which can on axial insertion come to snap past the inner end wall 112 and present radially inwardly directed catch surfaces 273 to engage the interior surfaces 114 of the inner end wall 112.

FIG. 25 shows a front view of the embodiment shown in FIGS. 23 and 24 but in a partially uncoupled configuration in which the movable element 57 has been moved forwardly into the exitway such that the resilient disc 67 is received in the exit slots 220 and has been deflected at its distal ends upwardly to assume the curved configuration of the exit slots 220 through the side walls 108 as, for example, when the largest diameter portion of the resilient disc 67 is passing through the curved slots 220 in the forward portions of the side wall 108.

Figure 26:
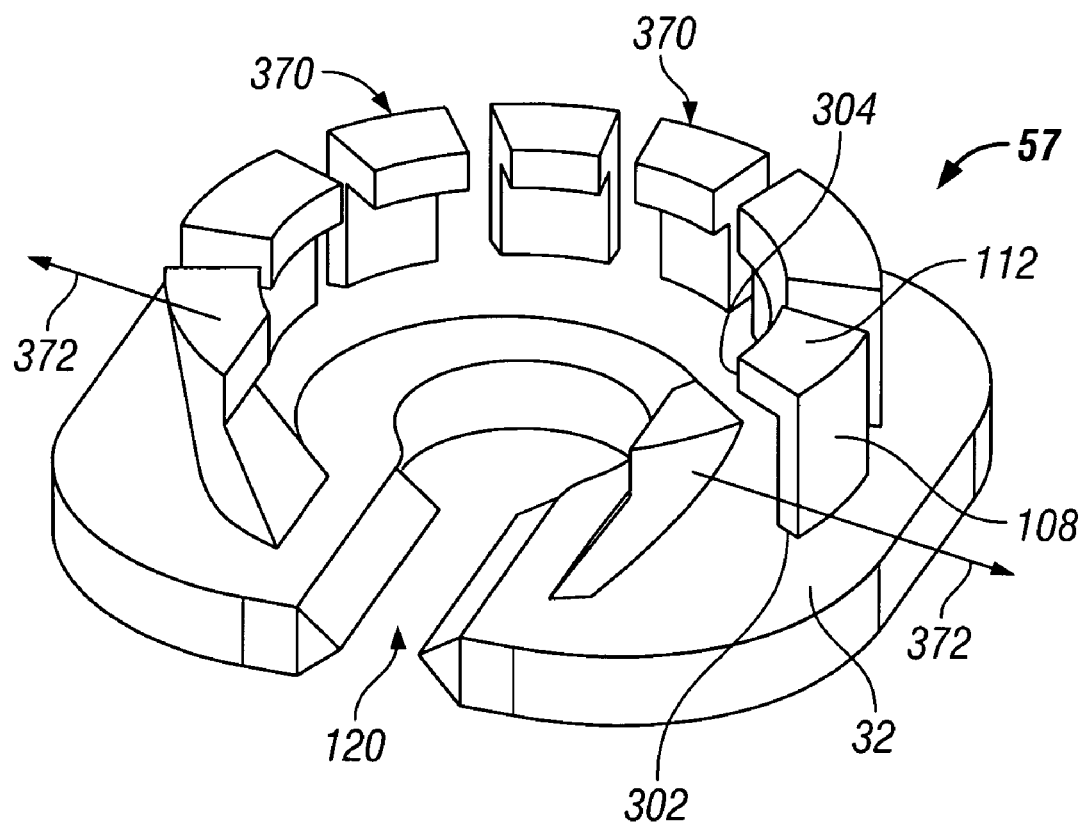
FIG. 26 is a pictorial view of a further embodiment of the forward portion of a movable element in accordance with the present invention.

Reference is made to FIG. 26 showing catch member 100 identical to that shown in FIG. 19, however, with the side wall 108 and inner end wall 112 shown as resilient finger members 370 which extend from a fixed end 302 secured to the outer end wall 32 upwardly and radially inwardly to a distal end 304. Each of these members 370 is resilient and capable of deflecting radially outwardly to assist in permitting a movable element to move from an uncoupled orientation to a coupled orientation with relative axial or radial movement. The resilient members 370 on either side of the exitway 120 may be particularly adapted for movement directly away from each other, that is, in the direction indicated by the arrows 372 in FIG. 26 as can be of assistance towards increasing the width of the exitway 120 through which the movable element 57 may radially move. While it is preferred that any movable element 57 carry resiliently deflectable members such as the fingers 70, it is to be appreciated that it is within the skill of a person skilled in the art to adopt a catch member 100 such as shown in FIG. 26 so that the catch member carries a resilient member which moves sufficiently to permit radial movement of the movable element 57 through the exitway from an uncoupled orientation.

Reference is made to FIGS. 28 to 37 which illustrate views of an outermost portion of a piston element 57 constructed with an arrangement forming a resilient radially extending disc 67 on the stem 41 which can be adapted for deflection axially and/or radially. The piston element 57 is only shown to have the resilient disc 67 with the stem 61 extending downwardly therethrough to the discharge outlet 64. However, as schematically shown in dashed lines in FIG. 28, the stem 61 of the piston element 57 would not only extend downwardly from the disc 67 but also upwardly.

The disc 67 has a top 505 with an upper surface 506 which is smooth and continuous extending radially outwardly. Individual finger members 70 are formed circumferentially about the outer periphery spaced from each other by slots 84 and adapted to be deflected radially inwardly and/or axially. Each finger 70 has an outer cam surface 508 to assist in movement axially into a suitable catch member.

In FIG. 6, the slots 84 extend axially through the engagement member 67. In contrast as seen in Figure the slots 84 extend axially from an axially outwardly directed lower surface 507 of the engagement member 67 from an axially open end 512 to an axially closed or blind end 514, with the slots 84 being defined between two circumferentially spaced side walls 516 and 518. The blind end 514 also forms a lower surface of the top 505. The slots 84 are also seen to extend radially from a radially open end 530 on the radially outwardly directed outer cam surface 508 to a radially closed or blind end 522 between the two circumferentially spaced side walls 526 and 528.

Figure 29:
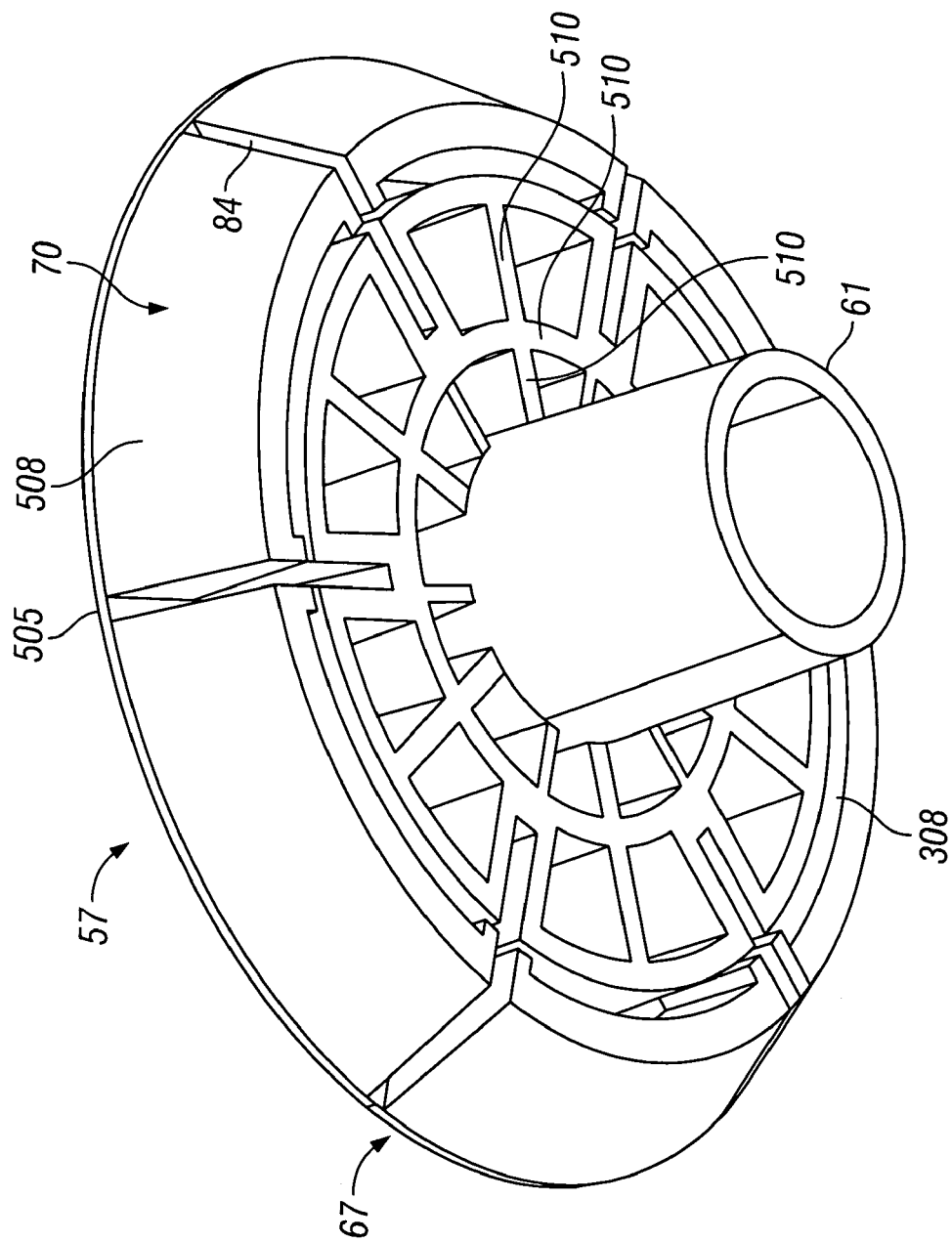
Figure 30:
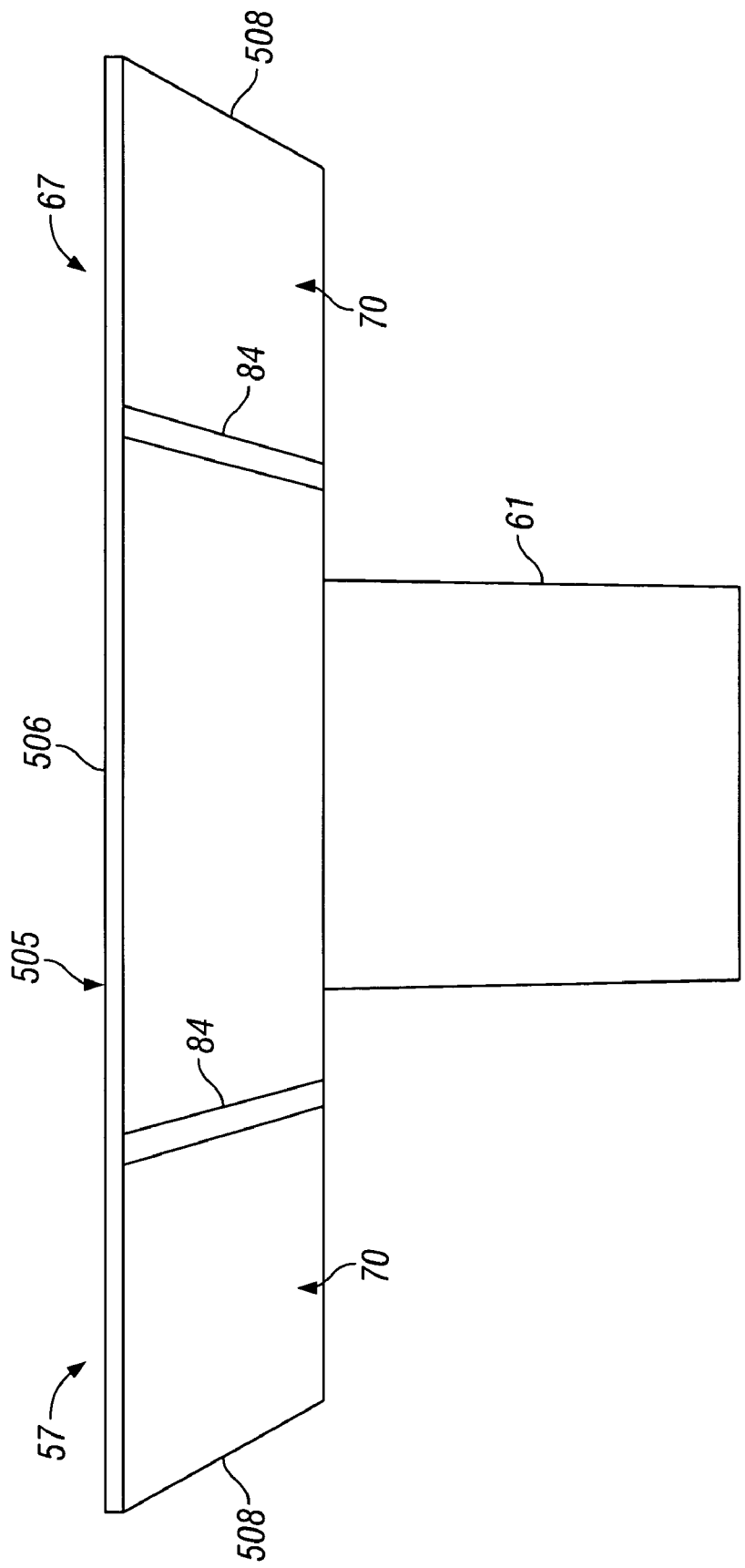
Figure 31:
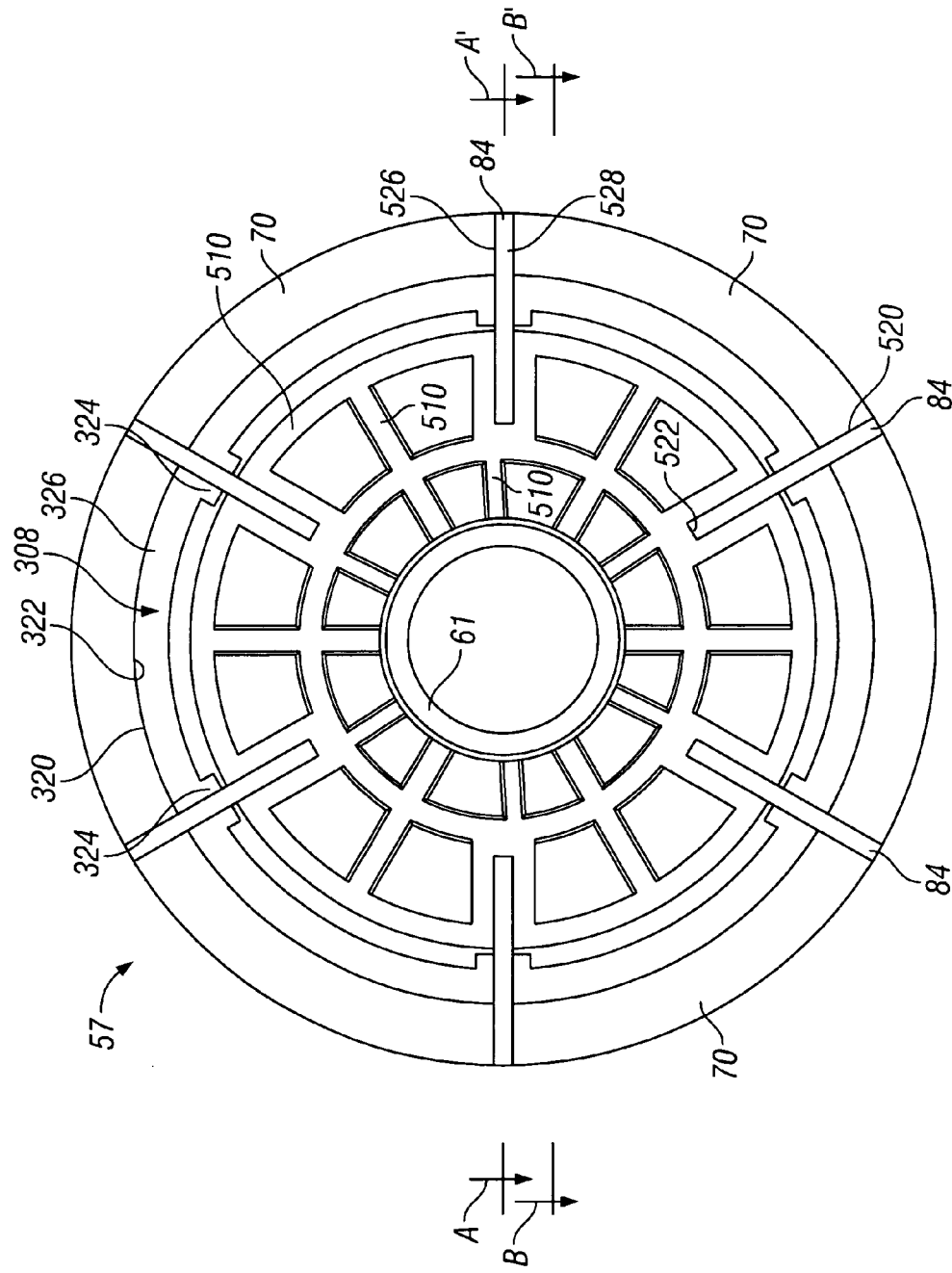
Figure 33:
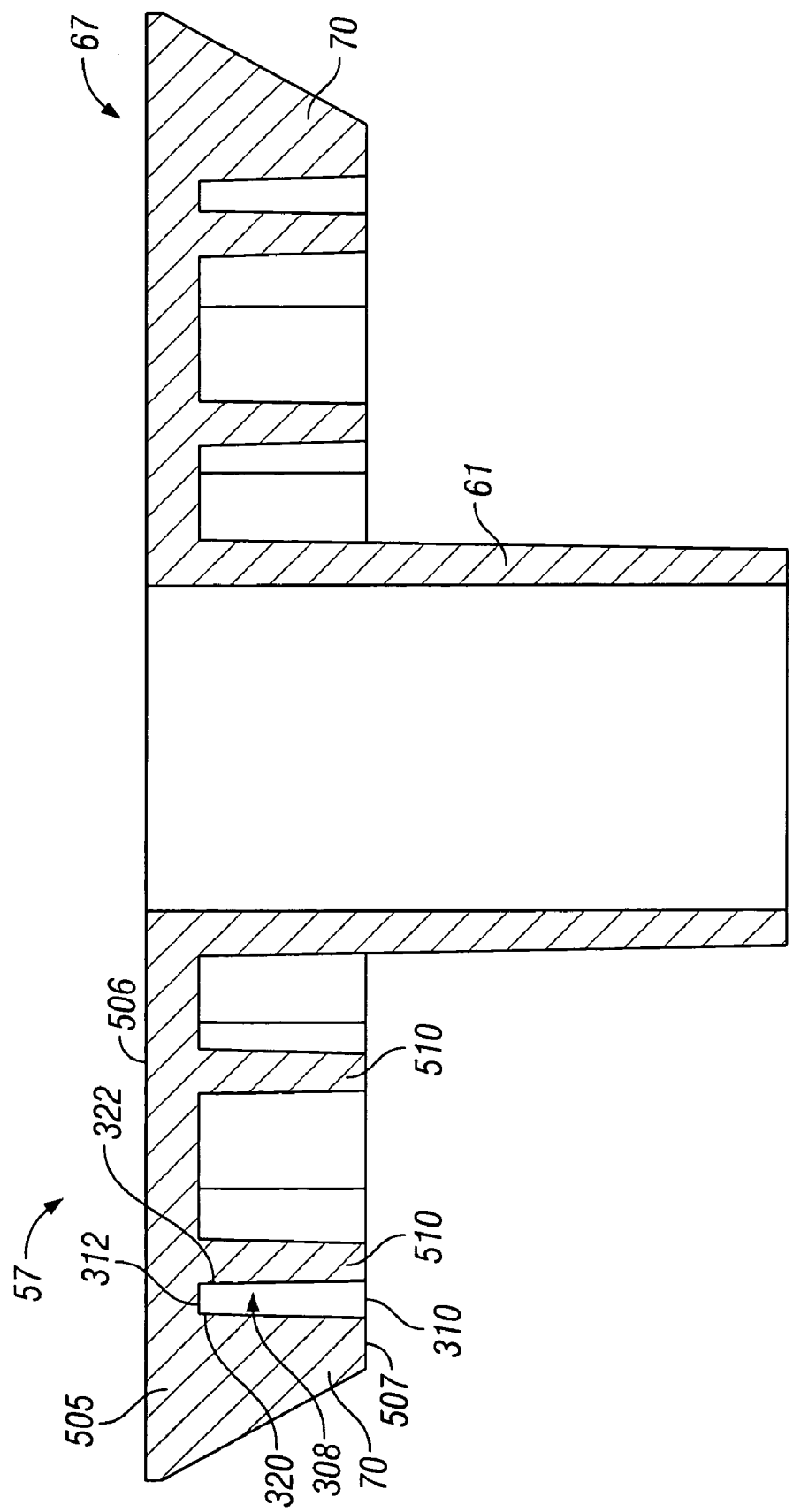
FIG. 33 is a cross-sectional side view along section line B-B' in FIG. 31.

As seen for example in FIG. 29, each finger 70 is also radially separated from portions of the engagement member 67 by an axially and circumferentially extending annular groove or slot 308. Slot 308 as best seen in FIG. 33 extend axially from the axially outwardly directed lower surface 507 of the engagement member 67 from an axially open end 310 to an axially closed or blind end 312, with the slots 308 being defined between two radially spaced side walls 320 and 322. As seen in FIG. 31, each slot 308 varies in its radial width, in the sense that the radial distance between the side wall 320 and 322 is less at circumferential end portions 324 than over a middle portion 326.

The axially extending slots 84 and 308 provided in the annular ring-like engagement member 67 assist in permitting the deflection of the resilient member 67 from the unbiased inherent configuration to the deflected configurations, for example, within the deflection of the resilient member from the unbiased inherent configuration to the deflected configurations the spaced side walls 526 and 528 being displaced relative to each other and/or the spaced side walls 320 and 322 being displaced relative to each other. The slots 84 and 308 provide for reduced dimension bridge portions shown as bridge portions 85 in FIG. 33 and thickness bridge portions 309 on FIG. 38 where deformation and bending of the engagement member may more easily occur assisting in the engagement member deflecting as may be desired. The bridge portions are reduced in axial dimension compared to other portions of the engagement member and providing such or other reduced width portions can be adopted as one method for providing desired flexibility to the engagement flange.

The disc 67 has a grid work of reinforcing ribs 510 which extend axially downwardly from under the top 505 and may easily be molded by injection molding.

The disc 67 is adapted to be compressed radially and to also deflect axially. FIGS. 28, 29, 30 and 31 show the piston element 57 with the disc 67 in an inherent unbiased position.

Figure 34:
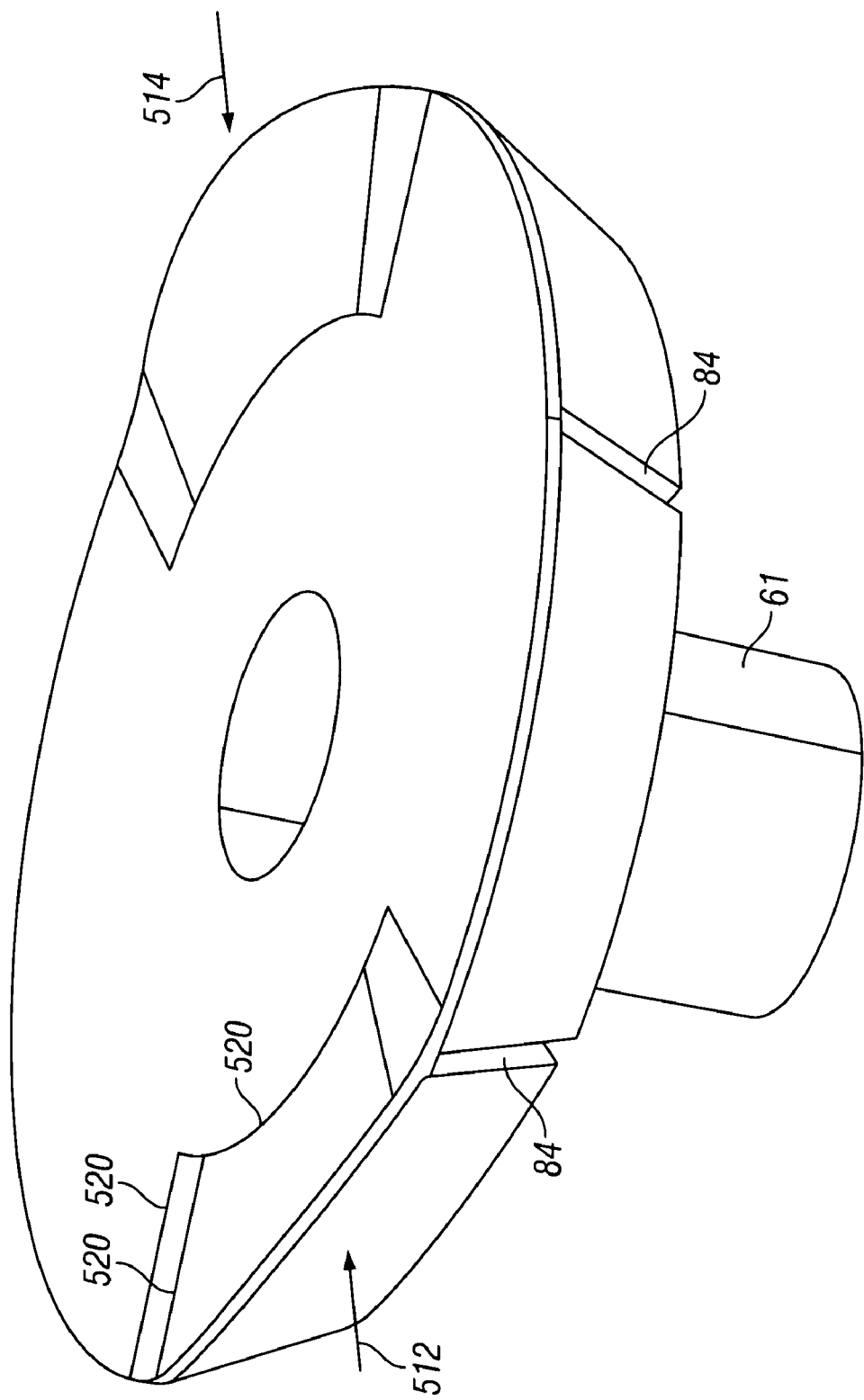
FIG. 34 is a top pictorial view of the outer portion of the piston element shown in FIG. 28 but in a deflected position.
Figure 35:
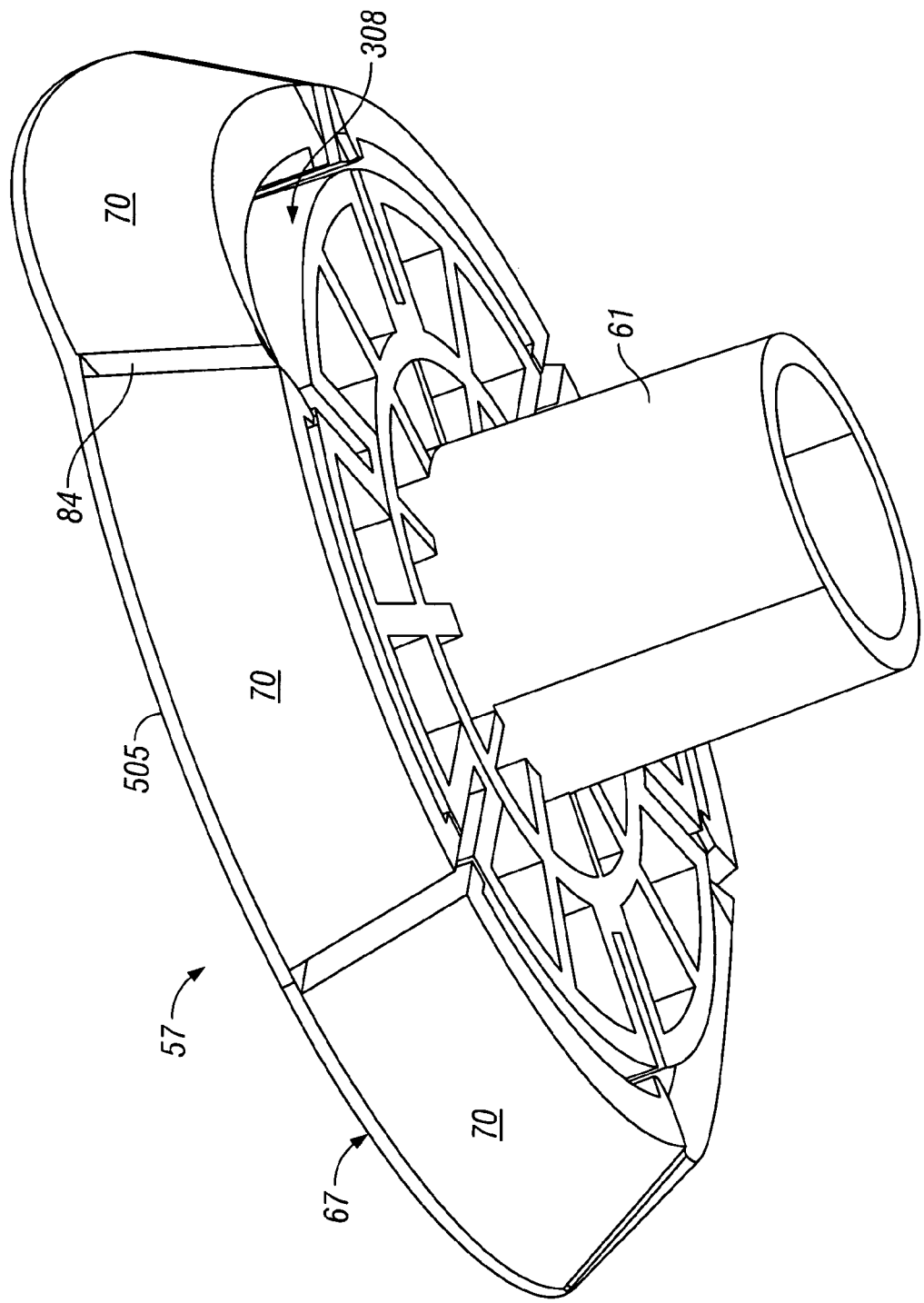
FIG. 35 is a bottom pictorial view of the piston element shown in FIG. 34.
Figure 36:
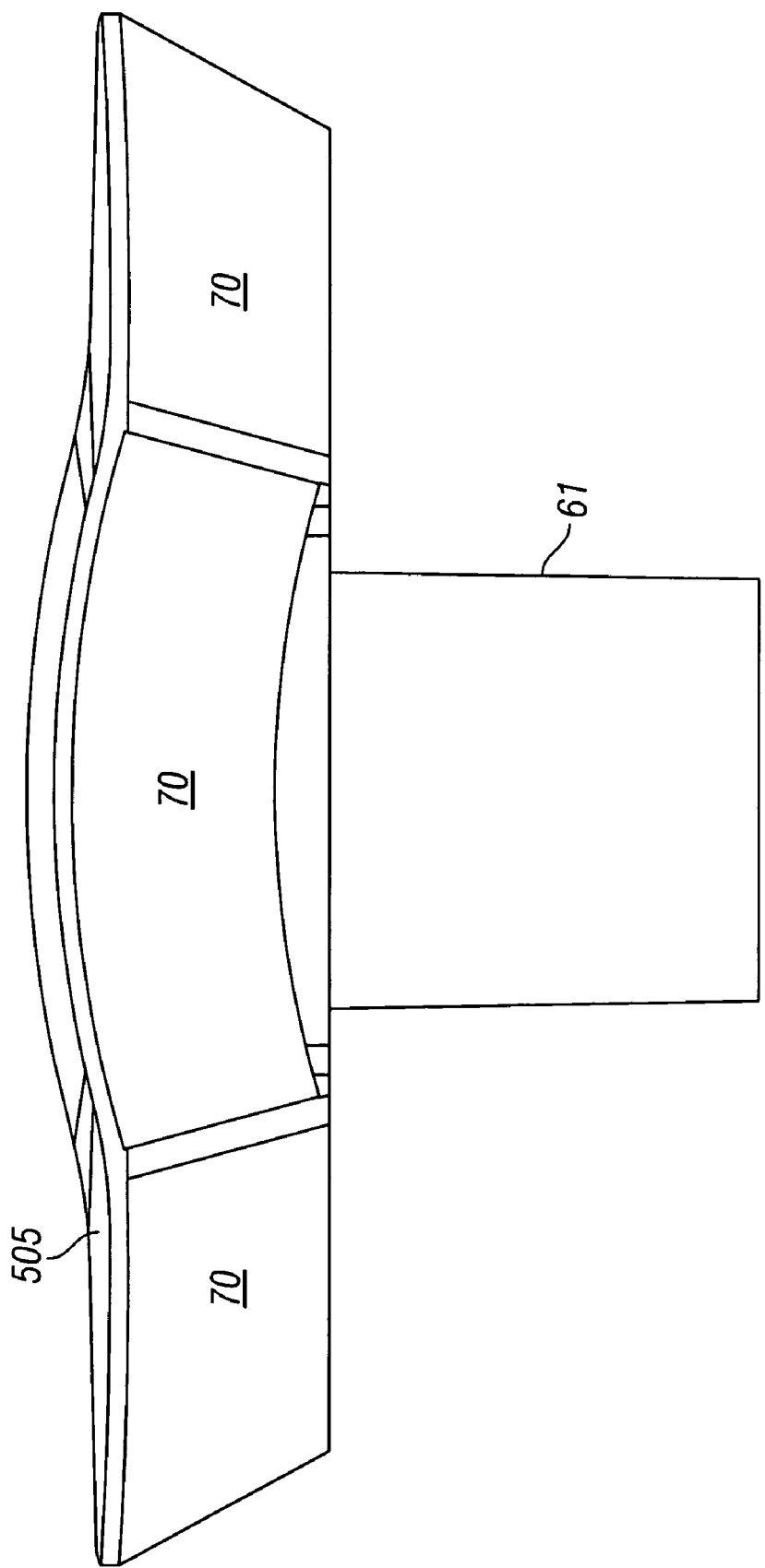
FIG. 36 is a front view of the piston element of FIG. 34.
Figure 37:
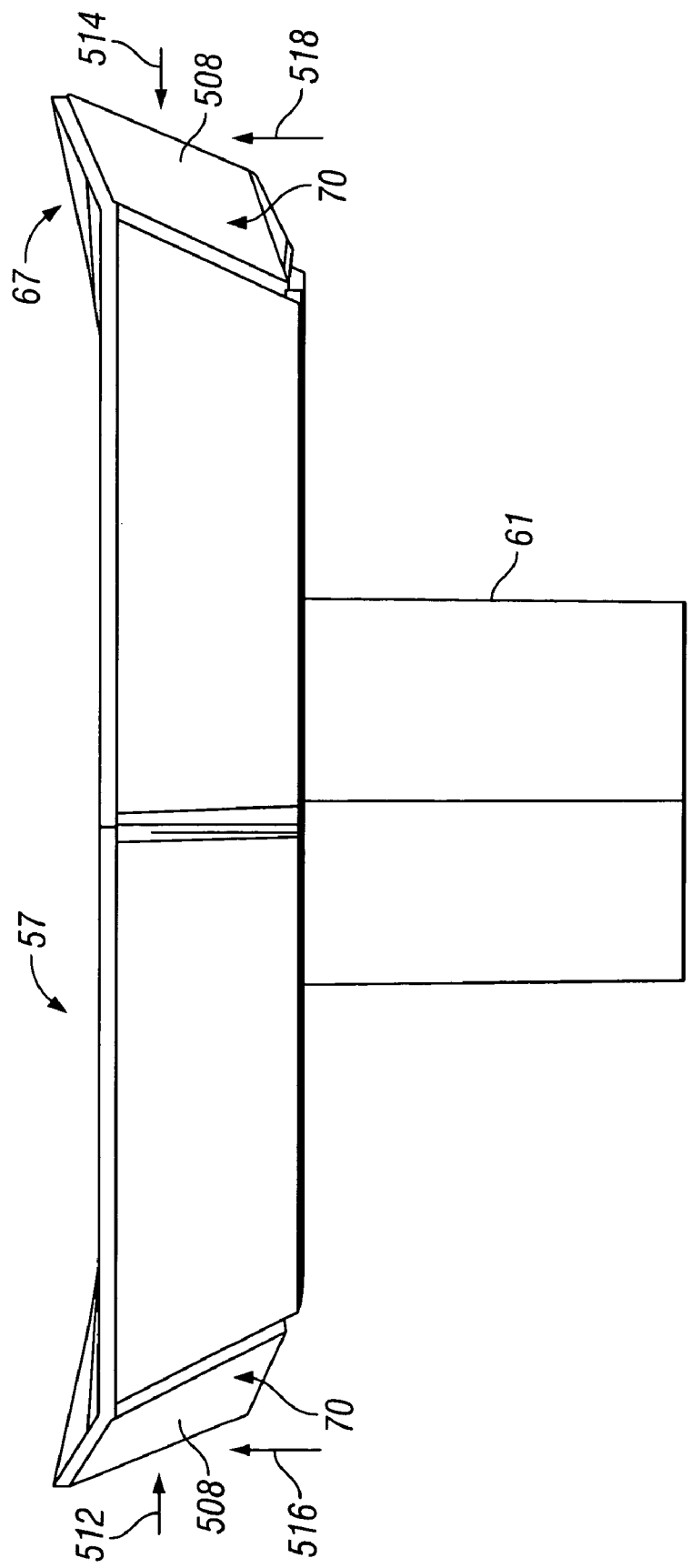
FIG. 37 is a side view of the piston element of FIG. 34.

FIGS. 34 to 37 show the piston element 57 with the disc 67 in the same deflected position, which the disc 67 would assume if compressed diametrically as between two arrows shown as 512 and 514 in FIGS. 34 and 37, and/or axially as also by arrows 516 and 518 shown in FIG. 37, as with each acting on the surface 508 of the two diametrically opposed fingers 70. Since the resilient disc 67 is made of resilient material, preferably an elastomer, plastic or rubber, the disc 67 will assume the deflected position shown in FIGS. 34 to 37 with two of the fingers 70 deflected axially inwardly and marginally radially inwardly. FIG. 34 schematically shows on the upper surface 506 solid lines illustrating boundaries between different planes which the upper surface 506 may assume when deflected. These planes 520 are shown to assist in visualizing the changes to the upper surface 506 when deflected.

FIGS. 36 and 37 best show the fingers 70 as deflected axially upwardly and marginally radially inwardly.

Figure 32:
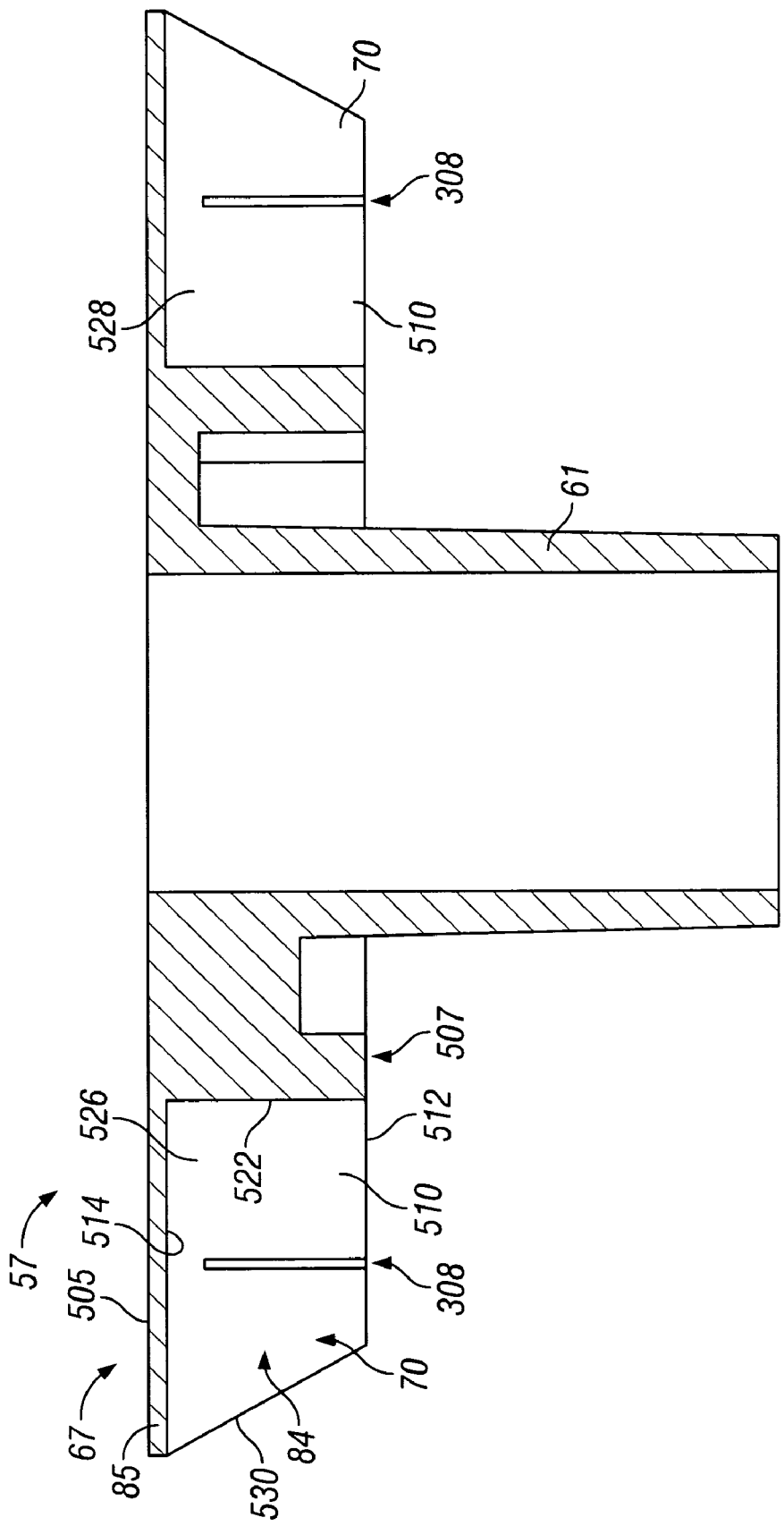
FIG. 32 is a cross-sectional side view along section line A-A' in FIG. 31.

Each finger 70 is effectively only joined to the piston element 57 by the top 505 which bridges the slots 84 between adjacent finger members 70 as seen in FIG. 32 and which bridges the slots 308 between generally a circumferentially extending downwardly extending rib 510 radially inwardly from the finger members 70 as seen in FIG. 33. The relative flexibility, size and thickness of the top 505 as well as those of the finger members 70 can be selected to develop desired abilities of the fingers 70 to deflect.

Figure 38:
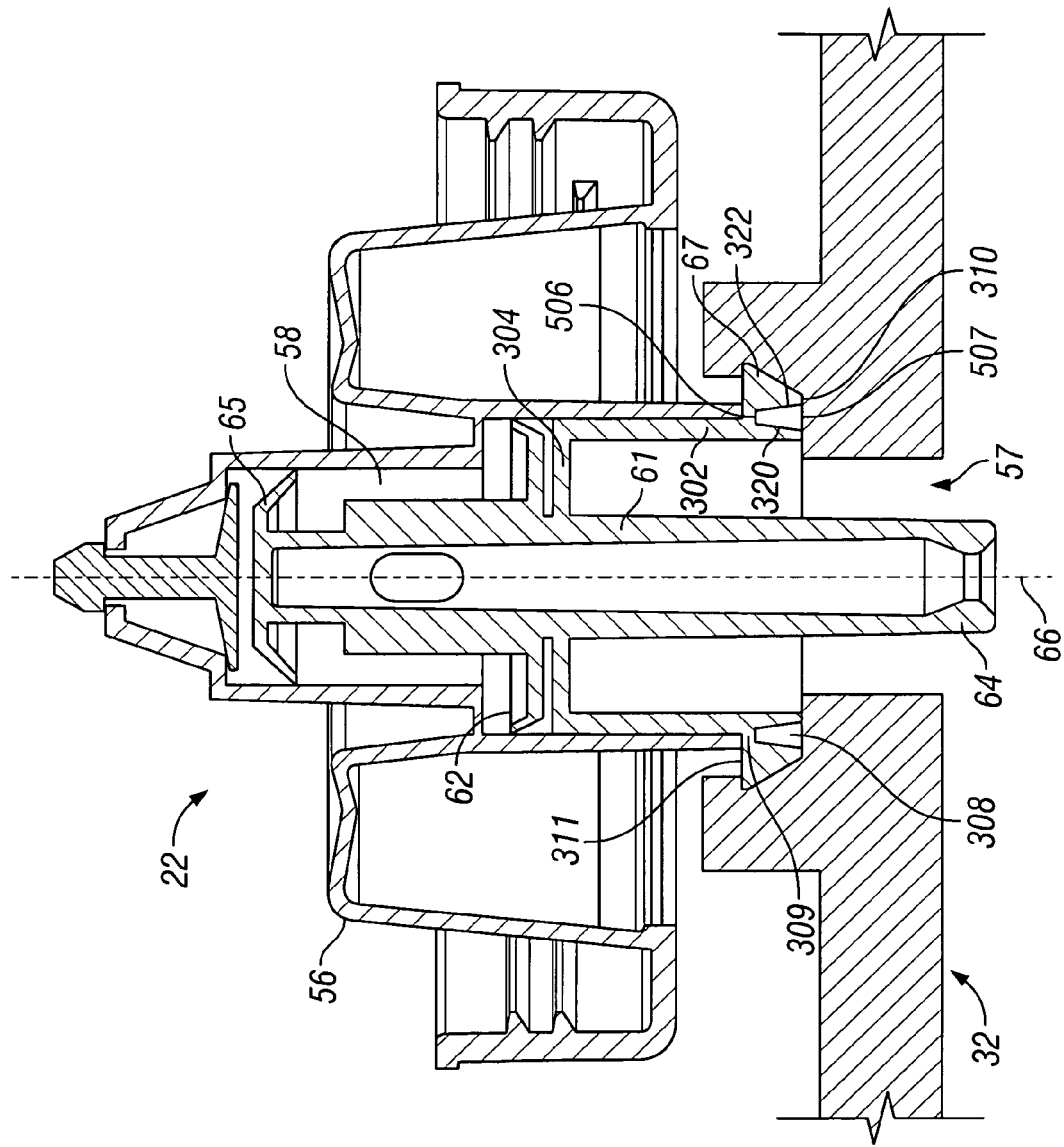
FIG. 38 is a schematic cross-sectional side view of a piston pump coupled to an actuator showing a further embodiment of the present invention having similarities to the embodiment shown in FIG. 2.

Reference is made to FIG. 38 showing a schematic cross-sectional side view of selected portions from FIG. 2 including but portions of the actuator plate 32 and a valve assembly 22 similar to that shown in FIG. 2. In FIG. 38 for convenience other elements such as the reservoir 12 and the other elements of the dispenser other than actuator 32 are not shown.

FIG. 38 illustrates a modified form of valve assembly 22 over that shown in FIG. 2 but otherwise the teachings of FIG. 2 are applicable.

In FIG. 38, as in FIG. 2, the valve assembly 22 comprises a piston pump. The piston pump 22 illustrated is a draw back piston pump of the type described in U.S. Pat. No. 7,267,251 to Ophardt issued Sep. 11, 2007, the disclosure of which is incorporated by reference. In FIG. 38, the piston pump 22 has a piston chamber-forming element 56 and a piston element 57. The piston element 57 has a hollow stem 61 that carries the inner flange 65 and the outer flange 62 to engage the inner wall of the dispensing chamber 58 as in the case in FIG. 2 with the difference that in FIG. 38 the chamber 58 is stepped in diameter.

The piston element 57 carries on its stem 61 the resilient engagement member 67 which removably couples to the actuator plate.

The engagement member 67 comprises an annular ring which is supported on the stem 61 at the axial outer end of a cylindrical flange 302 secured at an axial inner end to the stem 61 by a radially extending support flange 304.

The engagement member 67 in FIG. 38 has an ability to be deflected to engage and disengage with the actuator member 32 by reason of an axially inwardly extending annular slot or groove 308 being provided in the engagement member 67.

Figure 39:
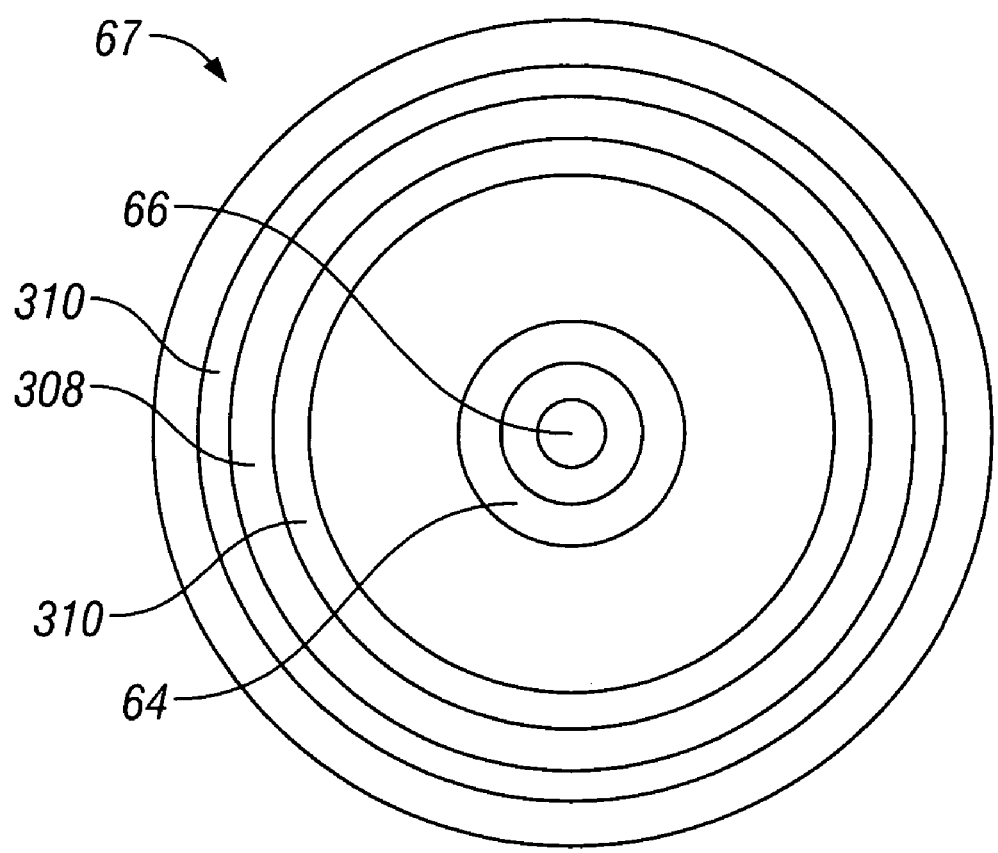
FIG. 39 is an end view of the outer end of piston element shown in FIG. 38.
Figure 40:
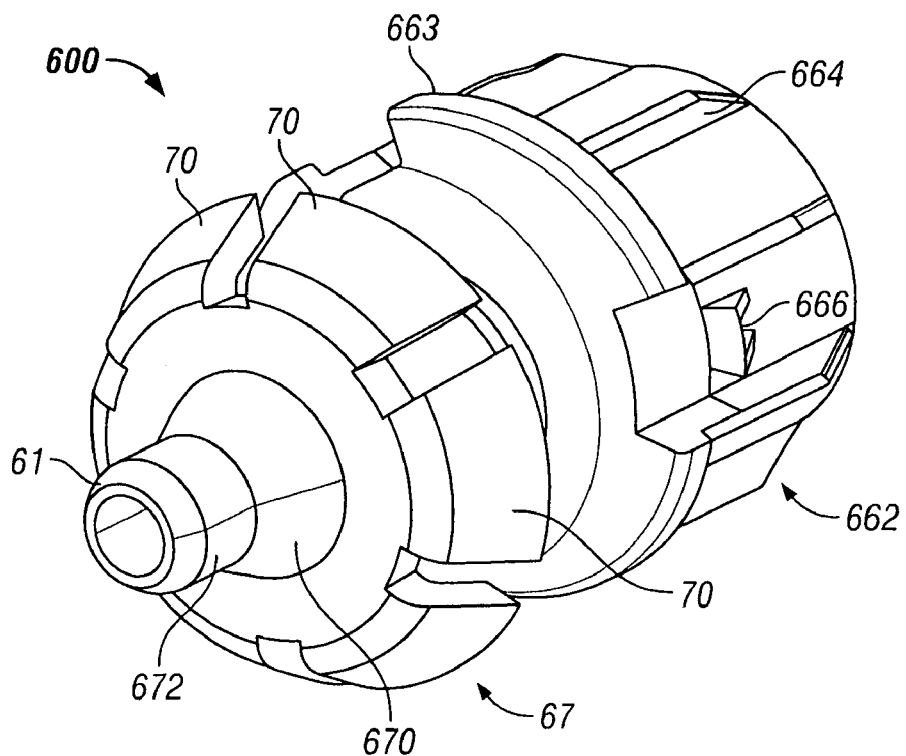
FIG. 40 is a pictorial view of an end plug for a roll of material in accordance with a further embodiment of the present invention.

Whereas in the engagement member 67 shown in FIG. 2, the engagement member 67 has a plurality of finger members 70, the engagement member 67 in FIG. 38 is a continuous annular member with the annular slot or groove 308 as seen in FIG. 39. For ease of manufacture, the annular groove 308 extends axially inwardly from the axially outwardly directed lower surface 507 of the engagement member 67, however, the annular groove 308 could extend axially outwardly in the axially inwardly directed upper surface 506. Merely one annual groove 308 is shown, however, a plurality of such grooves could be provided.

In accordance with the present invention, the engagement member 67 preferably is made from a resilient material such as elastomeric plastic material. The resiliency of the material forming the engagement member 67 can be considered by a person skilled in the art in selecting suitably sized and located annular axially extending grooves such as the groove 308 illustrated so as to provide a desired ability of the engagement member 67 to deflect in a manner as to engage and disengage from engagement with any desired configurations of the actuator plate 32.

While the annular groove 308 is illustrated as being circular about the central axis 66, this is not necessary and the annular groove 308 could have side walls which are not circular about the axis 66 such as being as seen in the end view scalloped or zig-zagged.

The annular groove 308 is configured so as to preferably provide for both radially and axially deflection of the engagement member 67 as can be advantageous for engagement and disengagement with various configurations of the actuator plate as are disclosed in the various embodiments in this invention.

As seen in FIG. 38, the annular groove has a blind end 312 and extends outwardly to an open end 314 with each of the side walls 320 and 322 tapering from the blind end 312 outwardly to the open end 314. This is not necessary however is generally believed to be preferred.

The annular groove 308 is shown as being a continuous annular groove which extends circumferentially about the engagement member 67. This is not necessary and one or more discrete length annular grooves may be provided so as to provide a desired resiliency. It is believed however that an annular groove which extends entirely circumferentially about the engagement member 67 is preferred.

More than one such annular groove 308 may be provided as may be desired to provide suitable compromise between resilience and ease of manufacture.

Insofar as the engagement member 67 may comprise a plurality of finger members 70 as shown, for example, in the first embodiment of FIG. 2, then it would be possible to provide similar such an annular groove 308 on all or selected of the finger members 70.

In FIG. 38, the engagement member 67 is shown carried on the cylindrical flange 302 which in turn is connected to the stem 61. However, it is to be appreciated that an engagement member 67 with an annular groove 308 as shown in FIG. 38 could be provided or directed supported on the stem 61 to extend radially outwardly therefrom as a disc as in the manner that the finger member 70 are supported on the stem 61 in FIG. 2.

Figure 41:
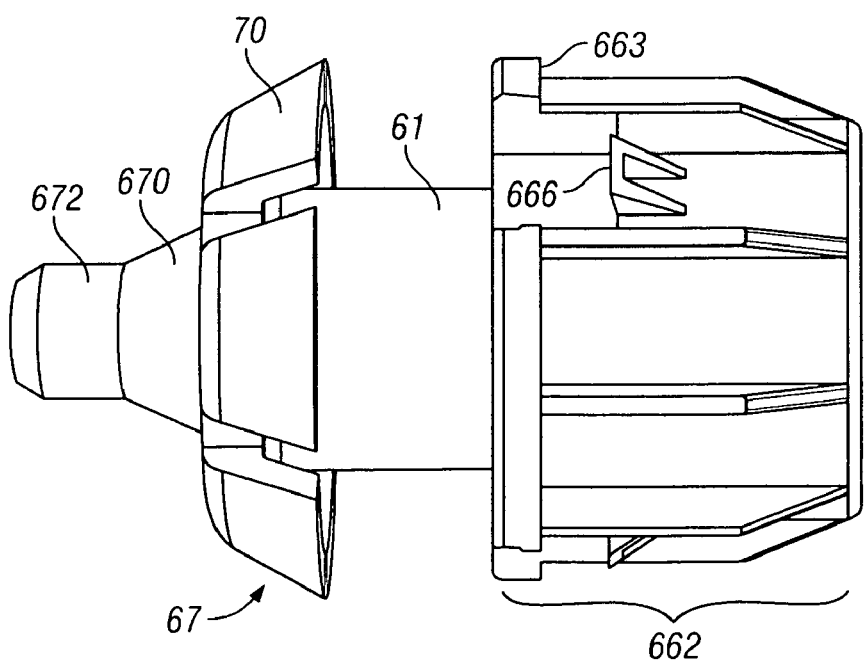
FIG. 41 is a side view of the end plug shown in FIG. 40.
Figure 42:
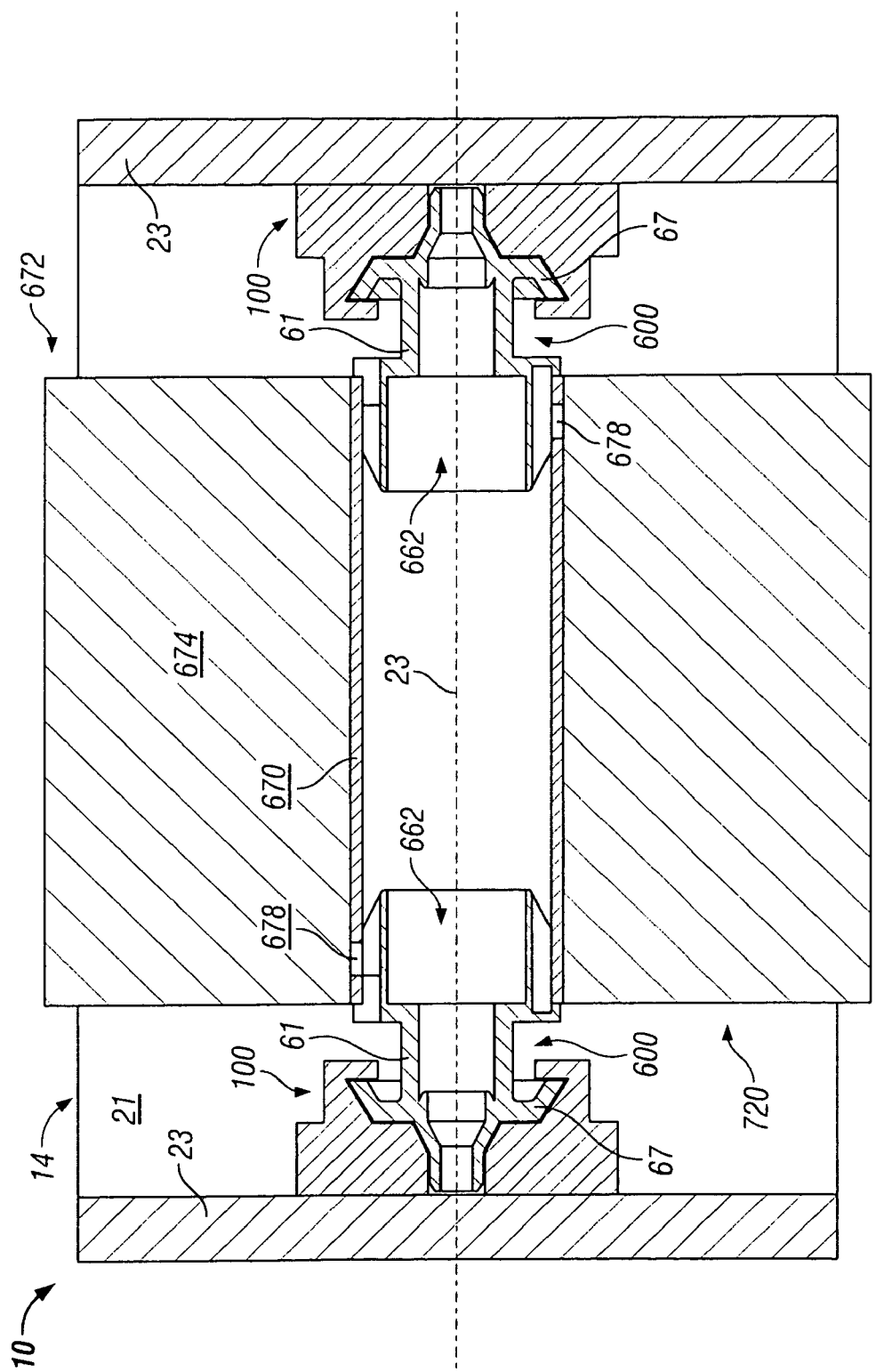
FIG. 42 is a schematic front view vertical cross-section of a dispenser for paper on a roll using end plugs as shown in FIGS. 40 to 42 in conjunction with catch members.
Figure 43:
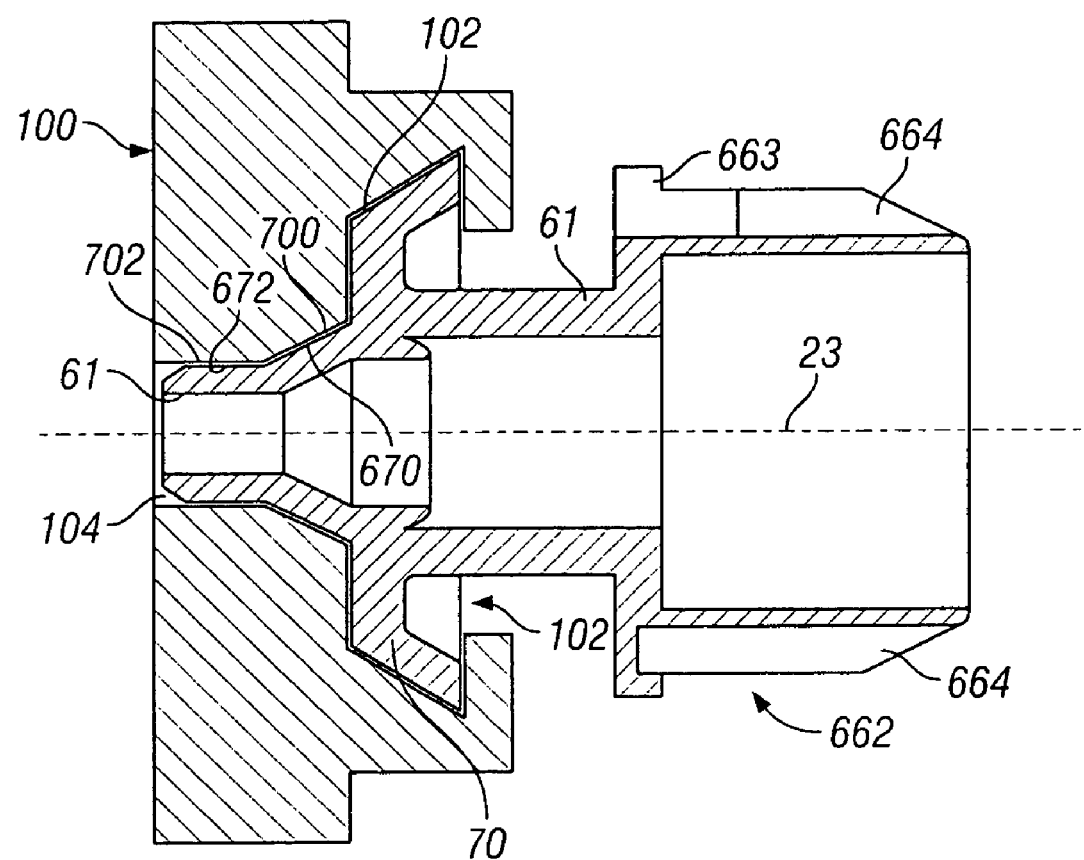
FIG. 43 is a cross-sectional view of one end plug and its catch member as shown in FIG. 42.
Figure 44:
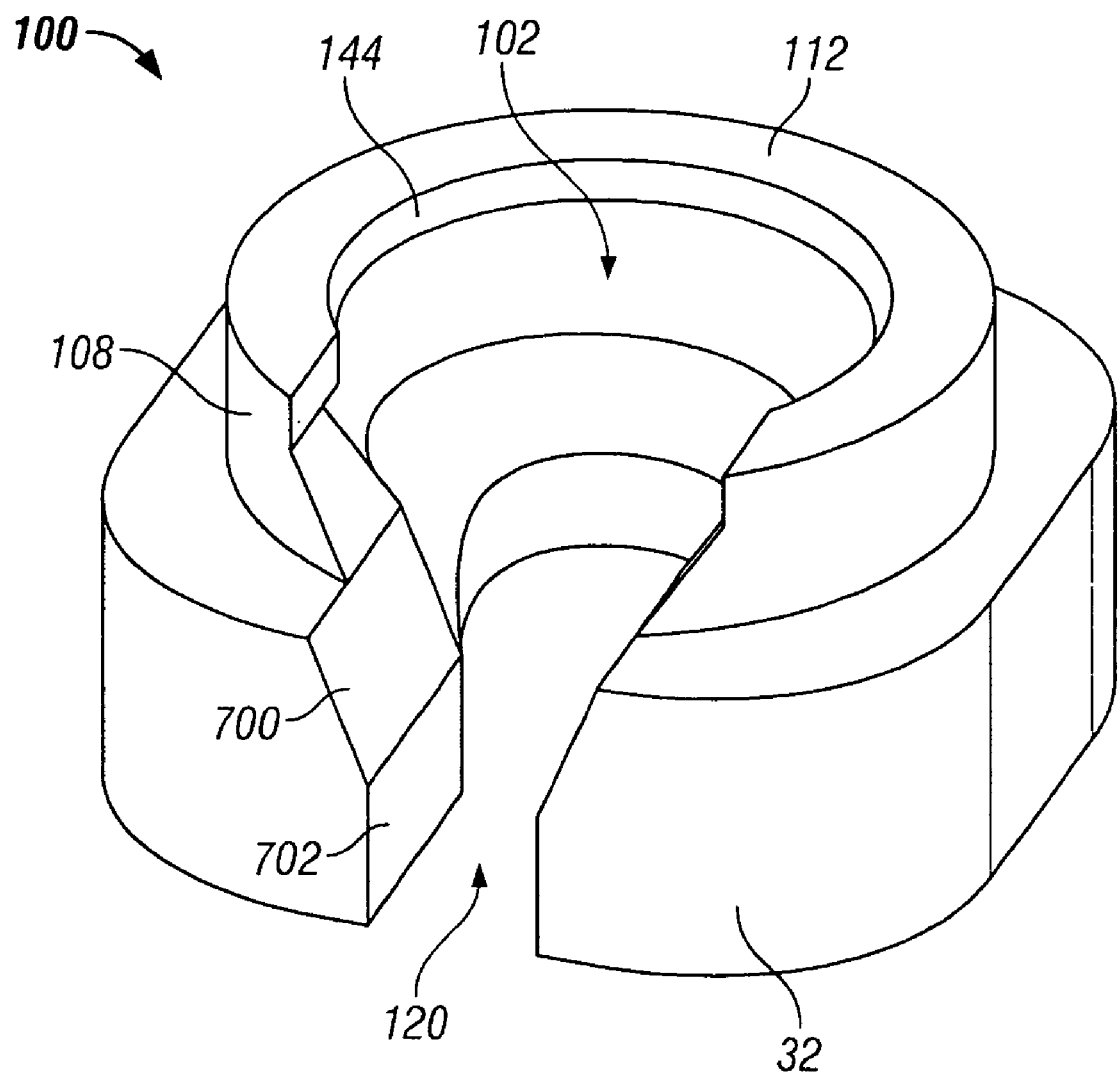
FIG. 44 is a pictorial view of the catch members shown in FIGS. 42 and 43.

Reference is made to FIGS. 40 to 44 which illustrate the use of a catch member and a resilient member substantially the same as that disclosed for use with fluid dispensers in the earlier embodiments of FIGS. 1 to 39 but in the context of a dispenser for dispensing paper mounted on a roll. FIG. 43 is a vertical cross-section through a dispenser 10. The dispenser 10 includes a housing generally indicated 14, a backplate 21, typically to be mounted vertically to a wall as in a washroom and two side walls 23 which extend vertically and forwardly from the back wall 21. On the inside of each of the side walls 23, there is mounted a catch member 100 as seen in FIG. 44 which is substantially the same as the catch member 100 shown in FIG. 8. Two end plugs 600 are shown each having a stem 61 carrying a roll engaging portion 662 and an engagement member 67. Each end plug 600 has its cylindrical plug portion 662 mounted in a hollow core 670 of a roll of paper 672 carrying rolled layers of paper sheeting 674 which is to be dispensed. The engagement member 67 of each end plug comprises resilient fingers 70 substantially identical to the engagement member illustrated in FIG. 6. Each end plug 600 on an inner end carries the cylindrical portion 662 on its inner end. The cylindrical portion 662 has axially and radially outwardly extending flanges 664 which are adapted to be received in a friction fit inside the hollow core 670. The cylindrical portion 662 also includes a stop flange 663 to limit the extent to which the cylindrical portion 662 may be inserted into the end of the core 670. A fluke portion 666 is provided serving to engage the hollow core 670 and resist or prevent its removal.

The catch member 100 in FIGS. 41 to 43 is substantially identical to the catch member illustrated in FIG. 8 with the exception that the radial exitway 120 in FIG. 8 is modified firstly to have a width equal to the radius of the central opening 104 through the actuator plate 32 and secondly to have both a frustoconical portion 700 and a cylindrical journaling portion 702 which are marginally larger than corresponding frustoconical surfaces 670 and cylindrical journalled surfaces 672 on the stem 61 outwardly of the engagement member 67. The engagement member 67 is identical to that shown in FIG. 6. The stem 61 outwardly from the engagement member 67 is journalled in the catch member to locate the end plug 600 coaxially about the axis 23 relative to the catch member 100.

The roll of paper 672 with the two end plugs 600 secured thereto form a removable cartridge 13 which can be inserted into and removed from the dispenser 10.

The dispenser 10 in the preferred embodiment as seen in FIG. 42 is to have the exitway 120 of the catch member 100 preferably directed forwardly such that the removable cartridge 720 may be engaged from the dispenser 10 by sliding the cartridge 13 rearwardly such that each of the end plugs 600 have their engagement members 67 slide rearwardly into their respective catch member 100. Removal is by sliding the cartridge 13 forwardly.

Of course, it is within the scope of the invention that the catch members 100 can be arranged with their exitways 120 directed in any direction as, for example, upwardly, upwardly and forwardly or rearwardly provided that the removable cartridge 13 with a full roll of paper may be removably coupled and uncoupled therefrom. For example, the dispenser 10, while not shown, may have a removable cover to its housing 14 which may restrict the directions from which the replaceable cartridge may be inserted and removed.

Journalling of the hollow core 670 to the catch members 100 may be accomplished in a number of manners. In the preferred embodiment, journaling is substantially provided by reason of the stem 61 outwardly from the engagement member 67 being journalled in the central opening 104 of the catch member 100. However, the engagement member 67 may itself provide a journaling function with the relative gap and spacing between the engagement member 67 and the interior of the cavity 102 of the catch member 100 being selected to provide suitable journaling. Alternate journaling surfaces such as the cylindrical outside surface of the stem 61 between the engagement member 67 and the cylindrical plug portion 662 may be engaged by other bearing members not shown to assist in journaling alternatively with the stem 61 outwardly of the engagement member 67 not providing a journalling function or removed. Alternatively, each catch member 100 may be mounted to the side wall 23 of the dispenser for rotation.

The hollow core 670 of the roll of paper may preferably provide for coupling of each end plug 600 to the hollow core 670 against removal other than when all the paper has been removed from the hollow core. For example, the hollow core may preferably have slots 678 to engage the fluke portion 666 and only permit removal of end plug 660 as by destruction of the hollow core 670. The hollow core 670 may be provided, for example, of paper or other materials which merely permit destruction or disassembly of the hollow core 670 easily when all of the paper has been removed therefrom. The core 670 can be made with the end plugs 600 not removable therefrom.

The embodiment illustrated in FIGS. 40 to 44 shows the use of the catch member 100 and engagement member 67 in a dispenser for exchangeable rolls of paper preferably paper rolls. It is to be appreciated that the invention of FIGS. 40 to 43 is applicable to the dispensers of other roll material such as, for example, paper towels, kitchen paper, toilet paper, foil, plastic wrapping paper and other materials wound onto a roll, whether or not mounted with the axis horizontal or vertical or otherwise.

The preferred paper dispenser illustrated shows the replaceable cartridge 13 being able to be inserted merely by sliding of the end plug 600 radially relative to the axis 23 through the individual catch members 100. However, an advantageous arrangement of a dispenser in accordance with the present invention is to have one of the catch members 100 mounted to its side wall 23 for pivoting about a vertical axis. The pivotally mounted catch member may be pivoted such that its axis 102 is directed forwardly of the dispenser and this in configuration, one of the end plugs 600 may be coupled to the pivoted catch member 100 by the engagement member 67 moving axially into the cavity 102. Thereafter, with the pivotable catch member 100 pivoted relative to the side wall 23 to the normal operation, the other end plug 60 may then become engaged in the other catch member 100 by radial insertion. The catch member 100 which is pivotally mounted to the side wall 23 for pivoting may have its exitway directed vertically upwardly as contrasted, for example, with the other catch member 100 having its exitway directed forwardly or forwardly and upwardly.

Insofar as the end plugs 600 are provided to the hollow core 670 so as to be not removable therefrom, the configuration of the engagement member 67 and the configuration of the interior cavity 102 can be provided to be of complementary shape so as to prevent insertion of a replaceable cartridge which does not have end plugs 600 carrying engagement member 67 of desired shapes compared to the cavities 100 of the catch members.

The embodiment of FIGS. 40 to 44 illustrates a paper roll dispenser using an engagement member 67 and catch member 100 substantially as shown in FIGS. 1 to 13. However, other embodiments of resilient engagement members shown in the other Figures may readily be adapted for use with the paper roll dispenser.

While the invention has been described with reference to preferred embodiments, it is not so limited. Many variations and modifications will now occur to persons skilled in the art. For a definition of the invention, reference may be made to the appended claims.

We claim:

1. A dispenser for dispensing fluid comprising:
    a housing,
    a replaceable cartridge containing material to be dispensed, the cartridge comprises:
    (a) a fluid containing reservoir having an outlet, and
    (b) a valving mechanism disposed across the outlet for dispensing fluid from the reservoir,
    the housing supporting the cartridge in a dispensing position,
    the cartridge being insertable into said housing to assume said dispensing position for dispensing fluid and removable therefrom for replacement,
    the housing including a catch member,
    the cartridge including an engagement mechanism disposed about an axis to engage the catch member and releasably couple the cartridge to the housing in a coupled orientation,
    the engagement mechanism comprising a resilient member extending radially outwardly from the cartridge in an unbiased inherent configuration, the resilient member being resiliently deflectable radially from the inherent configuration to deflected configurations of different radial extents than the inherent configuration and biased to return to the inherent configuration when deflected from the inherent configuration,
    the valving mechanism comprising a reciprocally movable element for reciprocal movement along the axis relative to the housing when the reservoir is in the dispensing position to dispense fluid,
    the housing including an actuator mechanism for actuating the reciprocally movable element, the actuator mechanism movable relative the housing between a first position and a second position, the actuator mechanism carrying the catch member,
    the movable element carrying the engagement mechanism to engage the catch member and releasably couple the movable element to the actuator mechanism in the coupled orientation in which movement of the actuator mechanism between the first position and the second position results in axial reciprocal movement of the movable element,
    the movable element having a fluid discharge passageway axially therethrough through which fluid from the reservoir is dispensed axially through the movable element, the discharge passageway having an inner end which receives fluid from the outlet of the reservoir and an outer end out of which fluid is dispensed,
    wherein from the coupled orientation on moving the cartridge radially relative the catch member engagement between the catch member and the resilient member deflects the resilient member radially from the inherent configuration to one of the deflected configurations permitting the resilient member and catch member to move radially from the coupled orientation to a radial uncoupled orientation in which the cartridge may be removed from the housing,
    in the coupled orientation the resilient member while in the inherent configuration engaging with the catch member to prevent moving the movable element radially relative the catch member from the coupled orientation to the radial uncoupled orientation.

2. A dispenser as claimed in 1 wherein:
    the catch member having a central cavity formed therein coaxially about the axis, and
    wherein in the coupled orientation the movable element located coaxially within the cavity.

3. A dispenser as claimed in claim 2 wherein the catch member including a radial exitway extending radially from the cavity for passage of the movable element in moving from the coupled orientation to the radial uncoupled orientation,
    the exitway having a circumferential extent relative the axis which permits movement of the movable element radially relative the catch member through the exitway when the resilient member is in one of the deflected configurations yet preventing movement of the movable element radially relative the catch member through the exitway when the resilient member is in the inherent configuration.

4. A dispenser as claimed in claim 3 wherein the cavity is defined within a circumferential axially extending side wall of the catch member with the exitway extending radially through the side wall,
    the side wall having an interior surface facing radially inwardly into the cavity,
    exit camming surfaces on the interior surface of the side wall on opposite circumferentially spaced sides of the exitway for engagement with the resilient member such that from the coupled orientation on moving the movable element radially outwardly into the exitway engagement between the opposed exit caroming surfaces and the resilient member compresses the resilient member radially to reduce the width of the movable member normal to the axis sufficiently that the movable member may pass radially through the exitway from the coupled orientation to the radial uncoupled orientation, and
    in the coupled orientation the resilient member while in the inherent configuration engaging with the interior surface of the side wall of the catch member to prevent moving the movable element radially relative the catch member from the coupled orientation to the radial uncoupled orientation by reason of the exitway having a width normal to the axis less than a diameter of the resilient member while in the inherent configuration.

5. A dispenser as claimed in claim 4 wherein:
    the side wall having an exterior surface facing radially outwardly from the cavity,
    entry caroming surfaces on the exterior surface of the side wall on opposite circumferentially spaced sides of the exitway for engagement with the resilient member such that from the radial uncoupled orientation on moving the movable element radially inwardly into the exitway engagement between the opposed entry camming surfaces and the resilient member compresses the resilient member radially to reduce the width of the movable member normal to the axis sufficiently that the movable member may pass radially through the exitway from the radial uncoupled orientation to the coupled orientation.

6. A dispenser as claimed in 5 wherein:

the catch member including an axial entranceway extending circumferentially about the axis axially into the cavity for passage of the movable element in moving from an axial uncoupled orientation in which the movable element is axially aligned with the cavity axially spaced therefrom to the coupled orientation, the entranceway having a diametrical extent which permits movement of the movable element axially relative the catch member through the entranceway when the resilient member is in one of the deflected configurations yet preventing movement of the movable element axially relative the catch member through the entranceway when the resilient member is in the inherent configuration.

7. A dispenser as claimed in claim 6 wherein:

the cavity is defined between a radially extending inner end wall and a radially extending outer end wall spaced axially from the inner end wall, the entranceway extending axially through the inner end wall, the inner end wall having exterior surfaces facing axially inwardly from the chamber, entry camming surfaces on opposite radially spaced sides of the exterior surfaces of the inner end wall about the entranceway for engagement with the resilient member such that from the axial uncoupled orientation on moving the movable element axially into the entranceway engagement between the opposed entry camming surfaces and the resilient member compresses the resilient member radially to reduce the width of the movable member normal to the axis sufficiently that the movable member may pass axially through the entranceway from the axial uncoupled orientation to the coupled orientation, in the coupled orientation the resilient member while in the inherent configuration engaging with the interior surface of the inner end wall of the catch member to prevent moving the movable element axially relative the catch member by reason of the entranceway having a diameter less than a diameter of the resilient member while in the inherent condition.

8. A dispenser as claimed in 7 wherein:

the resilient member comprises a plurality of resilient finger members spaced circumferentially of the axis about the movable element, each finger member coupled to the movable element at a radially inner end of the finger member and extending radially outwardly to a distal end portion, each, finger member assuming in the inherent configuration an unbiased position, each finger member being resiliently deformable from its unbiased position to biased positions; (a) in which the distal end portion is moved radially inwardly sufficiently to let the distal end portions move radially through the radial exitway of the catch member in a radial direction, and (b) in which the said distal end portions is moved radially inwardly sufficiently to let the distal end portions move axially through the axial entranceway of the catch member in an axial direction.

9. A dispenser as claimed in 5 wherein:

the cavity is defined between two axially spaced radially extending end walls of the catch member comprising an inner end wall having an interior surface directed axially outwardly into the chamber and an outer end wall having an interior surface directed axially inwardly into the chamber, in the coupled orientation engagement between the axially directed surfaces on the movable element and the interior surfaces of the inner and outer end walls maintaining the movable element in the cavity against removal therefrom by movement in an axial direction, said resilient member comprises a plurality of resilient finger members spaced circumferentially of the axis about the movable element, each finger member coupled to the movable element at a radially inner end of the finger member and extending radially outwardly to a distal end portion, each finger member assuming in the inherent configuration an unbiased position, each finger member being resiliently deformable from its unbiased position to biased positions in which the distal end portion is moved radially inwardly, the finger members are resiliently deformable from their respective unbiased positions to biased positions in which the distal end portions are moved radially inwardly sufficiently to let the distal end portions move radially through the catch member of the actuator member in a radial direction from the coupled orientation to the radial uncoupled orientation, the resilient finger members extending both radially outwardly and axially inwardly from their radially inner end to their distal end, the finger members having axially outwardly and radially outwardly directed cam surfaces for engagement with the exit camming surfaces on opposite circumferentially spaced sides of the exitway to compress the resilient member radially, the finger members having an axially inwardly facing catch surface axially inwardly of the cam surfaces to engage the interior surface of the first inner end wall, the finger members having an axially outwardly facing catch surface axially outwardly of the cam surfaces to engage the interior surface of the outer end wall.

10. A dispenser as claimed in claim 2 wherein the catch member having a central cavity formed therein coaxially about the axis, and wherein in the coupled orientation the movable element located coaxially within the cavity, the cavity is defined within a circumferential axially extending side wall between a radially extending inner end wall and a radially extending outer end wall spaced axially from the inner end wall, the cavity having an exitway extending radially through the side wall, the side wall having an interior surface facing radially into the cavity, the inner end wall having an axially outwardly directed interior surface facing axially into the cavity, the outer end wall having an axially inwardly directed interior surface facing axially into the cavity, keyway portions of each of the interior surfaces of the side wall, the first end wall and the second end wall lying in a first rotational surface defined by rotation of a first shape about the axis, key portions of the exterior surfaces of the movable member lying in a second rotational surface defined by rotation about the axis when the movable member is coaxial about the axis of a second shape substantially having the same shape as the first shape.

11. A dispenser as claimed in 1 wherein the resilient member comprises an annular ring member about the axis,
one or more axially extending slots are provided in the annular ring member assisting deflection of the resilient member from the unbiased inherent configuration to the deflected configurations,
wherein each slot is selected from the group consisting of: (a) a slot which extends axially through the resilient member, and (b) a slot which extends axially from an axially open end of the slot on an axially directed surface on the resilient member to a blind end of the slot in the resilient member.

12. A dispenser as claimed in 1 wherein the resilient member comprises an annular ring member about the axis,
an axially extending annular slot provided in the annular ring member assisting deflection of the resilient member from the unbiased inherent configuration to the deflected configurations,
the slot extending axially from an axially open end of the slot on an axially directed surface on the resilient member to a blind end of the slot in the resilient member, and the slot extending annularly about the axis, and
the slot defined between a pair of radially spaced opposed slot side walls with each side wall extending from the blind end to the open end,
wherein in deflection of the resilient member from the unbiased inherent configuration to the deflected configurations the spaced side walls are displaced relative to each other.

13. A dispenser as claimed in 1 wherein:
the catch member having a central cavity formed therein coaxially about the axis, and
wherein in the coupled orientation the movable element located coaxially within the cavity,
the catch member including a radial exitway extending radially from the cavity for passage of the movable element in moving from the coupled orientation to the radial uncoupled orientation,
the exitway having a circumferential extent relative the axis which permits movement of the movable element radially relative the catch member through the exitway when the resilient member is in one of the deflected configurations yet preventing movement of the movable element radially relative the catch member through the exitway when the resilient member is in the inherent configuration,
the resilient member comprises a plurality of resilient finger members spaced circumferentially of the axis about the movable element,
each finger member coupled to the movable element at a radially inner end of the finger member and extending radially outwardly to a distal end portion,
each finger member assuming in the inherent configuration an unbiased position,
each finger member being resiliently deformable from its unbiased position to biased positions; (a) in which the distal end portion is moved radially inwardly sufficiently to let the distal end portions move radially through the radial exitway of the catch member in a radial direction, and (b) in which the said distal end portions is moved radially inwardly sufficiently to let the distal end portions move axially through the axial entranceway of the catch member in an axial direction.

14. A dispenser as claimed in claim 13 wherein the cavity is defined within a circumferential axially extending side wall of the catch member with the exitway extending radially through the side wall,
the side wall having an interior surface facing radially inwardly into the cavity,
exit camming surfaces on the interior surface of the side wall on opposite circumferentially spaced sides of the exitway for engagement with the resilient member such that from the coupled orientation on moving the movable element radially outwardly into the exitway engagement between the opposed exit camming surfaces and the resilient member compresses the resilient member radially to reduce the width of the movable member normal to the axis sufficiently that the movable member may pass radially through the exitway from the coupled orientation to the radial uncoupled orientation, and
in the coupled orientation the resilient member while in the inherent configuration engaging with the interior surface of the side wall of the catch member to prevent moving the movable element radially relative the catch member from the coupled orientation to the radial uncoupled orientation by reason of the exit way having a width normal to the axis less than a diameter of the resilient member while in the inherent configuration.

15. A dispenser as claimed in claim 1 wherein the resilient member comprises an annular ring member about the axis, and
one or more axially extending slots are provided in the annular ring member assisting deflection of the resilient member from the unbiased inherent configuration to the deflected configurations.

16. A dispenser as claimed in claim 15 wherein:
each slot also extends either radially or annularly about the axis, and
each slot is defined between a pair of spaced opposed slot side walls, in deflection of the resilient member from the unbiased inherent configuration to the deflected configurations the spaced side walls being displaced relative to each other.

17. A dispenser as claimed in claim 16 wherein each slot is selected from the group consisting of: (a) a slot which extends axially through the resilient member, and (b) a slot which extends axially from an axially open end of the slot on an axially detected surface on the resilient member to a blind end of the slot in the resilient.

18. A dispenser as claimed in claim 3 wherein the resilient member comprises an annular ring member about the axis,
an axially extending annular slot provided in the annular ring member assisting deflection of the resilient member from the unbiased inherent configuration to the deflected configurations,
the slot extending axially from an axially open end of the slot on an axially detected surface on the resilient member to a blind end of the slot in the resilient member, and the slot extending annularly about the axis, and
the slot defined between a pair of radially spaced opposed slot side walls with each side wall extending from the blind end to the open end,
wherein in deflection of the resilient member from the unbiased inherent configuration to the deflected configurations the spaced side walls are displaced relative to each other.

19. A dispenser as claimed in claim 3 wherein the resilient member comprises an annular ring member about the axis, and
one or more axially extending slots are provided in the annular ring member assisting deflection of the resilient member from the unbiased inherent configuration to the deflected configurations.

20. A dispenser as claimed in claim 5 wherein the resilient member comprises an annular ring member about the axis,
   an axially extending annular slot provided in the annular ring member assisting deflection of the resilient member from the unbiased inherent configuration to the deflected configurations,
   the slot extending axially from an axially open end of the slot on an axially detected surface on the resilient member to a blind end of the slot in the resilient member, and the slot extending annularly about the axis, and
   the slot defined between a pair of radially spaced opposed slot side walls with each side wall extending from the blind end to the open end,
   wherein in deflection of the resilient member from the unbiased inherent configuration to the deflected configurations the spaced side walls are displaced relative to each other.

* * * * *